(12) United States Patent
Matsukawa et al.

(10) Patent No.: US 6,996,280 B1
(45) Date of Patent: Feb. 7, 2006

(54) IMAGE ENCODER, IMAGE DECODER, CHARACTER CHECKER, AND DATA STORAGE MEDIUM

(75) Inventors: Yoshihiko Matsukawa, Nara (JP); Taro Imagawa, Osaka (JP); Tsuyoshi Mekata, Osaka (JP); Kouichi Hata, Tokyo (JP); Minoru Eto, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/719,231

(22) PCT Filed: Jun. 9, 1999

(86) PCT No.: PCT/JP99/03066

§ 371 (c)(1),
(2), (4) Date: Feb. 22, 2001

(87) PCT Pub. No.: WO99/65226

PCT Pub. Date: Dec. 16, 1999

(30) Foreign Application Priority Data

Jun. 9, 1998 (JP) ................................. 10-160133

(51) Int. Cl.
*G06K 9/36* (2006.01)
*G06K 9/46* (2006.01)

(52) U.S. Cl. ...................................... 382/236; 382/246

(58) Field of Classification Search ........ 382/236–240, 382/232, 234, 244–251; 707/102
See application file for complete search history.

(56) References Cited

U.S. PATENT DOCUMENTS 6,301,391 B1 * 10/2001 Nomizu ...................... 382/236

FOREIGN PATENT DOCUMENTS

| JP | 2-174370 | 7/1990 |
| JP | 3-104380 | 5/1991 |
| JP | 04 287179 | 10/1992 |
| JP | 05 37700 | 2/1993 |
| JP | 5-176180 | 7/1993 |
| JP | 6-113291 | 4/1994 |
| JP | 10-98732 | 4/1998 |
| JP | 10-126624 | 5/1998 |

* cited by examiner

*Primary Examiner*—Joseph Mancus
*Assistant Examiner*—Duy M. Dang
(74) *Attorney, Agent, or Firm*—Wenderoth, Lind & Ponack, L.L.P.

(57) ABSTRACT

An image coding apparatus includes an image feature extraction means for generating character data which includes character codes corresponding to character images included in a document image and auxiliary information indicating the sizes and positions of the respective character images in the document image based on image data indicating the document image. The image coding apparatus generates a predictive document image for the document image based on the character data, and subjects the document image data to arithmetic coding in which the probability model is changed with reference to predictive document image data. In the image coding apparatus, the probabilities of white pixels and black pixels indicated by the probability model are very close to those in the character image, whereby the coding efficiency for the character image data in the arithmetic encoder is improved.

3 Claims, 49 Drawing Sheets

Fig.25(a)
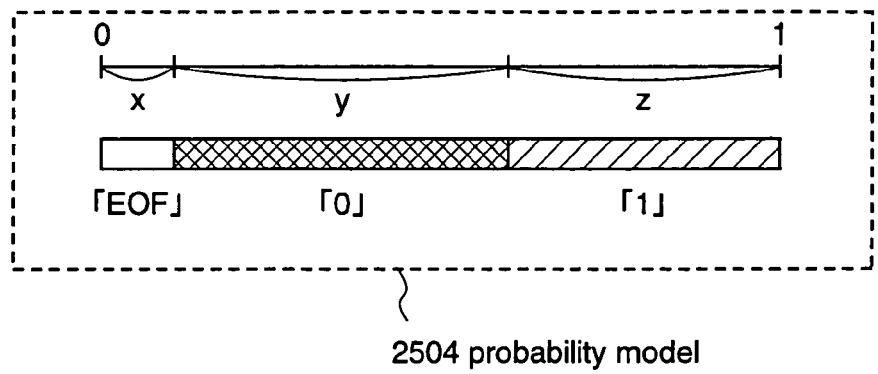
2504 probability model
Fig.25(b)
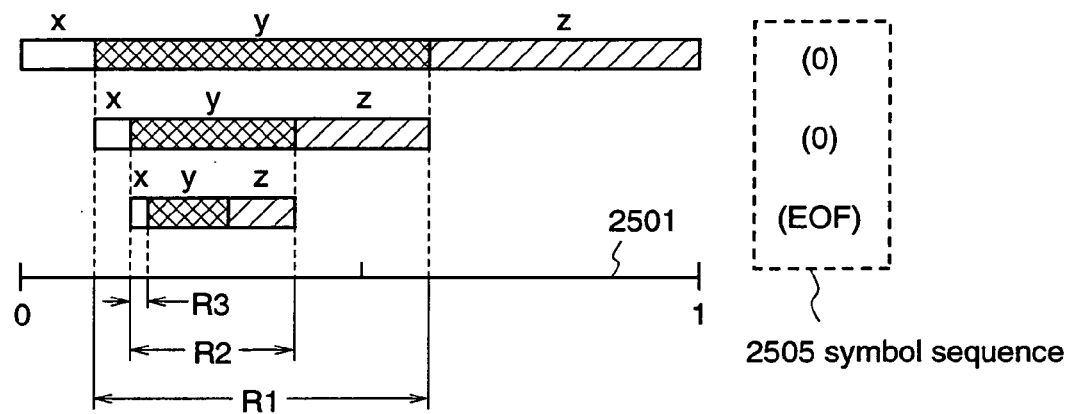
2501
2505 symbol sequence
Fig.25(c)
binary decimal   0.0010101011
2503

(character-to-character distance table)

IMAGE ENCODER, IMAGE DECODER, CHARACTER CHECKER, AND DATA STORAGE MEDIUM

TECHNICAL FIELD

The present invention relates to an image coding apparatus, an image decoding apparatus, and a data storage medium. More particularly, the present invention relates to a coding process for efficiently coding document image data, i.e., binary image data which is obtained by converting a document image (an image including characters) into an electronic form with a scanner or the like, for transmission or storage, and a decoding process which is adapted to the coding process. Furthermore, the present invention relates to a data storage medium containing a program for making a computer perform these processes.

Further, the present invention relates to a character collation apparatus, a data storage medium and, more particularly, to a collation process for collating a character image (an image expressing a character) to be retrieved with inputted retrieval data without decoding coded data corresponding to the character image (a character image code). Furthermore, the present invention relates to a data storage medium containing a program for making a computer perform the collation process.

BACKGROUND ART

A conventional document filing apparatus has been developed for converting information of a document image including characters and pictures into an electronic form so as to record it as document image data. In recent years, with an increase in document image data to be recorded in such document filing apparatus, much effort is required to input or update key words and class codes for retrieving a document image when recording it in the filing apparatus.

In order to reduce the effort to input or update the data for retrieval when recording the document image, a recent document tiling apparatus includes a document image storage means in which document image data which is obtained by converting a document image into electronic form with a scanner or the like is associated with character data which is obtained by recognizing the document image as characters (refer to Japanese Patent Gazette No.2560656 (Japanese Published Patent Application No. Hei.8-87528)).

FIG. 39 is a block diagram for explaining an example of a conventional document filing apparatus.

A conventional document filing apparatus 3900 includes an image coding means 3902 for coding binary image data (document image data) Di, which is obtained by converting a document image into electronic form and which is externally supplied, by using a scheme such as MH (Modified Huffman) or MR (Modified Read), and outputting coded data De corresponding to the document image. The document filing apparatus 3900 also includes a character recognition means 3901 for subjecting the document image data Di to character recognition, and outputting, as character data, character codes Dco of plural candidate characters for each character which is included in the document image. In the character recognition process, the character recognition means 3901 employs, for example, a method of pattern recognition by an OCR (Optical Character Reader).

The document filing apparatus 3900 further includes a document image storage means 3903 in which coded data De corresponding to each document image is associated with character codes Dco (i.e., character codes of plural candidate characters relating to the document image).

The document filing apparatus 3900 also includes a data reading means 3904 for reading coded data De corresponding to a specific document image stored in the document image storage means 3903, based on character codes which are externally supplied as retrieval data Da. The document filing apparatus 3900 further includes an image decoding means 3905 for decoding the read coded data De so as to restore the document image data Di corresponding to the specific document image. The data reading means 3904 collates the character codes as the retrieval data Da (retrieval character code) with the character codes stored in the document image storage means 3903 (stored character codes), and outputs coded data De of a document image corresponding to the stored character codes which match the retrieval character codes.

In the document filing apparatus 3900, the character recognition means 3901 is constructed so as to output character codes Dco of plural candidate characters as character data which are obtained by performing character recognition on each character, whereby an adverse effect of errors in the character recognition on the retrieval is reduced.

When document image data Di is input to the document filing apparatus 3900 so constructed, the image coding means 3902 encodes the document image data Di to output coded data De. The character recognition means 3901 extracts a character image which is included in the document image based on the document image data Di, and outputs character codes Dco of plural candidate characters corresponding to this character image.

Then, the coded data De corresponding to one document image are associated with the plural character codes Dco to be stored in the document image storage means 3903.

Further, when the retrieval data Da is externally supplied, the data reading means 3904 reads coded data De corresponding to a predetermined document image which is stored in the document image storage means 3900, based on the character codes as the retrieval data Da, and the image decoding means 3905 decodes the coded data De so as to restore the document image data Di.

In the conventional document filing apparatus 3900 so constructed, however, the coding process on the document image data Di by the image coding means 3902 is performed uniformly regardless of the types of characters included in the document image or regardless of the types of components of the document image such as characters, diagrams, pictures, etc., and therefore, the coding efficiency is degraded in some instances.

Further, in the conventional document filing apparatus 3900, the character recognition means 3901 performs character recognition on each character which is included in the document image, and outputs character codes of plural candidate characters for each character which is included in the document image. However, the plural candidate characters which are obtained as the result off character recognition for one character usually have a tendency to be similar in shape. In other words, when one candidate character (usually, a first candidate character) is recognized, other candidate characters can be roughly analogized. Therefore, to derive plural candidate character codes by performing character recognition on each character results in obtaining redundant character data, whereby the quantity of data is increased.

The present invention is made to solve the above-described problems. Accordingly, an object of the present invention is to provide an image coding apparatus which can realize a coding process for efficiently coding data of a document image including characters without degrading facility in retrieval of a character image that is included in the document image, an image decoding apparatus which can preferably perform a decoding process that is adapted to the coding process, and a data storage medium containing a program for making a computer perform the coding process and the decoding process.

Further, it is another object of the present invention to provide a document collation apparatus which can perform a collation process of collating a character image code which is obtained by coding image data corresponding to a character image (character part of a document image) with input character data without decoding the character image code, and a data storage medium containing a program for making a computer perform the collation process.

SUMMARY OF THE INVENTION

An image coding apparatus according to a first aspect of the present invention is an apparatus for coding image data corresponding to a target image to be coded based on image data corresponding to a predictive image which is similar to the target image. This apparatus comprises: predictive image generation means for generating image data corresponding to partial predictive images which are similar to plural partial images constituting the target image, based on image feature data indicating features of the plural partial images; image composition means for compositing the plural partial predictive images based on the image data of the plural partial predictive images and auxiliary data indicating the positions and sizes of the respective partial images in the target image, thereby generating image data of the predictive image; and entropy coding means for subjecting the image data of the target image to entropy coding by utilizing the correlation in pixel values between the target image and the predictive image, and outputting entropy codes as coded image data of the target image. This image coding apparatus outputs the image feature data and the auxiliary data as well as the entropy codes.

In the image coding apparatus according to the first aspect, predictive image data for the target image is generated based on the image feature data indicating the feature of the target image, and the image data of the target image is subjected to entropy coding with reference to the predictive image data. Therefore, the coding efficiency of the entropy coding for the image data of the target image is improved. Further, the easiness in retrieving the target image by using the image feature data is not impaired.

According to a second aspect of the present invention, the image coding apparatus of the first aspect further comprises image feature extraction means for generating the image feature data indicating the features of the respective partial images constituting the target image, and the auxiliary data indicating the positions and sizes of the respective partial images in the target image, based on the image data of the target image.

Since the image coding apparatus according to the second aspect is provided with the image feature extraction means for extracting the image feature data from the image data of the target image, in addition to the components of the image coding apparatus of the first aspect, extraction of the image feature data from the image data of the target image is performed automatically, whereby an image coding apparatus which is useful as an image coding means in a facsimile or the like is obtained, in addition to the effect of the image coding apparatus of the first aspect in that the coding efficiency is improved without impairing the easiness in retrieving the target image by using the image feature data.

According to a third aspect of the present invention, in accordance with the image coding apparatus of the second aspect, the entropy coding means comprises: first image blocking means for dividing the image data of the predictive image into image data corresponding to plural predictive blocks constituting the predictive image and each having a predetermined size, and outputting the image data of each predictive block; second image blocking means for dividing the image data of the target image into image data corresponding to plural target blocks constituting the target image and each having a predetermined size, and outputting the image data of each target block; and block predictive coding means for subjecting the image data of each target block to entropy coding based on the correlation in pixel values between each predictive block and each target block. The block predictive coding means performs entropy coding on the image data of the target block and outputs the corresponding coded image data and a coding flag when the difference between the target block and the predictive block is equal to or larger than a predetermined reference value. On the other hand, the block predictive coding means does not perform entropy coding on the target block and outputs a non-coding flag when the difference between the target block and the predictive block is smaller than the reference value.

In the image coding apparatus according to the third aspect, the predictive image is divided into plural predictive blocks of a predetermined size based on the predictive image data for the target image while the target image is divided into plural target blocks of a predetermined size, and the image data of each target block is subjected to entropy coding with reference to the image data of the corresponding predictive block. At this time, only the coded data of the target block, whose difference in pixel values between itself and the predictive block is larger than a predetermined value, is transmitted. Therefore, the coding efficiency is greatly improved by neglecting small differences in the block by block comparison, without giving, to the viewer, the impression that the image quality is degraded.

According to a fourth aspect of the present invention, the image coding apparatus of the second aspect further comprises image filtering means for subjecting the image data of the predictive image to filtering so that minute portions of the predictive image are omitted, and outputting the filtered data of the predictive image. Further, the entropy coding means subjects the image data of the target image to entropy coding based on the filtered data.

In the image coding apparatus according to the fourth aspect, the predictive image data which is obtained based on the image data of the target image is subjected to filtering, and the image data of the target image is subjected to entropy coding with reference to the filtered predictive image data. Therefore, the prediction error of the predictive image with respect to the target image is reduced by the filtering, whereby the coding efficiency of the entropy coding for the image data of the target image is further improved.

An image decoding apparatus according to a fifth aspect of the present invention is an apparatus for decoding coded image data which is obtained by subjecting image data corresponding to a target image to be coded to entropy coding by utilizing the correlation in pixel values between the target image and a predictive image which is similar to the target image. This image decoding apparatus comprises: predictive image generation means for generating image data corresponding to partial predictive images which are similar to plural partial images constituting the target image, based on image feature data indicating features of the plural partial images; image composition means for compositing the plural partial predictive images based on the image data of the plural partial predictive images and auxiliary data indicating the positions and sizes of the partial images in the target image, thereby generating image data of the predictive image; and entropy decoding means for subjecting the coded image data of the target image to entropy decoding by utilizing the correlation in pixel values between the target image and the predictive image, based on the image data of the predictive image, thereby generating image data of the target image.

In the image decoding apparatus of the fifth aspect, predictive image data for the target image is generated based on the image feature of the target image, and the coded data of the target image is subjected to entropy decoding with reference to the predictive image data. Therefore, it is possible to realize a decoding process which is adaptable to the efficient entropy coding process for the target image data by using the predictive image data.

An image decoding apparatus according to a sixth aspect of the present invention is an apparatus for receiving the coded image data, the coding flag or non-coding flag, the image feature data, and the auxiliary data which are output from the image coding apparatus of the third aspect, and generating decoded image data of the target image. This image decoding apparatus comprises: predictive image generation means for generating image data corresponding to partial predictive images which are similar to plural partial images constituting the target image, based on image feature data indicating the features of the plural partial images; image composition means for compositing the plural partial predictive images based on the image data of the plural partial predictive images and auxiliary data indicating the positions and sizes of the partial images in the target image, thereby generating image data of the predictive image; image blocking means for dividing the image data of the predictive image into image data corresponding to plural predictive blocks constituting the predictive image and each having a predetermined size, and outputting the image data of each predictive block; block predictive decoding means for subjecting the coded image data of the target block to entropy decoding by utilizing the correlation in pixel values between the target block and the predictive block based on the image data of the respective predictive blocks, thereby generating image data of the target block; and block assembly means for receiving the image data of the predictive blocks and the image data of the target blocks, and assembling the target image by using the target blocks and the predictive blocks based on the coding flag and the non-coding flag, thereby restoring the image data of the target image.

In the image decoding apparatus according to the sixth aspect, a predictive image is generated from the image feature which is extracted from the target image, and this predictive image is divided into predictive document blocks of a predetermined size so as to generate image data corresponding to the respective predictive imago blocks. The coded data of plural image blocks of a predetermined size, into which the target image is divided, are subjected to entropy coding with reference to the image data of the predictive image blocks. At this time, the image data of the corresponding predictive image data is output with respect to the target image block having a small prediction error, which has not been coded yet. Therefore, it is possible to realize a decoding process which is adaptable to the efficient coding process for the image data of the target image in units of blocks having a predetermined size.

According to a seventh aspect of the present invention, the image decoding apparatus of the fifth aspect further comprises an image filtering means for subjecting the image data of the predictive image to filtering such that minute portions of the predictive image are omitted, and outputting the filtered data of the predictive image. Further, the entropy decoding means subjects the coded image data of the target image to entropy decoding based on the filtered data.

In the image decoding apparatus according to the seventh aspect, image data of the predictive image is generated in advance based on the image feature of the target image, and the predictive image data is subjected to filtering so that the minute parts of the predictive image are omitted. The coded data of the target image is subjected to entropy decoding with reference to the filtered predictive image data. Therefore, it is possible to realize a decoding process which is adaptable to the efficient coding process for the target image data by using the filtered predictive image data.

An image coding apparatus according to an eighth aspect of present invention is an apparatus for coding image data of a target image to be coded based on image data of a predictive image which is similar to the target image. This image coding apparatus comprises: predictive image generation means for generating image data of the predictive image which is similar to the target image based on image feature data indicating the feature of the target image; and entropy coding means for subjecting the image data of the target image to entropy coding by utilizing the correlation in pixel values between the target image and the predictive image, and outputting entropy codes as coded image data of the target image. This image coding apparatus outputs the entropy codes and the image feature data corresponding to the target image.

In the image coding apparatus according to the eighth aspect, predictive image data for the target image to be coded is generated based on the image feature data of the target image, and the target image data is subjected to entropy coding with reference to the predictive image data. Therefore, the coding efficiency of the entropy coding process is improved.

Further, since the image coding apparatus outputs the image feature data of the target image as well as the entropy codes (coded data) corresponding to the target image data, the coded data of the target image can be retrieved by using the image feature data.

According to a ninth aspect of the present invention, the image coding apparatus of the eighth aspect further comprises image feature extraction means for extracting the image feature from the target image based on the image data of the target image, and outputting the image feature data to the predictive image generation means.

Since the image coding apparatus according to the ninth aspect is provided with the image feature extraction means for extracting image feature data of the target image from the target image data, extraction of the image feature data from the target image data is carried out in the image coding apparatus, whereby an image coding apparatus which is suitable as an image coding means in a document filing apparatus or a facsimile is obtained, in addition to the effects of the image coding apparatus of the eighth aspect.

According to a tenth aspect of the present invention, in accordance with the image coding apparatus of the ninth aspect, the image feature extraction means comprises: blocking means for dividing the image data of the target image into plural blocks constituting the target image and each having a predetermined size, thereby generating image data corresponding to the respective blocks; and block smoothing means for replacing the image data of each block with a pixel value of the highest occurrence frequency among the pixel values of pixels in the block, and outputting, as image feature data of the target image, image data of a reduced image comprising the highest-frequency pixel values of the respective blocks. The predictive image generation means generates image data of a predictive image in which all of the pixels constituting each block have the highest-frequency pixel values corresponding to the target block, which is obtained by enlarging the respective pixels of the reduced image to the blocks of the predetermined size.

In the image coding apparatus according to the tenth aspect, the image data of the target image is divided into image data corresponding to plural blocks each having a predetermined size, and the image data of each block is replaced with a pixel value of the highest occurrence frequency among the pixel values or pixels in the block, and image data of a reduced image comprising the most-frequent pixel values of the respective blocks is output as image feature data of the target image. Therefore, the image feature data indicating the feature of the target image can be easily generated.

According to an eleventh aspect of the present invention, in accordance with the image coding apparatus of the ninth aspect, the image feature extraction means comprises: feature vector extraction means for outputting a feature vector indicating the feature of an image which is similar to the target image; and vector quantization means for subjecting the feature vector to quantization, thereby outputting, as image feature data of the target image, an identifier which is set on a region including the feature vector among plural regions partitioning a vector space in which plural learning vectors are defined. The predictive image generation means generates image data of a predictive image corresponding to the target image based on a learning vector which is closest to a representative feature vector which is included in the region of the vector space where the identifier is set.

The image coding apparatus according to the eleventh aspect is provided with the image feature extraction means for extracting an identifier corresponding to an image which is similar to the target image as the image feature of the target image, the similar image as a predictive image for the target image is obtained based on the identifier, and the target image data is subjected to entropy coding with reference to the similar image. Therefore, the coding efficiency of the entropy coding process is improved and, further, the coded data of the target image can be retrieved by using the identifier.

Further, the feature vector corresponding to each character image which is included in the target image (document image) is quantized, and predictive image data for the character image is generated based on the representative feature vector. Therefore, only one representative feature vector is output as the image feature data of each character image in the document image, whereby the image feature data of the document image is prevented from being redundant and, moreover, an adverse effect of errors in character recognition (variations in feature extraction) is reduced when performing retrieval of the document image by using the image feature data.

According to a twelfth aspect of the present invention, there is provided an image decoding apparatus for decoding coded image data which is obtained by subjecting image data of a target image to be coded to entropy coding by utilizing the correlation in pixel values between the target image and a predictive image which is similar to the target image. This image decoding apparatus comprises: predictive image generation means for generating image data of a predictive image corresponding to the target image based on image feature data indicating the image feature of the target image; and entropy decoding means for subjecting the coded image data of the target image to entropy decoding, by utilizing the correlation in pixel values between the target image and the predictive image, based on the image data of the predictive image, thereby generating image data of the target image.

The image decoding apparatus according to the twelfth aspect is provided with the predictive image generation means for generating predictive image data for the target image based on the image feature data of the target image, and the coded data is subjected to arithmetic decoding with reference to the predictive image data. Therefore, it is possible to realize an image decoding apparatus which can correctly decode the entropy codes that are obtained by the efficient arithmetic coding process by utilizing the correlation between the target image and the predictive image.

According to a thirteenth aspect of the present invention, in accordance with the image coding apparatus of any one of the first, second, eighth and ninth aspects, the image feature data is image data corresponding to a reduced image, which is obtained by dividing the image data of the target image into image data corresponding to plural blocks constituting the target image and each having a predetermined size, and replacing the image data corresponding to each block with a pixel value of the highest occurrence frequency among the pixel values of pixels in the block. Further, the predictive image generation means generates image data of a predictive image in which all of the pixels constituting each block have the highest-frequency pixel value of the target block, which is obtained by enlarging the respective pixels of the reduced image to the blocks of the predetermined size.

In the image coding apparatus according to the thirteenth aspect, since, similar to the tenth aspect, image data of a reduced image comprising the most-frequent pixel values of the respective blocks is output as image feature data of the target image, the image feature data indicating the feature of the target image can be easily generated.

According to the present invention, in the image decoding apparatus of the fifth or twelfth aspect, the image feature data is image data corresponding to a reduced image which is obtained by dividing the image data of the target image into image data corresponding to plural blocks constituting the target image and each having a predetermined size, and replacing the image data corresponding to each block with a pixel value of the highest occurrence frequency among the pixel values of pixels in the block. Further, the predictive image generation means generates image data of a predictive image in which all of the pixels constituting each block have the highest-frequency pixel value of the target block, which is obtained by enlarging the respective pixels of the reduced image to the blocks of the predetermined size.

The image decoding apparatus according to a fourteenth aspect of the present invention receives, as the image feature data, image data of a reduced image which is obtained by replacing image data of each or plural blocks of a predetermined size, into which the target image is divided, with a pixel value of the highest occurrence frequency among the pixel values of pixels in the block, and the decoding apparatus generates image data of a predictive image in which all of the pixels constituting each block have the most-frequent pixel value corresponding to the target block, which is obtained by enlarging the respective pixels in the reduced image to the blocks of the predetermined size. Therefore, it is possible to realize an image decoding apparatus which is adaptable to the image coding apparatus according to the thirteenth aspect.

According to a fifteenth aspect of the present invention, in accordance with the image coding apparatus of any one of the first, second; eighth and ninth aspects, the image feature data is an identifier which is associated with a vector that is selected from plural already-existing vectors which are predefined in a vector space, by using a feature vector indicating the feature of an image similar to the target image. Further, the predictive image generation means outputs, as image data of a predictive image for the target image, image data which is specified by the selected vector corresponding to the identifier.

In the image coding apparatus according to the fifteenth aspect, the identifier corresponding to the image which is similar to the target image is used as the image feature of the target image, the similar image is obtained as a predictive image for the target image based on the identifier, and the target image data is subjected to entropy coding with reference to the similar image. Therefore, the coding efficiency of the entropy coding process is improved and, furthermore, the coded data of the target image can be retrieved using the identifier.

According to a sixteenth aspect of the present invention, in accordance with the image decoding apparatus of the fifth or twelfth aspect, the image feature data is an identifier which is associated with a vector that is selected from plural already-existing vectors which are predefined in a vector space by using a feature vector indicating the feature of an image similar to the target image. Further, the predictive image generation means outputs, as image data of a predictive image for the target image, image data which is specified by the selected vector corresponding to the identifier.

In the image decoding apparatus according to the sixteenth aspect, the identifier corresponding to the image which is similar to the target image is used as image feature data, and the predictive image data for the target image is output based on the identifier. Therefore, it is possible to realize an image decoding apparatus which can correctly decode the entropy codes that are obtained by the efficient entropy coding by utilizing the identifier of the similar image of the target image and the correlation in pixel values between the target image and the predictive image.

An image coding apparatus according to a seventeenth aspect of the present invention is an apparatus for coding image data of a target image to be coded based on image data of a predictive image which is similar to the target image. This image coding apparatus comprises entropy coding means for receiving the image data of the externally supplied predictive image, subjecting the image data of the target image to entropy coding, utilizing the correlation in pixel values between the target image and the predictive image based on the image data of the predictive image, and outputting entropy codes as coded image data of the target image. This image coding apparatus outputs the image data of the predictive image as well as the entropy codes of the target image.

The image coding apparatus according to the seventeenth aspect is provided with the entropy coding means for subjecting the target image data to entropy coding with reference to the predictive image data for the target image, and the data of an image which is similar to the target image, which similar image is specified when performing coding on the target image data, is input as predictive image data for the target image, whereby the coding efficiency of the entropy coding process is improved.

According to an eighteenth aspect of the present invention, the image coding apparatus of the seventeenth aspect further comprises image prediction means for outputting the image data of the predictive image similar to the target image to the entropy coding means based on the image data of the target image.

In the image coding apparatus according to the eighteenth aspect, predictive image data for the target image is generated from the target image data, and the target image data is subjected to entropy coding with reference to the predictive image data. Therefore, the coding efficiency of the entropy coding process is improved and, furthermore, the coded data of the target image can he retrieved by using the predictive image data.

According to a nineteenth aspect of the present invention, in accordance with the image coding apparatus of the eighteenth aspect, the image predictive means comprises: feature vector extraction means for outputting a feature vector indicating the image feature of the image which is similar to the target image based on the image data of the target image; vector quantization means for subjecting the feature vector to quantization, thereby outputting, as image feature data of the target image, an identifier which is set on a region including the feature vector among plural regions partitioning a vector space in which plural learning vectors are defined; and predictive image generation means for generating data of a predictive image for the target image based on a learning vector which is closest to a representative feature vector that is included in the region of the vector space where the identifier is set.

The image coding apparatus according to the nineteenth aspect is provided with the predictive image generation means for generating predictive image data for the target image from the target image data, and the target image data is subjected to entropy coding with reference to the predictive image data. Therefore, similar to the eighteenth aspect, the coding efficiency of the entropy coding process is improved and, further, the coded data of the target image can be retrieved by using the predictive image data.

An image decoding apparatus according to a twentieth aspect of the present invention is an apparatus for decoding coded image data which is obtained by subjecting image data of a target image to be coded to entropy coding by utilizing the correlation in pixel values between the target image and a predictive image which is similar to the target image. This image decoding apparatus comprises entropy decoding means for subjecting the coded image data of the target image to entropy decoding, by utilizing the correlation in pixel values between the target image and the predictive image, based on image data of the predictive image which is input separately from the coded image data of the target image, thereby generating image data of the target image.

In the image decoding apparatus according to the twentieth aspect, since the coded data of the target image is subjected to entropy decoding with reference to the predictive image data for the target image, it is possible to realize an image decoding apparatus which correctly decodes the entropy codes obtained by efficient entropy coding by utilizing the correlation between the target image and the predictive image.

An image coding apparatus according to a twenty-first aspect of the present invention is an apparatus for coding image data of a target image to be coded based on image data of a predictive image for the target image. This image coding apparatus comprises: image feature extraction means for extracting the image feature from the target image based on the image data of the target image, and outputting image feature data of the target image; predictive image generation means for generating image data of a predictive image which is similar to the target image based on the image feature data of the target image; predictive image storage means for associating image data of a target image which has already been coded, with its image feature data, and storing them as image data and image feature data corresponding to an already-processed image; predictive image selection means for comparing the image feature data of the target image with the image feature data of the already-processed images which are stored in the predictive image storage means, and selecting, as a predictive image, either the similar image or a predetermined already-processed image; and entropy coding means fur subjecting the image data of the target image to entropy coding by utilizing the correlation in pixel values between the target image and the predictive image, thereby outputting entropy codes as coded image data of the target image. The predictive image selection means outputs a flag indicating that either the similar image or the predetermined already-processed image is selected as a predictive image, and outputs the image feature data of the target image.

The image coding apparatus according to the twenty-first aspect is provided with the predictive image selection means for comparing the image feature data of the target image with the image feature data of the already-processed images which are stored in the predictive image storage means, and selecting either the similar image corresponding to the target image or a predetermined already-processed image. Further, the entropy coding means for subjecting the image data of the target image to entropy coding outputs a flag indicating that either the similar image or the predetermined already-processed image is selected, as well as the image feature data of the target image. Therefore, the coding efficiency of the entropy coding process is improved and, moreover, when the character image to be coded is equal to the already-processed character image, the process of generating the predictive image data of the target image can be dispensed with, whereby the arithmetic load on the coding process using the predictive image can be reduced.

According to a twenty-second aspect of the present invention, in accordance with the image coding apparatus of the twenty-first aspect, the image feature extraction means comprises: feature vector extraction means for generating a first feature vector as image feature data corresponding to the target image based on the image data of the target image; and character recognition means for subjecting the target image to character recognition based on the first feature vector so as to generate a character code corresponding to the target image. The predictive image generation means generates, as first predictive image data, image data of the image which is similar to the target image based on the character code of the target image. The predictive image storage means stores the image data of the target image which has already been coded, its character code, and its first feature vector, in association with each other. The predictive image selection means reads image data and a feature vector which is associated with a character code that is equal to the character code of the target image, as second predictive image data and a second feature vector, and outputs one of the first and second predictive image data according to the result of comparison between the first and second feature vectors.

In the image coding apparatus according to the twenty-second aspect, since the predictive image selection means compares the feature vector corresponding to the similar image with the feature vector corresponding to the already-processed image and selects either the similar image or the already-processed image as a predictive image, the selection of the similar image or the already-processed image is achieved by the relatively simple process of comparing the corresponding feature vectors.

An image decoding apparatus according to a twenty-third aspect of the present invention is an apparatus for decoding coded image data which is obtained by subjecting image data of a target. image to be coded to entropy coding by utilizing the correlation in pixel values between the target image and a predictive image which is similar to the target image. This image decoding apparatus comprises: predictive image generation means for generating image data of an image which is similar to the target image based on image feature data indicating the image feature of the target image; predictive image storage means for associating image data of a target image which has already been decoded with its image feature data, and storing them as image data and image feature data corresponding to an already-processed image; predictive image selection means for selecting, as a predictive image, either the similar image or a predetermined already-processed image based on flag information indicating that either a similar image obtained from the image feature of the target image or an already-coded image is used as a predictive image for the target image in the coding process; and entropy decoding means for subjecting the coded image data of the target image to entropy decoding based on the image data of the predictive image by utilizing the correlation in pixel values between the target image and the predictive image, thereby generating image data of the target image.

In the image decoding apparatus according to the twenty-third aspect, either the font image (first predictive image) obtained from the character code of the target image or the character image (second predictive image) that has already been decoded, which is more similar to the target image, is selected as a predictive image, and the entropy codes of the target image are decoded with reference to the selected predictive image data. Therefore, it is possible to realize a decoding process which is adaptable to the entropy coding process which provides high coding efficiency and reduces the arithmetic load by omitting the process of generating the predictive image data for the target image when the character image to be coded is equal to the already-processed character image.

According to a twenty-fourth aspect of the present invention, in accordance with the image decoding apparatus of the twenty-third aspect, the predictive image generation means generates first predictive image data for the target image based on a character code as image feature data of the target image. The predictive image storage means associates image data of a target image which has already been decoded, with its character code, and stores them as image data and a character code of an already-processed image. The predictive image selection means reads image data associated with a character code that is equal to the character code of the target image, as second predictive image data, from the predictive image storage means, and outputs one of the first and second predictive image data based on the flag information.

In the image decoding apparatus according to the twenty-fourth aspect, either the font image (first predictive image) obtained from the character code of the target image or the character image (second predictive image) that has already been decoded, which is more similar to the target image, is selected as a predictive image based on the flag information, whereby the selection of the predictive image at the decoder end is facilitated.

An image coding apparatus according to a twenty-fifth aspect of the present invention is an apparatus for coding image data of a target image to be coded based on image data of a predictive image for the target image. This image coding apparatus comprises: image feature extraction means for extracting the image feature of the target image based on the image data of the target image, and outputting image feature data of the target imago; predictive image generation means for generating image data of an image which is similar to the target image based on the image feature data of the target image; predictive image storage means for storing image feature data of a target image which has already been coded, as image feature data of an already-processed image; data output control means for performing either a first data output process or a second data output process according to the result or comparison between the image feature data of the target image and the image feature data of the already-processed image stored in the predictive image storage means, where the first data output process outputs the image data of the similar image, the image feature data of the target image, and a coding flag indicating that coding should be performed, and where the second data output process outputs the image feature data of the target image and a non-coding flag indicating that coding should not be performed; and entropy coding means for subjecting the image data of the target image to entropy coding by utilizing the correlation in pixel values between the target image and the similar image, thereby outputting entropy codes as coded image data of the target image. The entropy coding means performs entropy coding when receiving the coding flag, and does not perform entropy coding and outputs no entropy code when receiving the non-coding flag.

In the image coding apparatus according to the twenty-fifth aspect, either the first data output process of outputting the image data of the similar image, the image feature data of the target image and the coding flag indicating that coding should be performed, or the second data output process of outputting the image feature data of the target image and the non-coding flag indicating that coding should not be performed is performed according to the result of comparison between the image feature data of the target image and the image feature data of the already-processed image stored in the predictive image storage means. Therefore, the coding efficiency of the entropy coding process is improved and, moreover, when the character image to be coded is equal to the already-processed character image, the process of generating the predictive image data of the target image and the process of subjecting the target image data to entropy coding are dispensed with, whereby the arithmetic load on the coding process using the predictive image is reduced.

According to a twenty-sixth aspect of the present invention, in accordance with the image coding apparatus of the twenty-fifth aspect, the image feature extraction means comprises: feature vector extraction means for generating a first feature vector as image feature data of the target image based on the image data of the target image; and character recognition means for subjecting the target image to character recognition based on the first feature vector so as to generate a character code corresponding to the target image. The predictive image generation means generates, as predictive image data, image data of an image which is similar to the target image based on the character code of the target image. The predictive image storage means stores the character code of a target image which has already been coded, in association with its first feature vector. The data output control means reads, as a second feature vector of the predictive image, a feature vector which is associated with a character code that is equal to the character code of the target image, and performs either a first data output process of outputting the image data of the similar image, the character code of the target image, and a coding flag indicating that coding is to be performed, or a second data output process of outputting the character code of the target image and a non-coding flag indicating that coding is not to be performed.

In the image coding apparatus according to the twenty-sixth aspect, since the character code of the character image to be coded is output regardless of the first or second data processing, the coded data of the target image can be retrieved by using the character code.

An image decoding apparatus according to a twenty-seventh aspect of the present invention is an apparatus for decoding coded image data which is obtained by subjecting image data of a target image to be coded to entropy coding by utilizing the correlation in pixel values between the target image and a predictive image which is similar to the target image. This image decoding apparatus comprises: predictive image generation means for generating first predictive image data for the target image based on image feature data indicating the image feature of the target image; predictive image storage means for associating the image data of a target image which has already been decoded, with its image feature data, and storing them as image data and image feature data of an already-processed image; data output control means for performing, when receiving a coding flag indicating that coding has been performed, a first data output process of outputting the first predictive image data and the coding flag and, on the other hand, performing, when receiving a non-coding flag indicating that coding has not been performed, a second data output process of reading the image data of the already-processed image as second predictive image data from the predictive image storage means, and outputting the second predictive image data and the non-coding flag; and entropy decoding means for performing, when receiving the coding flag, entropy decoding on the coded image data of the target image based on the first predictive image data by utilizing the correlation in pixel values between the target image and the predictive image and, on the other hand, outputting the second predictive image data as decoded data of the target image when receiving the non-coding flag.

In the image decoding apparatus according to the twenty-seventh aspect, when receiving the coding flag, the coded image data of the target image is subjected to entropy decoding by utilizing the correlation in pixel values between the target image and the predictive image based on the predictive image data for the target image so as to generate decoded data of the target image. On the other hand, when receiving the non-coding flag, image data of the already-decoded image is output as coded data of the target image. Therefore, it is possible to realize an arithmetic decoding process which is adaptable to the arithmetic coding process which can improve the coding efficiency of the arithmetic encoder and reduce the arithmetic load by omitting the process of generating the predictive image data of the target image and the process of subjecting the target image data to arithmetic coding, when the character image to be coded is equal to the already-processed character image.

According to a twenty-eighth aspect of the present invention, in accordance with the image decoding apparatus of the twenty-seventh aspect, the predictive image generation means generates first predictive image data for the target image based on the character code as image feature data of the target image. The predictive image storage means associates the image data of the target image which has already been decoded, with its character code, and stores them as image data and a character code of an already-processed image. The data output control means reads, as second predictive image data, image data which is associated with a character code that is equal to the character code of the target image, and outputs one of the first and second predictive image data based on the flag information.

In the image decoding apparatus according to the twenty-eighth aspect, since either the font image (first predictive image) obtained from the character code of the target image or the character image (second predictive image) which is that has already been decoded, which is more similar to the target image, is selected as a predictive image based on the flag information, the selection of the predictive image at the decoder end is facilitated.

According to a twenty-ninth aspect of the present invention, in accordance with the image coding apparatus of any one of the first, second, eighth, ninth, seventeenth, eighteenth, twenty-first and twenty-fifth aspects, the entropy code is an arithmetic code which is obtained by subjecting the image data of the target image to arithmetic coding in which the pixel value probability is changed for each of pixels constituting the target image. Further, the entropy coding means changes the pixel value probability, pixel by pixel, based on the image data of the predictive image which is similar to the target image, and the image data of the already-coded part of the target image.

In the image coding apparatus according to the twenty-ninth aspect, the arithmetic coding for the target image data is performed with high efficiency based on the image data of the predictive image which is similar to the target image and the image data of the already-coded part of the target image.

According to a thirtieth aspect of the present invention, in accordance with the image decoding apparatus of any one of the fifth, twelfth, twentieth, twenty-third and twenty-seventh aspects, the entropy code is an arithmetic code which is obtained by subjecting the image data of the target image to arithmetic coding in which the pixel value probability is changed for each of pixels constituting the target image. Further, the entropy decoding means subjects the arithmetic code of the target image to arithmetic decoding in which the pixel value probability is changed, pixel by pixel, based on the image data of the predictive image which is similar to the target image, and the image data of the already-decoded part of the target image, thereby reproduces the image data of the target image.

In the image decoding apparatus according to the thirtieth aspect, the arithmetic decoding for the coded data of the target image can be performed with high efficiency based on the image data of the predictive image which is similar to the target image and the image data of the already-coded part of the target image.

According to a thirty-first aspect of the present invention, in accordance with the image coding apparatus of any one of the first, second, eighth, ninth, seventeenth, eighteenth, twenty-first and twenty-fifth aspects, the entropy code is a Huffman code which is obtained by subjecting the image data of the target image to a coding process in which a Huffman coding table is changed for each of pixels constituting the target image. Further, the entropy coding means changes the Huffman coding table, pixel by pixel, based on the image data of the predictive image which is similar to the target image, and the image data of the already-coded part of the target image.

In the image coding apparatus according to the thirty-first aspect, the Huffman coding for the target image data is performed with high efficiency based on the image data of the predictive image which is similar to the target image and the image data of the already-coded part of the target image.

According to a thirty-second aspect of the present invention, in accordance with the image decoding apparatus of any one of the fifth, twelfth, twentieth, twenty-third and twenty-seventh aspects, the entropy code is a Huffman code which is obtained by subjecting the image data of the target image to a coding process in which a Huffman coding table is charged for each of pixels constituting the target image. Further, the entropy decoding means subjects the coded image data of the target image to a decoding process in which the Huffman coding table is changed pixel by pixel based on the image data of the predictive image similar to the target image, and the image data corresponding to the already-decoded part of the target image so as to reproduce the image data of the target image.

In the image decoding apparatus according to thirty-second aspect, the Huffman decoding for the coded data of the target image is performed with high efficiency based on the image data of the predictive image which is similar to the target image and the image data of the already-coded part of the target image.

According to a thirty-third aspect of the present invention, the image coding apparatus of any one of the first, second, eighth, ninth, seventeenth, eighteenth, twenty-first an twenty-fifth aspects further comprises attribute information addition means for receiving attribute information relating to the target image, and outputting the coded image data of the target image to which the attribute information is added.

In the image coding apparatus according to the thirty-third aspect, since the attribute information relating to the target image is added to the coded image data of the target image when outputting the coded image data, the attribute of, for example, a character image, can be known without decoding character image codes as the coded image data.

An image coding apparatus according to a thirty-fourth aspect of the present invention is an apparatus for coding image data of a target image to be coded which includes a character image. This image coding apparatus comprises: character image coding means for receiving the image data of the target image, and coding the image data of the character image included in the target image so as to output character image codes; character image deletion means for replacing the pixel values of pixels constituting a part of the target image where the character image is placed, with the pixel values of pixels which are positioned in the vicinity of the character image, thereby generating image data of a non-character image where the character image of the target image is deleted; and non-character image coding means for coding the image data of the non-character image so as to output non-character image codes. This image coding apparatus outputs the character image codes and the non-character image codes, as coded data of the target image.

In the image coding apparatus according to the thirty-fourth aspect, since the document image data is separated into the character image data and the non-character image data when the document image data is coded, the character image and the non-character image can be coded by highly-efficient coding methods which are suited to the respective images. Further, document retrieval can be performed by utilizing the coded data of the character image (character image codes).

An image decoding apparatus according to a thirty-fifth aspect of the present invention is an apparatus which receives character image codes that are obtained by coding image data of a character image included in a target image, and image data of a non-character image that is obtained by replacing pixels constituting a part of the target image including the character image with pixels which are positioned in the vicinity of the character image in the target image, and reproduces the image data of the target image including the character image. This image decoding apparatus comprises: non-character image decoding means for decoding the non-character image codes so as to output the image data of the non-character image; character image decoding means for decoding the character image codes so as to output the image data of the character image; and image reconstruction means for compositing the character image with respect to the non-character image based on the image data of the character image and the image data of the non-character image, and outputting the image data of the target image including the character image.

In the image decoding apparatus according to the thirty-fifth aspect, the coded data of the character image in the document image and the coded data of the non-character image, which is obtained by deleting the character image from the document image, are received separately as the coded data of the document image, the respective coded data are separately decoded so as to generate document image data and non-document image data, and the document image is reconstructed based on these data so as to generate document image data. Therefore, it is possible to realize an image decoding apparatus which can correctly decode the coded data obtained by the efficient coding methods which are suited to the character image and the non-character image, respectively.

Further, the document image can be retrieved by utilizing the coded data of the character image (character image codes).

A character collation apparatus according to a thirty-sixth aspect of the present invention is an apparatus for collating retrieval data indicating a retrieval condition for retrieving a character image with character image codes which are obtained by coding image data of a character image, wherein attribute information relating to a character image corresponding to the character image codes is added to the character image codes. This character collation apparatus is provided with character attribute collation means for collating the retrieval data with the character image codes according to whether the attribute information added to the character image codes satisfies the retrieval condition which is indicated by the retrieval data.

Since the character collation apparatus according to the thirty-sixth aspect is provided with the character collation means for collating the attribute information that is added to the character image codes with the retrieval condition so as to decide whether or not the attribute information satisfies the retrieval condition, only a large character which is included in the title line of the document image or a character line such as an up-to-down line can be extracted even in the state where the character image data is coded.

A character collation apparatus according to a thirty-seventh aspect of the present invention is an apparatus for collating a character code specifying a character image to be retrieved with character image codes to which image feature data indicating the image feature of the character image is added, which character image codes are obtained by coding image data of the character image. This character collation apparatus comprises: image feature extraction means for extracting the image feature of the character image which is specified by the character code, and outputting the extracted image feature as image feature data; and collation decision means for collating the image feature data added to the character image codes with the image feature data which is obtained from the character code, and deciding whether the character image codes match the character code.

Since the character collation apparatus according to the thirty-seventh aspect is provided with the image feature extraction means for extracting the image feature of a character image which is specified by an externally supplied character code is extracted based on the character code so as to output image character data of the image feature data which is included in the character image codes is compared with the image feature data of the character image corresponding to the character code. Accordingly, when the character image which is specified by the character code is equal to the character image corresponding to the character image codes, the character image corresponding to the character image codes is known without decoding the character image codes, and this enables shape comparison between the character image corresponding to the character image codes D20 and another character image.

According to a thirty-eighth aspect of the present invention, in accordance with the character collation apparatus of the thirty-seventh aspect, the image feature data added to the character image codes is a feature vector indicating the image feature of the character image corresponding to the character image codes. The image feature extraction means comprises: character image generation means for generating image data of a character image which is specified by the character code, based on the character code; and feature vector extraction means for extracting the image feature of the character image based on the image data of the character image, thereby outputting a feature vector indicating the image feature. The collation decision means includes distance calculation means for calculating a distance between the feature vector added to the character image codes and the feature vector which is obtained from the character code, and decides whether or not the character image codes match the character code according to whether the calculated distance is larger than a predetermined threshold or not.

In the character collation apparatus according to the thirty-eighth aspect, since whether the character image codes match the character code is decided according to whether or not the distance between the feature vector added to the character image codes and the feature vector obtained from the character code is larger than a predetermined threshold, the collation between the character image codes and the character code is facilitated.

A character collation apparatus according to a thirty-ninth aspect of the present invention is an apparatus for collating a character code specifying a character image to be retrieved with character image codes to which image data of a predictive character image which is similar to the character image is added, where the character image codes are obtained by coding image data of the character image. This character collation apparatus comprises: first image feature extraction means for receiving the character image codes, and extracting the image feature from the predictive character image based on the image data of the predictive character image which is added to the character image codes, thereby outputting first image feature data, second image feature extraction means for receiving the character code, and extracting the image feature of the character image which is specified by the character code, thereby outputting second image feature data; and collation decision means for collating the first image feature data with the second image feature data, and deciding whether or not the character image codes match the character code.

The character collation apparatus according to the thirty-ninth aspect is provided with the first image feature extraction means for outputting the first image feature data of the predictive character image based on the predictive character image data which is added to the character image codes, and the second image feature extraction means for extracting the image feature of the character image which is specified by the externally supplied character code and outputting the second image feature data. Therefore, the image feature data of the character image corresponding to the character code is compared with the image feature data of the predictive character image which is included in the character image codes. Accordingly, when it is decided that the character image which is specified by the character code matches the predictive character image corresponding to the character image codes, the character image corresponding to the character image codes can be known without decoding the character image codes, and this enables shape comparison between the character image corresponding to the character image codes and another character image.

According to a fortieth aspect of the present invention, in accordance with the character collation apparatus of the thirty-ninth aspect, the first image feature extraction means outputs a first feature vector as the first image feature data. The second image feature extraction means comprises character image generation means for generating image data of a character image which is specified by the character code, based on the character code; and feature vector extraction means for extracting the image feature of the character image based on the image data of the character image, thereby outputting a second feature vector indicating the image feature. The collation decision means includes distance calculation means for calculating the distance between the first feature vector and the second feature vector, and deciding whether or not the character image codes match the character code, according to whether the calculated distance is larger than a predetermined threshold.

In the character collation apparatus according to the fortieth aspect, since it is decided whether or not the character image codes match the character code according to whether the distance between the feature vector added to the character image codes and the feature vector obtained from the character code is larger than a predetermined threshold, the collation between the character image codes and the character code is facilitated.

A character collation apparatus according to a forty-first aspect of the present invention is an apparatus for collating a character code specifying a character image to he retrieved with character image codes to which an identifier indicating a predictive character image which is similar to the character image is added, where the character image codes are obtained by coding image data of the character image. This character collation apparatus comprises: a table storage unit storing a character-to-character distance table in which the identifier of the predictive character image and the character code are associated with distance information which is calculated by using the identifier and the character code as variables; distance calculation means for receiving the character image codes and the character code, and obtaining distance information having, as variables, the predictive character image identifier added to the character image code, and the character code, with reference to the character-to-character distance table; and collation decision means for deciding whether or not the character image codes match the character code based on the distance information.

The character collation apparatus according to the forty-first aspect is provided with the table storage unit for storing the character-to-character distance table in which the identifier of the predictive character image added to the character image codes and the character code are associated with distance information which is defined by using the identifier and the character code as variables, the predictive character image identifier identifies the predictive character image which is similar to the character image corresponding to the character image codes, and the distance information is a Euclidean distance between the feature vector which is obtained from the character code and the representative feature vector which is obtained from the predictive character image identifier. Therefore, the feature vector corresponding to the character code is compared with the feature vector corresponding to the predictive character image identifier which is included in the character image codes. Accordingly, when it is decided that the character image which is specified by the character code matches the predictive character image corresponding to the character image codes, the character image corresponding to the character image codes can be known without decoding the character image codes, and this enables shape comparison between the character image corresponding to the character image codes and another character image.

A character collation apparatus according to a forty-second aspect of the present invention is an apparatus for collating a character code specifying a character image to be retrieved, with character image codes to which an identifier indicating a predictive character image similar to the character image is added, where the character image codes are obtained by coding image data of the character image. This character collation apparatus comprises: first image feature extraction means for receiving the character image codes, and extracting the image feature from the predictive character image based on the identifier indicating the predictive character image and added to the character image cedes, thereby outputting first image feature data; a second image feature extraction mans for receiving the character code, and extracting the image feature of a character image which is specified by the character code so as to output second image feature data; and collation decision means for collating the first image feature data with the second image feature data so as to decide whether or not the character image code matches the character code.

The character collation apparatus according to the forty-second aspect is provided with the first image feature extraction means for receiving the character image codes and outputting the first image feature data of the predictive character image based on the predictive character image identifier which is added to the character image codes, and the second image feature extraction means for extracting the image feature of the character image which is specified by the externally supplied character code and outputting the second image feature data. Therefore, the image feature data of the character image corresponding to the character code is compared with the image feature data corresponding to the predictive character image identifier included in the character image codes. Accordingly, when it is decided that the character image which is specified by the character code matches the predictive character image corresponding to the character image codes, the character image corresponding to the character image codes can be known according to the inputted character code without decoding the character image codes, and this enables shape comparison between the character image corresponding to the character image codes and another character image.

According to a forty-third aspect of the present invention, in accordance with the character collation means of the forty-second aspect, the first image feature extraction means outputs a first feature vector as the first image feature data. The second image feature extraction means comprises character image generation means for generating image data of a character image which is specified by the character code, based on the character code; and feature vector extraction means for extracting the image feature of the character image based on the image data of the character image so as to output a second feature vector indicating the image feature. The collation decision means includes distance calculation means for calculating the distance between the first feature vector and the second feature vector, and decides whether or not the character image codes match the character code, according to whether the calculated distance is larger than a predetermined threshold.

In the character collation apparatus according to the forty-third aspect, since it is decided whether or not the character image codes match the character code according to whether the distance between the feature vector which is added to the character image codes and the feature vector which is obtained from the character code is larger than a predetermined threshold, the collation between the character image codes and the character code is facilitated.

A data storage medium according to a forty-fourth aspect of the present invention is a storage medium containing an image processing program for making a computer perform image data processing, and the image processing program is a program for making a computer perform image processing of an apparatus of any one of the first through forty-third aspects, or a program for implementing, with a computer, the function of at least one means which constitutes an apparatus of any one of the first through forty-third aspects.

The data storage medium so constructed can implement an apparatus of any one of the first through forty-third aspects with software by loading the program into a computer.

A facsimile according to a forty-fifth aspect of the present invention comprises: a scanner for converting a target image to be transmitted into electronic data, and outputting the target image data; an image coding unit for coding the target image data so as to output image feature data indicating the feature of the target image as well as the coded data; a transmitter-receiver for adding the image feature data of the target image to the coded data of the target image, and transmitting/receiving composite data including the coded data and the image feature data through a communication line; an image decoding unit for receiving the coded data and the image feature data included in the composite data which is received by the transmitter-receiver, and decoding the coded data based on the basis of the image feature data so as to output target image data; and an image output unit for displaying or printing out the target image based on the target image data. The image coding unit is identical in structure to an image coding apparatus of any one of the second, eighth, ninth, fourteenth, seventeenth, eighteenth and thirty-third aspects.

In the facsimile according to the forty-fifth aspect, the image coding unit for coding the target image data performs the same coding process as described for an image coding apparatus of any one of the second, eighth, ninth, fourteenth, seventeenth, eighteenth and thirty-third aspects, whereby the coding efficiency of the coding process for the target image data is improved.

A facsimile according to a forty-sixth aspect of the present invention comprises: a scanner for converting a target image to be transmitted into electronic data, and outputting the target image data; an image coding unit for coding the target image data so as to output image feature data indicating the feature of the target image as well as the coded data; a transmitter-receiver for adding the image feature data relating to the coded data to the coded data, and transmitting and receiving composite data including the coded data and the image feature data through a communication line; an image decoding unit for receiving the coded data and the image feature data included in the composite data which is received by the transmitter-receiver, and decoding the coded data based on the image feature data so as to output target image data; and an image output unit for displaying or printing out the target image based on the target image data. The image decoding unit is identical in structure to an image decoding apparatus of any one of the fifth, twelfth, sixteenth and twentieth aspects.

In the facsimile according to the forty-sixth aspect, the image decoding unit for decoding the coded data of the target image performs the same decoding process as described for an image decoding apparatus of any one of the fifth, twelfth, sixteenth and twentieth aspects, whereby a decoding process which is adaptable to the efficient coding process for the target image data is realized.

A filing apparatus according to a forty-seventh aspect of the present invention comprises: a scanner for converting a target image to be filed into electronic data, and outputting the target image data; an image coding unit for coding the target image data, and outputting image feature data indicating the feature of the target image as well as the coded data of the target image; an image storage means for storing the coded data in association with the corresponding image feature data; a data reading means for reading coded data of a predetermined image and the corresponding image feature data from the image storage means based on an externally supplied character code as retrieval data; an image decoding means for decoding the read coded data by using the image feature data so as to restore the image data of the predetermined image; and an image output unit for displaying or printing out the predetermined image based on the image data. The image coding unit is identical in structure to an image coding apparatus of any one of the second, eighth, ninth, fourteenth, seventeenth, eighteenth and thirty-third aspects.

In the filing apparatus according to the forty-seventh aspect, the image coding unit for coding the target image data performs the same coding process as described for an image coding apparatus of any one of the second, eighth, ninth, fourteenth, seventeenth, eighteenth and thirty-third aspects, whereby the coding efficiency of the coding process for the target image data is improved.

According to a forty-eighth aspect of the present invention, there is provided a filing apparatus comprising: a scanner for converting a target image to be filed into electronic data, and outputting the target image data; an image coding unit for coding the target image data, and outputting image feature data indicating the feature of the target image as well as the coded data of the target image; an image storage means for storing the coded data in association with the corresponding image feature data; a data reading means for reading coded data of a predetermined image and the corresponding image feature data from the image storage means based on an externally supplied character code as retrieval data; an image decoding means for decoding the read coded data by using the image feature data so as to restore the image data of the predetermined image; and an image output unit for displaying or printing out the predetermined image based on the image data. The image decoding means is identical in structure to an image decoding apparatus of any one of the fifth, twelfth, sixteenth and twentieth aspects.

In the filing apparatus according to the forty-eighth aspect, the image decoding unit for decoding the coded data of the target image performs the same decoding process as described for an image decoding apparatus of any one of the fifth, twelfth, sixteenth and twentieth aspects, whereby a decoding process which is adaptable to the efficient coding process for the target image data is realized.

A filing apparatus according to a forty-ninth aspect of the present invention comprises: a scanner for converting a target image to be filed into electronic data, and outputting the target image data; an image coding unit for coding the target image data, and outputting image feature data indicating the feature of the target image as well as the coded data of the target image; a document image storage means for storing the coded data in association with the corresponding image feature data; a data reading means for reading coded data of a predetermined image and the corresponding image feature data from the image storage means based on an externally supplied character code as retrieval data; an image decoding means for decoding the read coded data by using the image feature data so as to restore the image data of the predetermined image; and an image output unit for displaying or printing out the predetermined image based on the image data. The data reading means includes a character collation apparatus of any one of the thirty-sixth through forty-third aspects.

In the filing apparatus according to the forty-ninth aspect, the data reading means, which reads the coded data corresponding to a predetermined image which is stored in the image storage means as well as the image feature data corresponding to this image based on the character code, which is externally inputted as retrieval data, includes a character collation apparatus of any one of the thirty-sixth through forty-third aspects. Therefore, when it is decided that the character image which is specified by the character code matches the additional information corresponding to the character image codes, the character image corresponding to the character image codes can be known by the inputted character code without decoding the character image codes, and this enables shape comparison between the character image corresponding to the character image codes and another character image.

BRIEF DESCRIPTION OF THE DRAWINGS

FIG. 15 is a block diagram for explaining an image coding apparatus according to a sixteenth embodiment of the present invention.

FIG. 25($a$) is a diagram illustrating a probability model which is used for arithmetic coding by the image coding apparatus according to the first embodiment, FIG. 25($b$) is a schematic diagram for explaining arithmetic coding using the probability model, and FIG. 25(c) is a diagram illustrating a binary decimal which is obtained by the arithmetic coding.

DETAILED DESCRIPTION OF THE INVENTION

Hereinafter, embodiments of the present invention will be described with reference to the drawings.

First Embodiment

Figure 1:
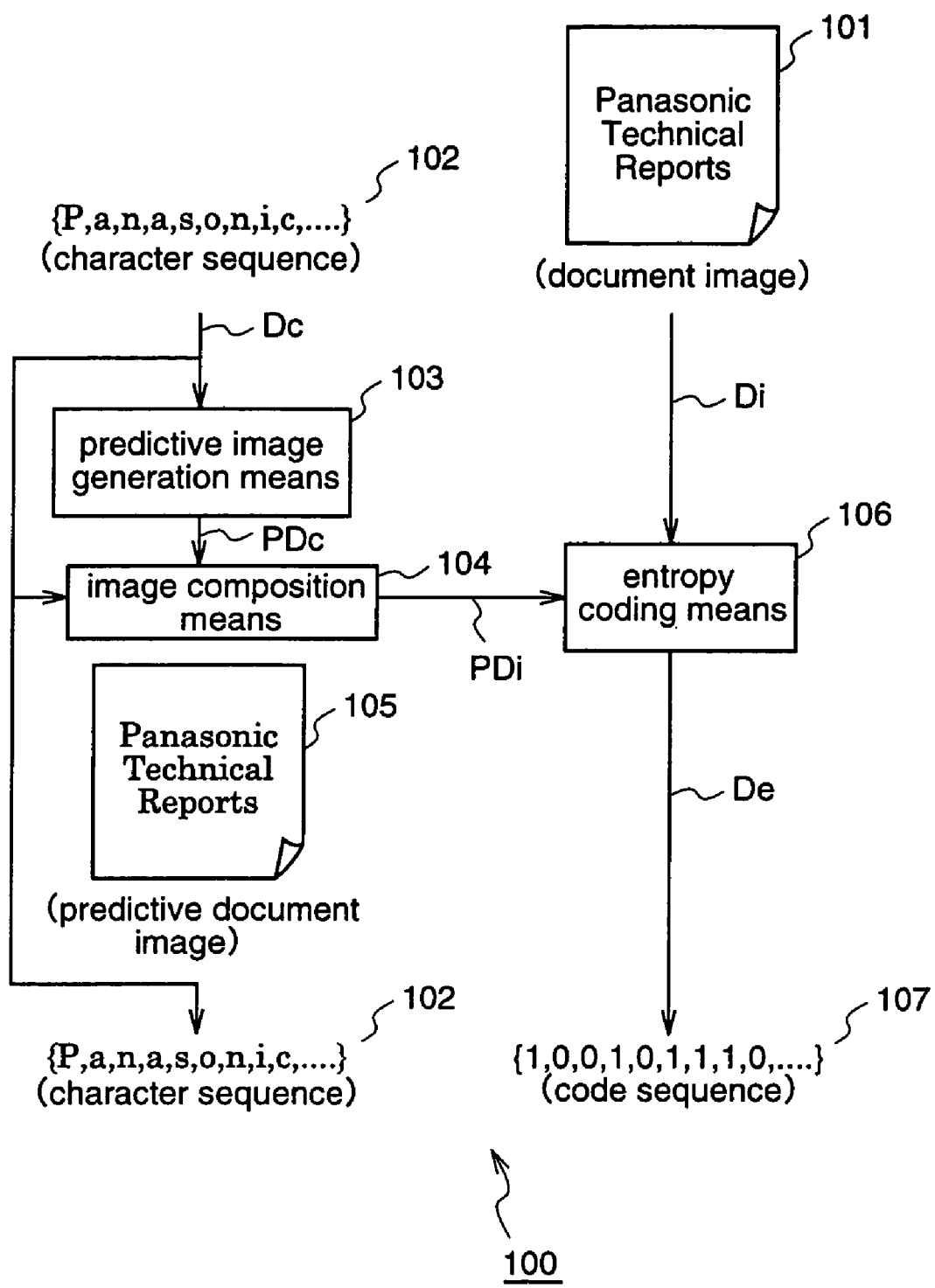
FIG. 1 is a block diagram for explaining an image coding apparatus according to a first embodiment of the present invention.

FIG. 1 is a block diagram illustrating the structure of an image coding apparatus according to a first embodiment of the present invention. This first embodiment corresponds to the invention of the first aspect described above.

An image coding apparatus 100 of this first embodiment receives document image data Di which is obtained by converting a document image 101 including Gothic type characters (image including characters) into electronic form by a scanner or the like, and encodes the document image data Di. For example, the image coding apparatus 100 is used as the image coding means 3902 in the document filing apparatus 3900 shown in FIG. 39. A document image includes, as its partial image, a character image comprising a character or a symbol, or a part of the character or symbol. Each character image is associated with character data. The reason why a document image includes a character image comprising a part of a character or symbol is because each part of one character or symbol is sometimes recognized as one character or symbol. For example, as for a Chinese character "化", its left-hand radical and its right-hand radical might be recognized as a Katakana character "イ" and a Chinese character "ニ", respectively.

The image coding apparatus 100 of this first embodiment includes a predictive image generation means 103 which receives character data Dc including auxiliary information indicating character codes corresponding to the respective characters in the document image 101, the sizes of the respective characters, and the positions of these characters in the document image 101. The predictive image generation means 103 predicts character images in the document image 101 based on the character codes by using Myocho style font information, and outputs predictive character image data PDc.

The image coding apparatus 100 further includes an image composition means 104 which composites the predictive character image data PDc based on the auxiliary information indicating the sizes and positions of the characters, which auxiliary information is included in the character data Dc, so as to generate predictive document image data PDi corresponding to a predictive document image 105 which corresponds to the document image and which includes only characters.

Further, the image coding apparatus 100 includes an entropy coding means 106 which performs arithmetic coding on the document image data Di with reference to the predictive document image data PDi so as to output a code sequence 107 as coded data De of the document image. The image coding apparatus 100 outputs, as well as the coded data De of the document image, character data Dc of the characters which are included in the document image. In FIG. 1, reference numeral 102 denotes a sequence of characters corresponding to the respective character codes which are included in the character data Dc.

Figure 39:
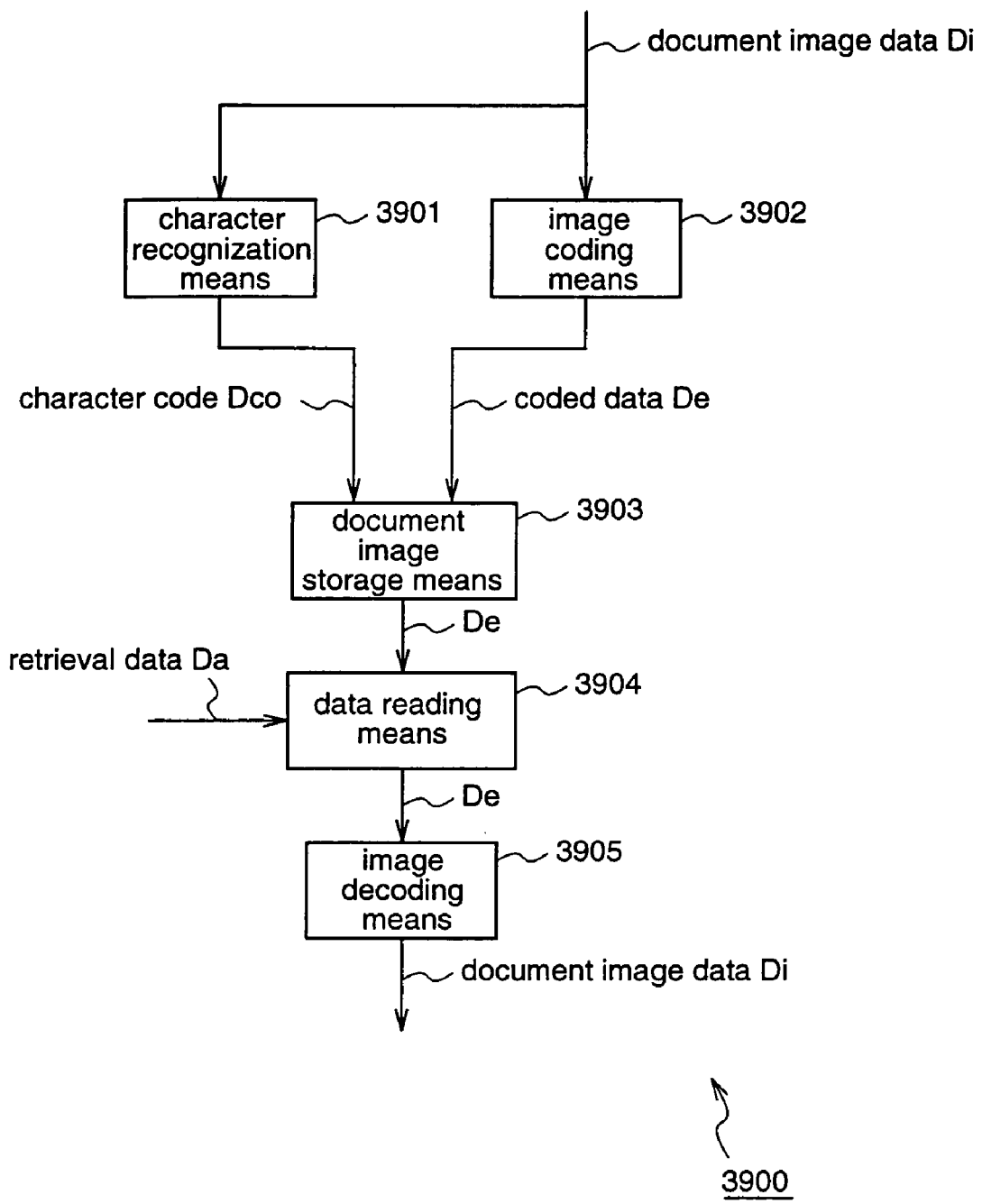
FIG. 39 is a block diagram for explaining the conventional document filing apparatus.

The character data Dc is, for example, extracted from the document image data Di by the character recognition means 3901 in the conventional document filing apparatus 3900 shown in FIG. 39, and the character data Dc includes auxiliary information indicating the character codes corresponding to the respective characters which are included in the document image, the positions of these characters in the document image, and the sizes of these characters.

Figure 24A:
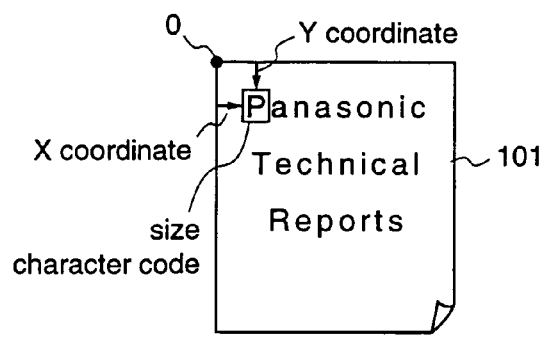
FIG. 24($a$) is a diagram illustrating XY coordinates corresponding to a character image according to the first embodiment, and FIG. 24($b$) is a diagram illustrating the structure of character data corresponding to a character sequence which included in the document image.

FIG. 24(*a*) is a diagram illustrating the X,Y coordinates of the above-mentioned document image, and FIG. 24(*b*) is a schematic diagram for explaining the structure of the character data Dc to be input to the predictive image generation means 103. The document image 101 includes a character sequence comprising Gothic type alphabetical characters "Panasonic Technical Reports", and the character data Dc includes the character codes corresponding to the respective characters constituting this character sequence as well as data indicating the positions and sizes of the respective characters.

That is, the code sequence 2400 constituting the character data Dc includes, for example, code sequences 2410, 2420, . . . , 2430 corresponding to the Myocho style alphabetical characters "P", "a", . . . , "s", respectively.

To be specific, the code sequence 2410 is composed of codes 2411*a* and 2411*b* respectively corresponding to the X coordinate and the Y coordinate showing the position of the character "F" on the XY coordinates with the upper left corner or the document image as an original 0, a code 2412 showing the size of the character "P", and a character code 2413 corresponding to the character "P". Further, the code sequence 2420 is composed of codes 2421*a* and 2421*b* respectively corresponding to the X coordinate and the Y coordinate showing the position of the character "a" on the XY coordinates, a code 2422 showing the size of the character "a", and a character code 2423 corresponding to the character "a". Further, the code sequence 2430 is composed of codes 2431*a* and 2431*b* respectively correspondingly to the X coordinate and the Y coordinate showing the position of the character "s" on the XY coordinates, a code 2432 showing the size of the character "s", and a character code 2433 corresponding to the character "s".

The operation of the image coding apparatus 100 will now be described.

When the image coding apparatus 100 of this first embodiment receives the binary image data (document image data) Di which is obtained by converting the document image 101 into electronic form by a scanner or the like and the character data Dc of the character images which are included in the document image 101, the predictive image generation means 103 generates data of predictive character images (predictive character image data) PDc corresponding to the respective characters which are included in the document image, from the character codes which are included in the character data Dc, by utilizing the font information, and outputs the generated predictive character image data PDc to the image composition means 104.

In the image composition means 104, the respective predictive character images are composited based on the auxiliary information indicating the positions and sizes of the respective characters which are included in the character data Dc, and predictive document image data PDi corresponding to a predictive document image 105 and comprising only the predictive character images are output to the entropy coding means 106. In the predictive document image 105, each predictive character image has a predetermined size and is arranged in a predetermined position, where the size and position are decided according to the auxiliary information.

In the entropy coding means 106, the document image data Di is subjected to arithmetic coding with reference to the predictive document image data PDi, and a code sequence 107 is output as coded data De corresponding to the document image 101.

Hereinafter, the arithmetic coding process will be described briefly.

The arithmetic coding is described in more detail in "International Standard of Multimedia Coding, Chapter 3, Arithmetic Coding, Hiroshi Yasuda, Maruzen Co. Ltd."

FIGS. 25(*a*), 25(*b*), and 25(*c*) are diagrams for explaining the principle of the arithmetic coding.

For example, in the arithmetic coding process, one binary decimal is obtained for a combination of pixel values corresponding to the respective pixels in a pixel sequence comprising a predetermined number of pixels, as coded data of a target image (image to be processed) comprising the predetermined number of pixels.

Especially, as shown in FIG. 25(*a*) the arithmetic coding process for binary image data employs three symbols "0", "1", and "EOF", and a probability model 2504 indicating the probabilities of occurrences of these symbols. The symbol "0" corresponds to a white pixel having a pixel value "0", the symbol "1" corresponds to a black pixel having a pixel value "1", and the symbol "EOF" indicates the end of the pixel sequence. In the probability model 2504, the probability of the symbol "EOF" is x, the probability of the symbol "0" is y, and the probability of the symbol "1" is z. However, x, y, z are real numbers which are equal to or larger than 0 and smaller than 1, satisfying x+y+z=1.

Hereinafter, with reference to FIG. 25(*b*), a description will be given of the arithmetic coding process for a target image to be processed which comprises two white pixels.

In this case, a symbol sequence 2505 corresponding to the pixel sequence comprises symbols "0", "0", and "EOT".

Initially, the ranges of the probabilities (probability ranges) of the respective symbols shown by the probability model 2504 are assigned onto a number line 2501 indicating a range which is equal to or larger than 0 and smaller than 1. In this case, since the first symbol in the symbol sequence 2505 is "0", the range of the probability y on the number line 2501 is obtained as a limited range R1.

Subsequently, the ranges of the probabilities of the respective symbols that are indicated by the probability model 2504 are assigned to the limited range R1 on the number line. In this case, since the second symbol in the symbol sequence 2505 is "0", a part of the limited range R1 corresponding to the probability y is obtained as a limited range R2.

Finally, the ranges of the probabilities of the respective symbols that are indicated by the probability model 2504 are assigned to the limited range R2 on the number line. In this case, since the third symbol in the symbol sequence 2505 is "EOF", a part of the limited range R2 corresponding to the probability x is obtained a3 a limited range R3.

Then, as a binary decimal indicating the limited range R3 on the number line 2501, a binary decimal 2503 having ten digits on the right of the decimal point, "0.0010101011", is obtained as shown in FIG. 25(c), and data indicating this value is output as coded data corresponding to the symbol sequence 2505. This binary decimal 2503 is a decimal having the smallest number of digits, which does not get out of the limited range R3 on the number line regardless of the number of digits that follow the last digit of the decimal.

Figure 26:
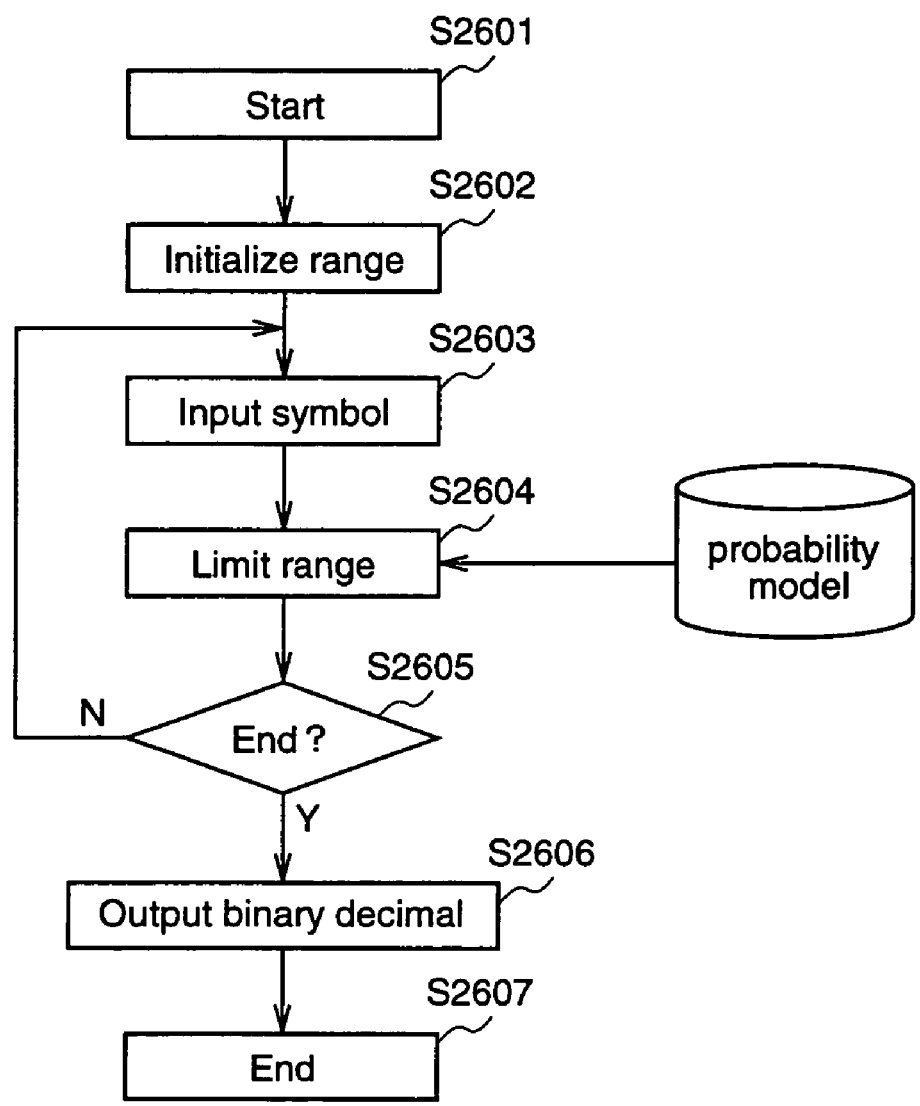
FIG. 26 is a diagram for explaining the flow of the arithmetic coding by the image coding apparatus according to the first embodiment.

FIG. 26 shows the flow of the general arithmetic coding process for binary image data.

When arithmetic coding is started (step S2601), the application range R(k) [k: natural number] of the number line to which the probability model is applied is initialized to $0 \leq R(1) < 1$ (step S2602). When each symbol as one of the components of the symbol sequence 2505 is input (step S2603), the range of the probability of this symbol in the probability model is assigned to the present application range R(k) of the number line, and the range of the probability of the inputted symbol in the present range R(k) is regarded as a new application range R(k+1) (step S2604).

Further, in step S2605, it is decided whether or not the inputted symbol is the end symbol, and when the inputted symbol is the end symbol, the application range limited by the symbol just before the end symbol is expressed by a binary decimal, and this binary decimal is output (step S2606). Thereby, the arithmetic coding is ended (step S2607).

On the other hand, when it is decided in step S2605 that the inputted symbol is not the end symbol, the next symbol in the symbol sequence is input (step S2603). If the number of symbols in the symbol line is predetermined, the end symbol "EOF" may be dispensed with.

Arithmetic decoding for the coded data corresponding to the symbol sequence is performed by deciding the symbol sequence from the binary decimal.

In the above-described arithmetic coding process, there is a tendency that the quantity of coded data corresponding to the symbol sequence decreases as the error between the probability of each symbol in the symbol sequence and the probability of each symbol that is indicated by the probability model becomes smaller, or as the deviation in the probabilities of the symbols in the symbol sequence becomes larger. Further, even if the probability model is altered while each symbol in one symbol sequence is being coded, the coded data of this symbol sequence can be decoded as long as the way of this alteration is known.

Figure 27:
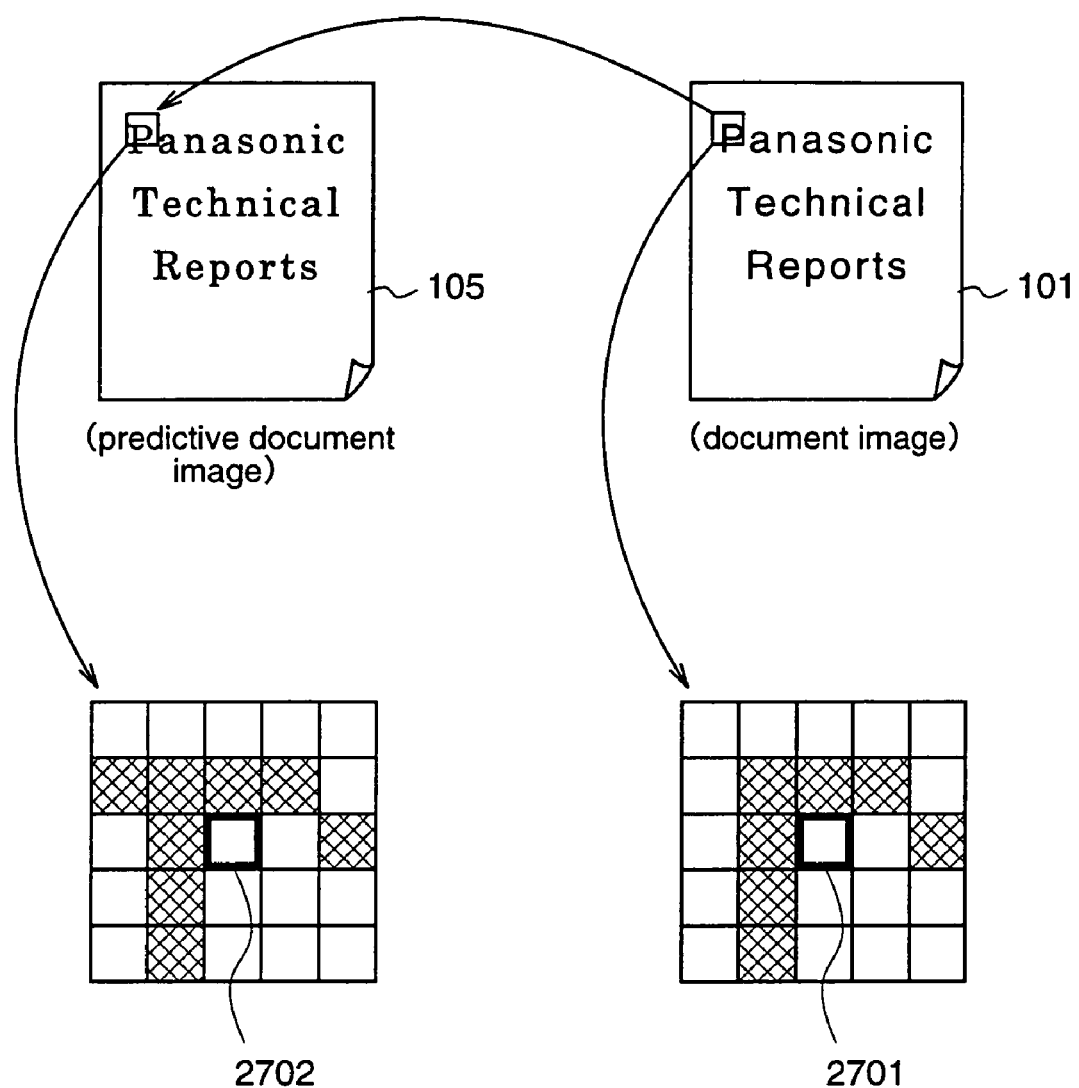
FIG. 27 is a diagram for explaining the correspondence between a predictive document image and a document image according to the first embodiment.

FIG. 27 is a diagram for explaining a specific method of performing arithmetic coding on the image data Di indicating the document image 101 with reference to the predictive document image 105.

In this case, a target symbol sequence to be coded comprises "0" or "1" pixel values which are obtained by performing transverse scanning from left to right of the document image 101, on the pixel values of the respective pixels of the document image 101, from the upper side to the lower side of the document image 101.

Then, the process of assigning the range of the probability of each symbol, which is given by the probability model, onto the number line is performed on all of the symbols in the symbol sequence, and data indicating a binary decimal corresponding to the limited range on the number line, which is obtained as the result of the assignment process, is regarded as coded data corresponding to the document image 101.

In this first embodiment, however, the probability model is changed according to the pixel values of the pixels corresponding to the target symbol in the predictive document image for each target symbol to be subjected to the assignment process.

Hereinafter, a description will be specifically given of how to change the probability model.

For example, as the pixels corresponding to the target symbol in the predictive document image, the following three pixels are employed: an equivalent-position pixel in the predictive document image, which is placed in the relatively equal position to the target pixel in the document image, a previous pixel positioned before the equivalent-position pixel, and a subsequent pixel positioned after the equivalent-position pixel.

The previous and subsequent pixels are positioned before and after the equivalent-position pixel in a pixel sequence which is obtained by subjecting the predictive document image to scanning which is identical to the scanning that is performed on the document image.

The combination of the pixel values of these three pixels has the following eight patterns, and each pattern is associated with a probability model in which the probabilities of white pixel, black pixel, and EOF are set.

(First Pattern)

All of the previous pixel, the equivalent-position pixel, and the subsequent pixel are white pixels.

In the probability model corresponding to this first pattern, the probability ranges for EOF, white pixel, and black pixel are set to (0, 0.05), (0.05, 0.95), and (0.95, 1.0), respectively.

(Second Pattern)

The previous pixel is a black pixel, and the equivalent-position pixel and the subsequent pixel are white pixels.

In the probability model corresponding to this second pattern, the probability ranges for EOF, white pixel, and black pixel are set to (0, 0.05), (0.05, 0.75), and (0.75, 1.0), respectively.

(Third Pattern)

The previous pixel and the equivalent-position pixel are white pixels, and the subsequent pixel is a black pixel.

In the probability model corresponding to this third pattern, the probability ranges for EOF, white pixel, and black pixel are set to (0, 0.05), (0.05, 0.7), and (0.7, 1.0), respectively.

(Fourth Pattern)

The previous pixel and the subsequent pixel are white pixels, and the equivalent-position pixel is a black pixel.

In the probability model corresponding to this fourth pattern, the probability ranges for EOF, white pixel, and black pixel are set to (0, 0.05), (0.05, 0.65), and (0.65, 1.0), respectively.

(Fifth Pattern)

The previous pixel and the subsequent pixel are black pixels, and the equivalent-position pixel is a white pixel.

In the probability model corresponding to this fifth pattern, the probability ranges for EOF, white pixel, and black pixel are set to (0, 0.05), (0.05, 0.45), and (0.45, 1.0), respectively.

(Sixth Pattern)

The previous pixel and the equivalent-position pixel are black pixels, and the subsequent pixel is a white pixel.

In the probability model corresponding to this sixth pattern, the probability ranges for EOF, white pixel, and black pixel are set to (0, 0.05), (0.05, 0.4), and (0.4, 1.0), respectively.

(Seventh Pattern)

The previous pixel is a white pixel, and the equivalent-position pixel and the subsequent pixel are black pixels.

In the probability model corresponding to this seventh pattern, the probability ranges for EOF, white pixel, and black pixel are set to (0, 0.05), (0.05, 0.35), and (0.35, 1.0), respectively.

(Eighth Pattern)

All of the previous pixel, the equivalent-position pixel, and the subsequent pixel are black pixels.

In the probability model corresponding to this eighth pattern, the probability ranges for EOF, white pixel, and black pixel are set to (0, 0.05), (0.05, 0.15), and (0.15, 1.0), respectively.

For example, in the process of assigning the probability range onto the number line with respect to the target pixel 2701 in the document image 101 shown in FIG. 27, since the equivalent-position pixel in the corresponding predictive document image is a white pixel and its previous and subsequent pixels are a black pixel and a white pixel, respectively, the probability model set for the above-described second pattern is used. In this case, since the target pixel is a white pixel, a range indicated by (0.05, 0.75) in the present limited range on the number line becomes a new limited range.

The process of limiting the probability range on the number line while changing the probability model according to the pixel value of each pixel in the predictive document image is performed on each pixel of the document image, from the head pixel to the EOF. Thereby, a binary decimal indicating the finally limited probability range is output as an entropy code (coded data) corresponding to the document image.

As described above, according to the first embodiment of the present invention, the predictive document image 105 corresponding to the document image 101 is created based on the character data Dc which is extracted from the data Di of the document image 101, and the document image data Di is subjected to the arithmetic coding process in which the probability model is changed with reference to the predictive document image data PDi. Therefore, the probabilities of white pixels and black pixels which are indicated by the probability model become very near to those in the document image, whereby the coding efficiency for the document image data in the arithmetic encoder is improved.

Further, in the character data Dc, each character in the document image includes one character code. Therefore, character data that is obtained by character recognition for the document image is prevented from being redundant.

Second Embodiment

Figure 2:
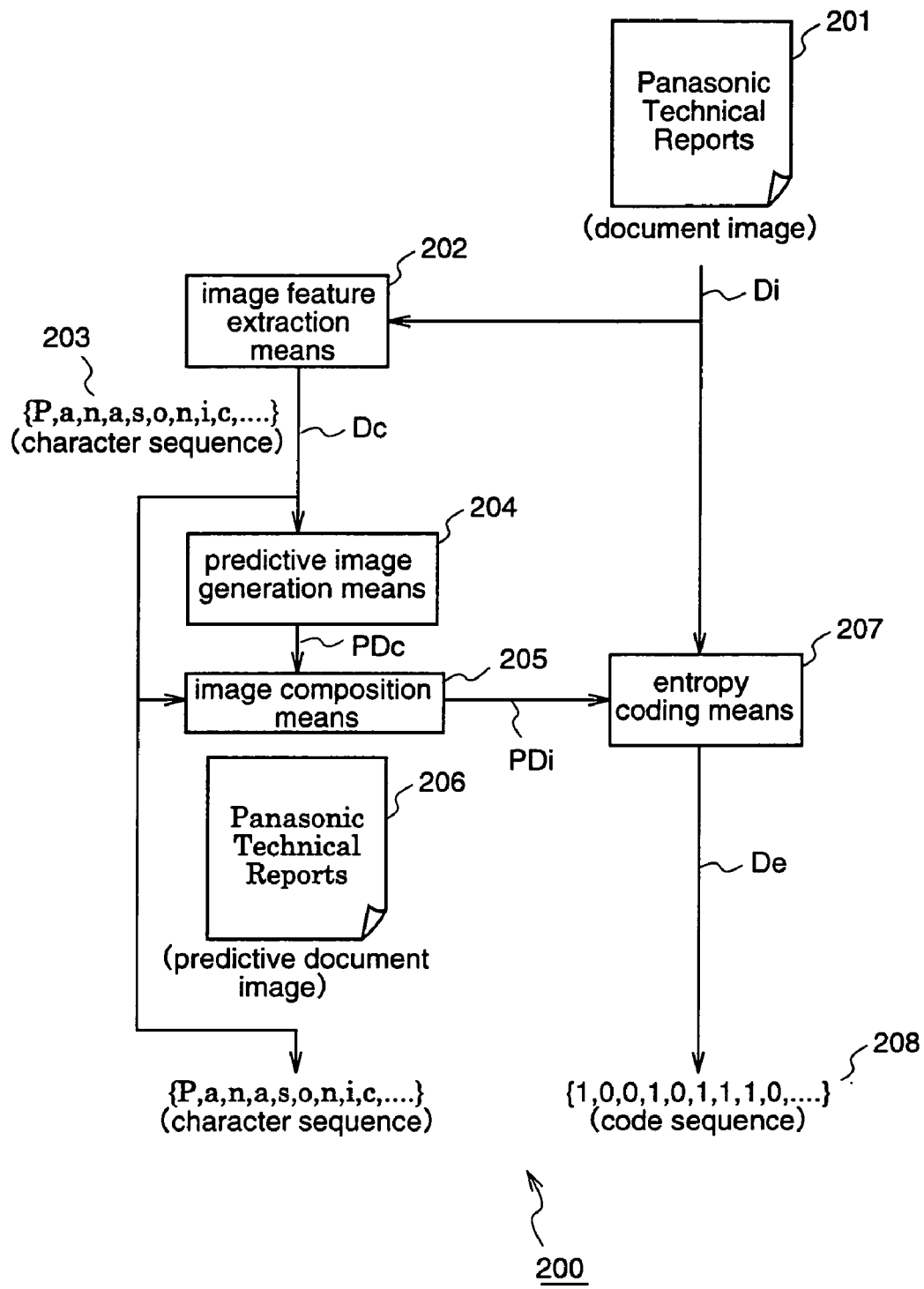
FIG. 2 is a block diagram for explaining an image coding apparatus according to a second embodiment of the present invention.

FIG. 2 is a block diagram illustrating the structure of an image coding apparatus according to a second embodiment of the present invention. This second embodiment corresponds especially to the second aspect described above.

An image coding apparatus 200 according to this second embodiment is used as an image coding means in a data processing apparatus which performs storage and transmission/reception of image data, for example, an electronic device having a scanner, such as the document filing unit 3900 shown in FIG. 39 or a facsimile.

Figure 24B:
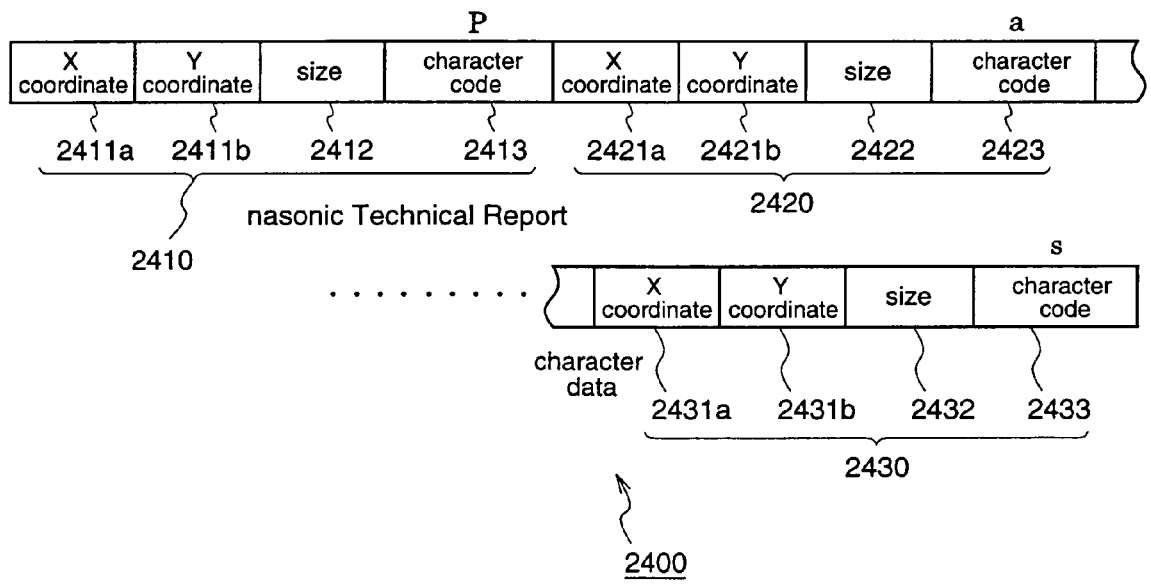

The image coding apparatus 200 of this second embodiment includes an image feature extraction means 202 which receives document image data Di (binary image data which is obtained by converting a document image 201 into electronic form with a scanner or the like), and extracts character data Dc comprising a code sequence 2400, as shown in FIG. 24(b), from the document image data Di. This image feature extraction means 202 is a character recognition apparatus performing character recognition by a general method used by an OCR or the like, and the character data Dc includes character codes (image features) corresponding to the respective character images in a character sequence 203 in the document image as well as and auxiliary information indicating the positions and sizes of the respective characters in the document image.

The image coding apparatus 200 further includes, similar to the image coding apparatus 100 of the first embodiment, a predictive image generation means 204 which predicts character images corresponding to the respective characters in the document image based on the character codes that are included in the character data Dc, and which outputs the data (predictive character image data) PDc. Furthermore, similar to the image coding apparatus 100, the image coding apparatus 200 includes an image composition means 205 which arranges the predictive character images corresponding to the respective characters in a predetermined image space based on the predictive character image data PDc and the auxiliary information, which indicates the positions and sizes of the characters, generates a predictive document image 206 comprising the predictive character images corresponding to the respective characters, and outputs the data (predictive document image data) PDi.

Further, the image coding apparatus 200 includes an entropy coding means 207 which performs arithmetic coding on the document image data Di with reference to the predictive document image data PDi by utilizing the correlation between the predictive document image 206 and the document image 201, and outputs a code sequence 208 as coded data De corresponding to the document image. The image coding apparatus 200 outputs, as well as the coded data De corresponding to the document image, character data Dc corresponding to the characters which are included in the document image.

The predictive image generation means 204, the image composition means 205, and the entropy coding means 207 in the image coding apparatus 200 of this second embodiment are respectively identical to the predictive image generation means 103, the image composition means 104, and the entropy coding means 106 constituting the image coding apparatus 100 of the first embodiment.

The operation of the image coding apparatus 200 of the second embodiment will now be described.

As described for the first embodiment, the document image data Di to be coded is binary image data which is obtained by converting the document image 201 into electronic form with a scanner or the like, and the document image 201 includes, as its partial images, character images each comprising a character, symbol, or a part of a character or symbol.

When the document image data Di is input to the image coding apparatus 200 of this second embodiment, the image feature extraction means 202 extracts, from the document image data Di, the character codes corresponding to the respective characters in the document image 201, as well as the auxiliary information indicating the positions and sizes of the characters in the document image, and outputs the character data Dc including the character code and the auxiliary information to the predictive image generation means 204. The construction of the character data Dc is identical to that shown in FIG. 24(b). Further, the image feature extraction means 202 is a character recognition apparatus which performs, recognition on the characters which are included in the document image by a general method that is employed for OCR or the like, and in this second embodiment, a description for a specific extraction method is omitted.

In the predictive image generation means 204, data of predictive character images (predictive character image data PDc) corresponding to the respective characters which are included in the document image are generated from the character codes which are included in the character data Dc by utilizing the font information, and the generated data PDc are output to the image composition means 205. In the image composition means 205, the predictive character images are composited based on the auxiliary information that is included in the character data Dc, and data corresponding to the predictive document image 206 (predictive document image data PDi) is output to the entropy coding means 207. In the predictive document image 206, each predictive character image having a predetermined size is arranged in a predetermined position, where the size and position depend on the auxiliary information.

In the entropy coding means 207, as in the entropy coding means 106 of the first embodiment, the electronic data of the document image 201, i.e., the document image data Di, is subjected to arithmetic coding with reference to the predictive document image data PDi, and the corresponding code sequence 208 is output as coded data De.

As described above, the image coding apparatus 200 of this second embodiment is provided with the image feature extraction means 202 for extracting the character data Dc from the document image data Di, in addition to the constituents of the image coding apparatus 100 of the first embodiment. Therefore, in addition to the effect of the first embodiment that the coding efficiency is improved without degrading the facility in retrieving the document image, extraction of the character data Dc from the character image data Di is automatically carried out, whereby an image coding apparatus which is available as an image coding means in a facsimile or the like is obtained.

Further, since the image feature extraction means 202 extracts, as the character data Dc, one character code for each character in the document image, the character data which is obtained by character recognition on the document image is prevented from being redundant.

Third Embodiment

Figure 3:
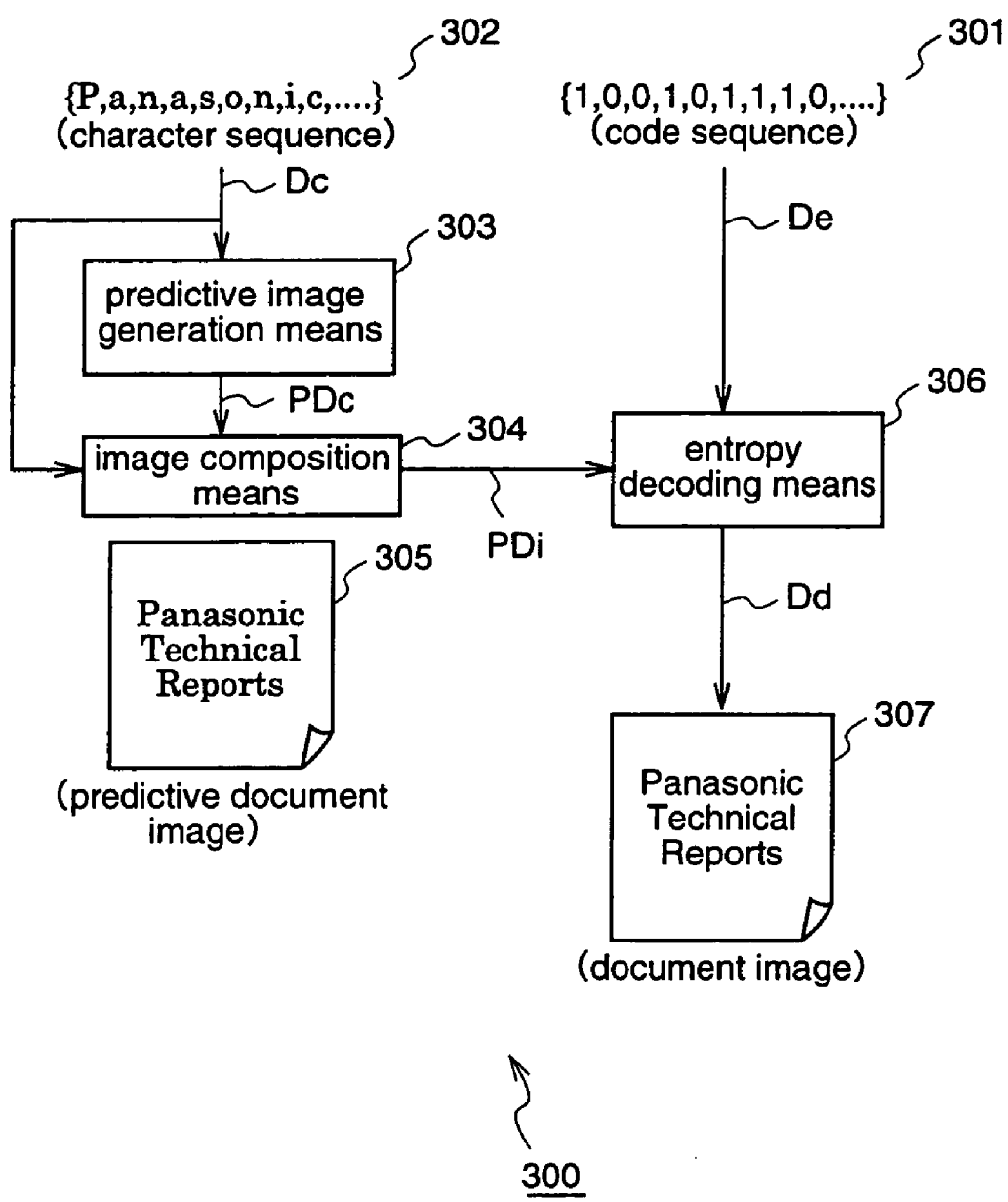
FIG. 3 is a block diagram for explaining an image decoding apparatus according to a third embodiment of the present invention.

FIG. 3 is a block diagram for explaining an image decoding apparatus according to a third embodiment of the present invention. This third embodiment corresponds to the fifth aspect described above.

An image decoding apparatus 300 of this third embodiment corresponds to the image coding apparatus 100 or 200 according to the first or second embodiment, and is used as an image decoding means in the document filing apparatus 3900 shown in FIG. 39 or in a facsimile.

That is, the image decoding apparatus 300 receives coded data De and character data Dc which are outputted from the image coding apparatus 100 or 200 according to the first or second embodiment, and decodes the coded data De based on the character data Dc so as to restore document image data Di corresponding to a document image 301 as decoded data Dd corresponding to a document image 307.

To be specific, the image decoding apparatus 300 of this third embodiment includes a predictive image generation means 303 which receives the character data Dc corresponding to the respective characters in the character sequence 302, predicts character images in the document image based on the character codes (image features) which are included in the character data Dc by utilizing the font information, and outputs the data of the predictive character images (predictive character image data PDc). The image decoding apparatus 300 also includes an image composition means 304 which composites the predictive character image data PDc based on the auxiliary information, which indicates the positions and sizes of the respective characters and which is included in the character data Dc, so as to generate predictive document image data PDi corresponding to a predictive document image 305 including only characters corresponding to the document image.

Further, the image decoding apparatus 300 includes an entropy decoding means 306 which receives, as a code sequence 301, coded data De that is obtained by arithmetic coding utilizing the correlation between the predictive document image and the document image, performs arithmetic decoding on the coded data De with reference to the predictive document image data PDi, and outputs document image data Dd corresponding to the document image 307.

Hereinafter, the operation of the decoding apparatus 300 of the third embodiment will be described.

When the coded data De and the character data Dc are input to the image decoding apparatus 300 of this third embodiment, the predictive image generation means 303 generates data of predictive character images (predictive character image data) PDc corresponding to the respective characters which are included in the document image, from the character codes which are included in the character data Dc by utilizing the font information, and outputs the predictive character image data PDc to the image composition means 304. In the image composition means 3U4, the respective predictive character images are composited based on the auxiliary information which is included in the character data Dc, and predictive document image data PDi corresponding to a predictive document image 305 is output to the entropy decoding means 306.

In the entropy decoding means 306, the coded data De is subjected to arithmetic decoding with reference to the predictive document image data PDi, and document image data Dd corresponding to the document image 307 is output.

Similar to the entropy coding means according to the first or second embodiment, the entropy decoding means 306 performs switching of the probability model, and decoding on the coded data which is outputted from the entropy encoder.

For example, when the combination of the pixel values of three pixels in the predictive document image corresponding to these pixels in the document image is the second pattern described above for the first embodiment, the entropy decoding means 306 employs the probability model in which the probability ranges of EOF, white pixel, and black pixel are set at (0, 0.05), (0.05, 0.75), and (0.75, 1.0), respectively.

As described above, in the image decoding apparatus 300 according to the third embodiment, a predetermined document image is predicted based on character data Dc corresponding to characters which are included in the predetermined document image so as to generate predictive document image data PDi corresponding to a predictive document image, and coded data De of the predetermined document image is subjected to arithmetic decoding with reference to the predictive document image data PDi. Therefore, it is possible to realize a decoding process which is adapted to the efficient arithmetic coding process that is performed on the document image data Di by using the predictive document image data PDi.

Further, the image decoding apparatus 300 of this third embodiment can be applied to a facsimile or a document filing apparatus, in conjunction with the image coding apparatus 200 of the second embodiment.

Hereinafter, a brief description will be given of a facsimile which is provided with the image coding apparatus of the second embodiment and the image decoding apparatus of the third embodiment.

FIG. 41(*a*) is a block diagram for explaining a facsimile 10 as described above.

The facsimile 10 includes a scanner 11 which reads a document image 201 to output electronic data (document image data) Di, an image coding unit 200*a* which performs coding on the document image data Di to output coded data De and character data Dc corresponding to characters which are included in the document image, and a transmitter-receiver 12 which combines the coded data De with the relating character data Dc and transmits/receives composite data Dm including the coded data De and the character data Dc through a telephone line 15. The image coding unit 200*a* is identical in structure to the image coding apparatus 200 according to the second embodiment.

The facsimile 10 further includes an image decoding unit 300*a* which receives the coded data De and the character data Dc included in the composite data Dm which is received by the transmitter-receiver 12 through the telephone line 15, and decodes the coded data De based on the character data Dc so as to output document image data Dd. The facsimile 10 also includes an image output unit 13 which performs a display or printout of the document image based on the document image data Dd. The image decoding unit 300*a* is identical in structure to the image decoding apparatus 300 according to the third embodiment.

In the facsimile 10 so constructed, the electronic data of the document image 201 (document image data Di) can be efficiently converted to coded data by using the character data corresponding to the characters which are included in the document image by the image coding unit 200*a* and, further, the coded data De outputted from the image coding unit 200*a*, to which the data Dc for document image retrieval is added, can be transmitted.

Further, when the facsimile 10 receives the composite data including the character data Dc and the coded data De which is obtained by coding the document image data Di by using the character data Dc, the coded data De can be correctly decoded by using the character data Dc.

Next, a brief description will be given of a document filing apparatus which is provided with the image coding apparatus of the second embodiment and the image decoding apparatus of the third embodiment.

FIG. 41(*b*) is a block diagram for explaining a document filing apparatus 20 as described above.

The document filing apparatus 20 includes a scanner 21 which reads a document image 201 to output electronic data (document image data) Di, an image coding unit 200*a* which performs coding on the document image data Di to output coded data De and character data Dc corresponding to characters which are included in the document image, and a document image storage means 22 which stores the coded data De and the corresponding character data Dc in association with each other. The image coding unit 200*a* is identical in structure to the image coding apparatus 200 according to the second embodiment.

The document filing apparatus 20 further includes a data reading means 23 which reads coded data De corresponding to a predetermined image stored in the document image storage means 22, together with the corresponding character data Dc, based on character codes which are externally inputted as retrieval data Da, an image decoding unit 300*a* which decodes the read coded data De by using the character data Dc to restore the document image data Di corresponding to the predetermined document image, and an image output unit 13 which performs a display or printout of the document image based on the document image data Dd. The image decoding unit 300*a* is identical in structure to the image decoding apparatus 300 according to the third embodiment.

In the document filing apparatus 20 so constructed, the electronic data of the document image 201 (document image data Di) can be efficiently converted to coded data by using the character data corresponding to the characters which are included in the document image by the image coding unit 200*a* and, further, the coded data De outputted from the image coding unit 200*a*, to which the data Dc for document image retrieval is associated with, can be stored.

Further, in the document filing apparatus 20, it is possible to read the coded data De, which is obtained by coding the document image data Di by using the character data Dc, from the document image storage means by collating the externally inputted retrieval data with the character data Dc.

Fourth Embodiment

Figure 4:
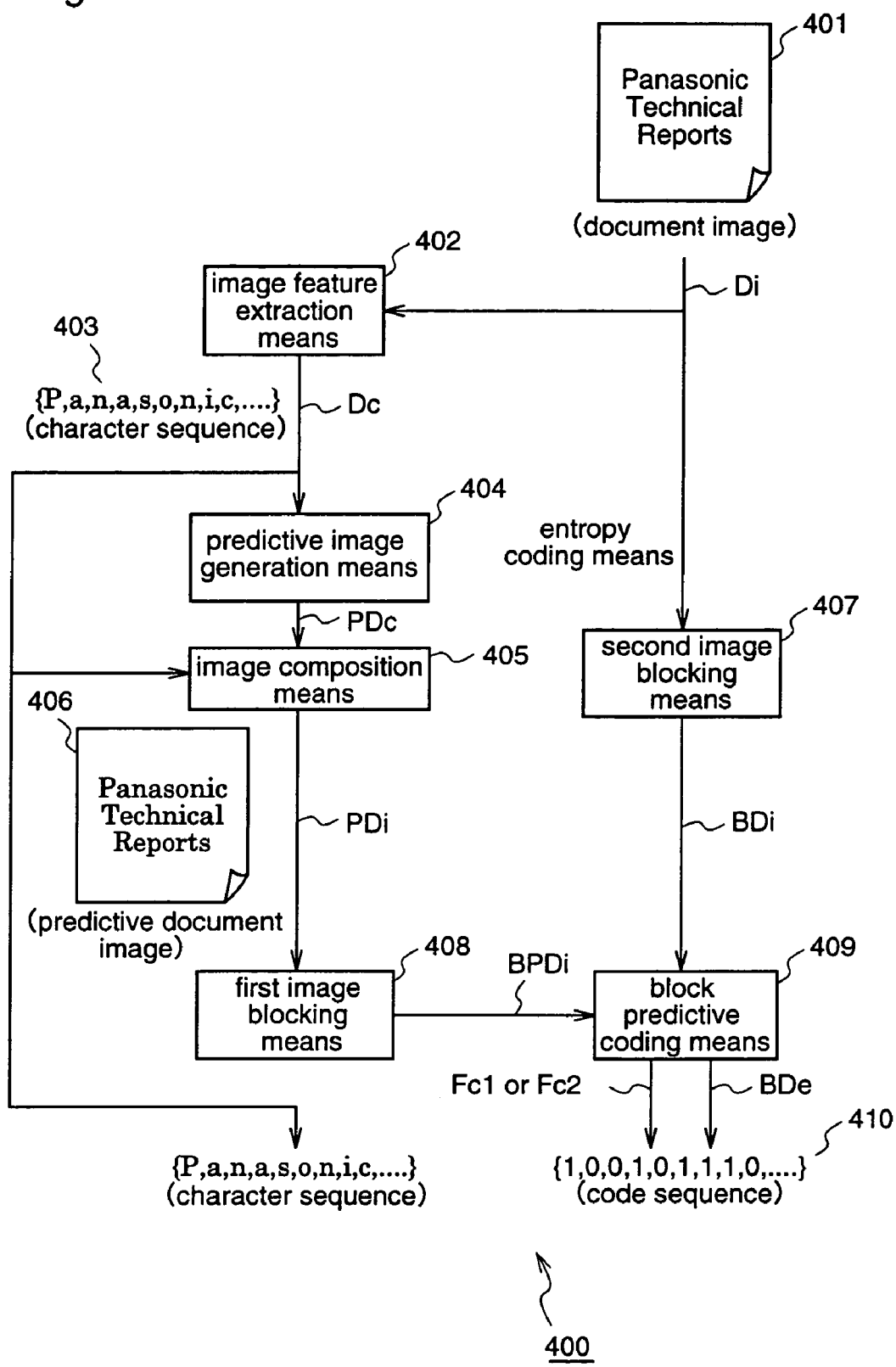
FIG. 4 is a block diagram for explaining an image coding apparatus according to a fourth embodiment of the present invention.

FIG. 4 is a block diagram illustrating the structure of an image coding apparatus according to a fourth embodiment of the present invention. This fourth embodiment corresponds to the third aspect described above.

An image coding apparatus 400 according to this fourth embodiment is used as an image coding means in a data processing apparatus performing storage and transmission/reception of image data, for example, an electronic device having a scanner, such as the document filing apparatus 3900 shown in FIG. 39 or a facsimile.

The image coding apparatus 400 of this fourth embodiment includes an image feature extraction means 402 which receives document image data Di (binary image data which is obtained by converting a document image 401 into electronic form with a scanner or the like), and extracts character data Dc from the document image data Di; a predictive image generation means 404 which outputs predictive character image data PDc based on character codes which are included in the character data Dc; and an image composition means 404 which generates a predictive document image 406 including predictive character images corresponding to the respective characters based on the predictive character image data PDc and auxiliary information included in the character data Dc, and outputs its data (predictive document image data) PDi.

The image feature extraction means 402, the predictive image generation means 404, and the image composition means 405 are identical to the corresponding means 202, 204, and 205 of the image coding apparatus 200 according to the second embodiment.

The image coding apparatus 400 further includes a first image blocking means 408 which divides the predictive document image 406 into image spaces each having a predetermined size (predictive document image blocks), and outputs image data (predictive block data) BPDi for each block; and a second, image blocking means 407 which divides the document image 401 into image spaces having a predetermined size (document image blocks), and outputs image data (block data) BDi for each block. Each of the document image blocks and the predictive document image blocks is an image space comprising 16×16 pixels.

Furthermore, the image coding apparatus 400 includes a block predictive coding means 409 which compares pixel values between the predictive document image block and the document image block based on the predictive block data BPDi and the block data BDi, performs arithmetic coding on the block data BDi by using the predictive block data BPDi when a difference in pixel values compared is larger than a predetermined value, and outputs coded data BDe and a coding flag Fc1. On the other hand, when a difference in pixel values compared between the predictive document image block and the document image block is smaller than the predetermined value, the block predictive coding means 409 does not perform arithmetic coding on the block data BDi, and outputs a non-coding flag Fc0.

The operation of the image coding apparatus 400 of the fourth embodiment will now be described.

The document image data Di to be coded is binary image data which is obtained by converting the document image 401 into electronic form using a scanner or the like, and the document image 401 includes, as partial images, character images each comprising a character or a symbol, or a part of a character or symbol.

When the document image data Di is input to the image coding apparatus 400 of the fourth embodiment, the image feature extraction means 402 extracts, from the document image data Di, character codes corresponding to the respective characters in the document image 401 and auxiliary information indicating the positions and sizes of the characters in the document image, and outputs character data Dc including the character codes and the auxiliary information to the predictive image generation means 404.

In the predictive image generation means 404, predictive character image data PDc is generated from the character codes which are included in the character data Dc, and the data PDc so generated is output to the image composition means 405. In the image composition means 405, the respective predictive character images are composited based on the auxiliary information, and data corresponding to a predictive document image 406 (predictive document image data) PDi is output to the first image blocking means 408.

In the first image blocking means 408, the predictive document image is divided into blocks each having a predetermined size based on the predictive character image data PDc, and predictive block data BPDi corresponding to each block is output to the block predictive coding means 409.

At this time, the document image data Di is output to the second image blocking means 407, wherein the document image is divided into blocks each having a predetermined size based on the character image data Dc, and block data PDi corresponding to each block is output to the block predictive coding means 409.

In each blocking means 407 and 408, the predictive document image or the document image is divided into blocks each comprising 16×16 pixels.

In the block predictive coding means 409, the block data BDi is subjected to arithmetic coding with reference to the predictive block data BPDi, based on the predictive block data BPDi and the block data BDi.

Figure 28:
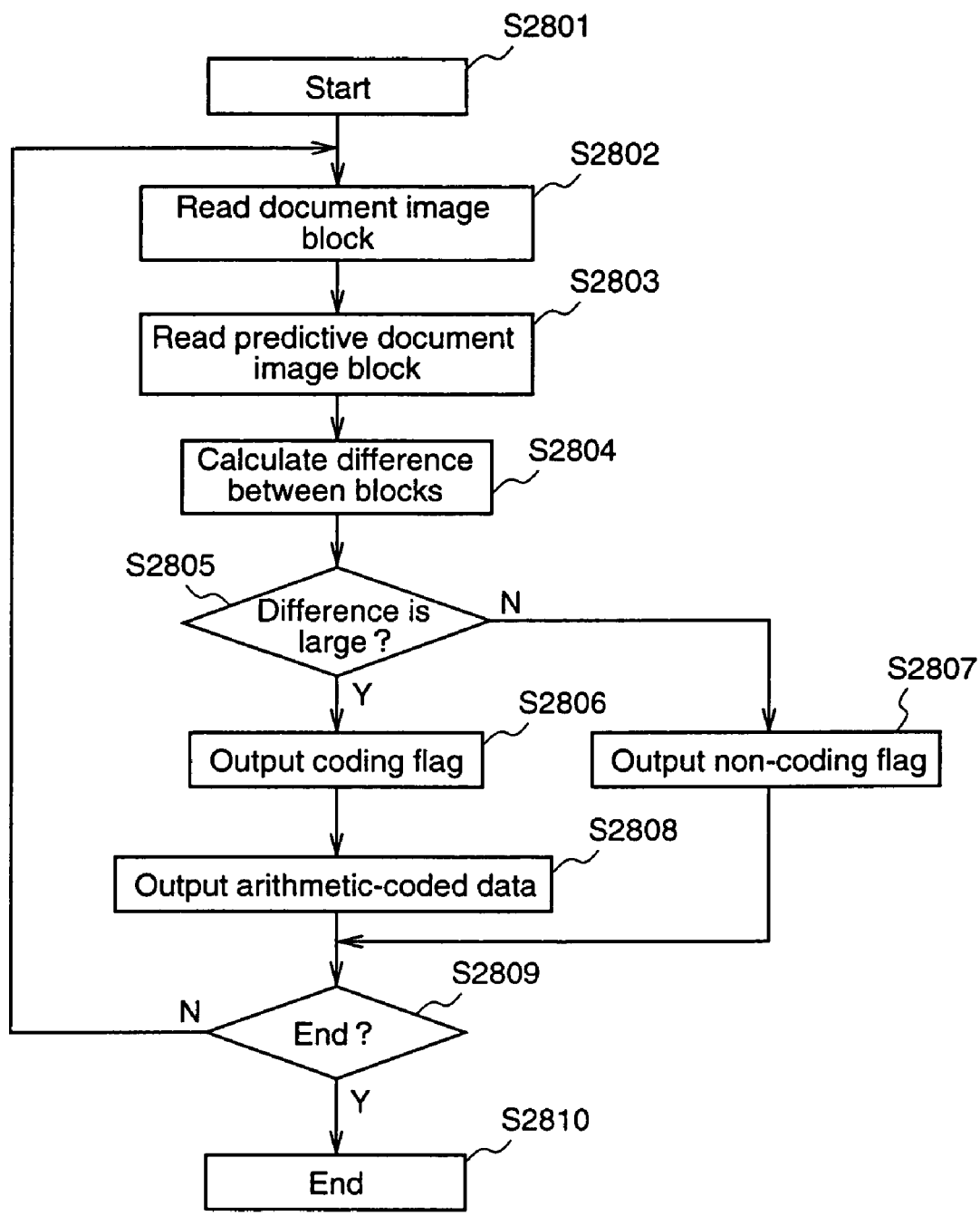
FIG. 28 is a diagram for explaining the flow of the process which is performed by a block predictive coding means according to the fourth embodiment.

FIG. 28 is a diagram illustrating the flow of the coding process which is performed by the block predictive coding means 409.

Initially, the block data BDi of a document image block outputted from the second blocking means 401 is read into the block predictive coding means 409 (step S2802), and the predictive block data BPDi of the corresponding predictive document image block is read into the block predictive coding means 409 (step S2803).

Next, differences in pixel values of corresponding pixels are obtained between the read blocks, and the sum of the absolute values of these differences is calculated (step S2804). When the absolute value of the difference is equal to or larger than a threshold (in this case, the threshold is 7), it is decided that the prediction error is large; on the other hand, when the absolute value of the difference is smaller than the threshold (in this case, 7), it is decided that the prediction error is small (step S2805).

Based on the result of this decision, when the prediction error is equal to or larger than the threshold, a coding flag Fc1 having a value "1" is output from the block predictive coding means 409 (step S2806), and the image data of the document image block is subjected to arithmetic coding with reference to the image data of the predictive document image block, whereby coded data De of the document image block is output (step S2808).

On the other hand, when the decision in step S2805 is that the prediction error is smaller than the threshold, a non-coding flag Fc0 having a value "0" is output from the block predictive coding means 409 (step S2807).

Then, it is decided whether or not a target block, which is being processed by the block predictive coding means 409, is the last document image block in the document image (step S2809). When the target block is the last document image block, the coding process is ended (step S2810). When the target block is not the last document image block, the following block is subjected to the processes in steps S2802 through S2809.

Figure 29:
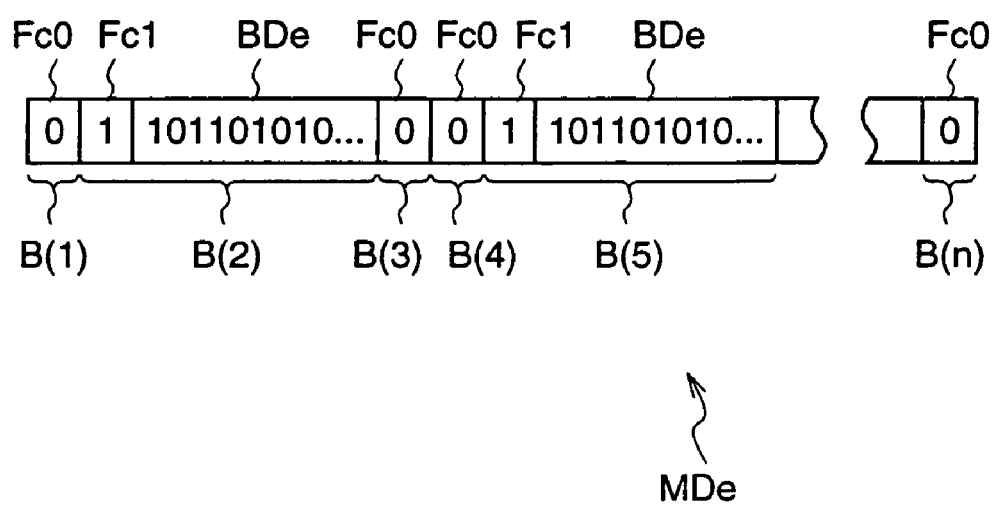
FIG. 29 is a schematic diagram for explaining data that is coded by the block predictive coding means according to the fourth embodiment.

FIG. 29 shows the Corm of composite data MDe including coded data BDe and flags Fc1 and Fc0 corresponding to the respective image blocks, which composite data MDe is output from the block predictive coding means 409.

This composite data MDe includes code sequences S(1), B(2), B(3), B(4), B(5), . . . , B(n) corresponding to the first, second, third, fourth, fifth, . . . , n-th image blocks, respectively.

The code sequences B(1), B(3), B(4), . . . , B(n) are composed of non-coding flags Fc0 having values of "0". The code sequences B(2) and B(S) are composed of coding flags Fc1 having values of "1" and arithmetic codes BDe corresponding to the data of the second and fifth image blocks, respectively.

As described above, according to the fourth embodiment, a predictive document image is generated based on character data corresponding to characters which are included in a document image, and the predictive document image is divided into predictive document blocks each having a predetermined size. Further, the document image is divided into document blocks each having a predetermined size, and image data of each document block is subjected to arithmetic coding with reference to image data of the corresponding predictive document block. At this time, a difference in pixel values between each document block and the corresponding predictive document block is compared with a predetermined threshold, and only the coded data of document blocks having the differences larger than the threshold are transmitted. Therefore, the coding efficiency is greatly improved by neglecting small differences in the block by block comparison, without giving, to the viewer, the impression that the image quality is degraded.

Fifth Embodiment

Figure 5:
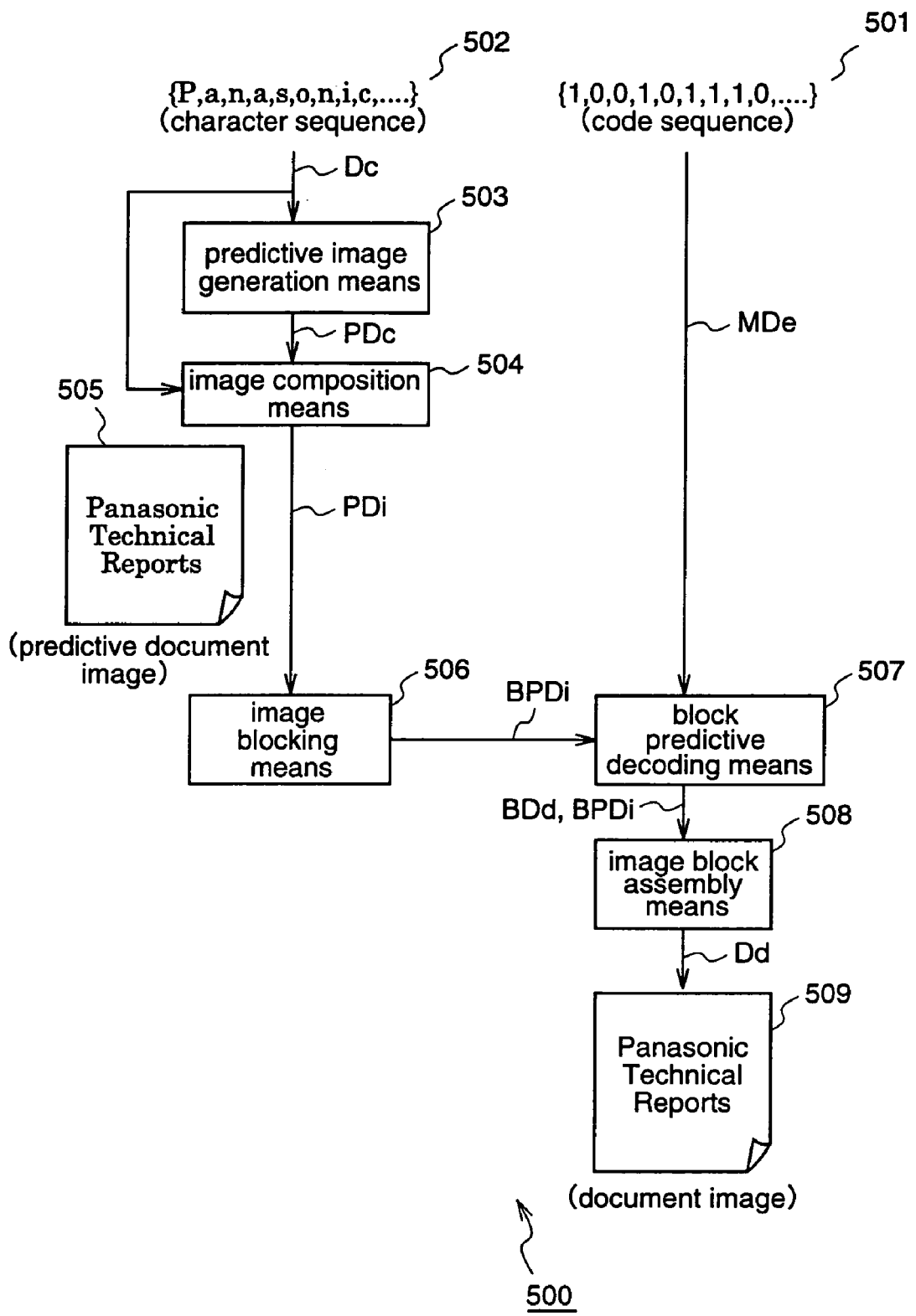
FIG. 5 is a block diagram for explaining an image decoding apparatus according to a fifth embodiment of the present invention.

FIG. 5 is a block diagram illustrating the structure of an image decoding apparatus according to a fifth embodiment of the present invention. This fifth embodiment corresponds to especially to the sixth aspect described above.

An image decoding apparatus 500 of this fifth embodiment is adaptable to the image coding apparatus 400 of the fourth embodiment, and the image decoding apparatus 500 is used as an image decoding means in an electronic device having a scanner, such as the document filing apparatus 3900 shown in FIG. 39 or a facsimile.

That is, the image decoding apparatus 500 receives the composite data MDe and the character data Dc outputted from the image coding apparatus 400 of the fourth embodiment, and decodes the coded block data BDe included in the composite data MDe based on the character data Dc and the flags Fc1 and Fc0 which are included in the composite data MDe so as to restore the document image data Di corresponding to the document image 509.

To be specific, the image decoding apparatus 500 includes a predictive image generation means 503 which receives the character data Dc corresponding to the respective characters in the character sequence 502, predicts character images in the document image based on the character codes (image features) which are included in the character data Dc by utilizing the font information, and outputs predictive character image data PDc for displaying predictive character images. The image decoding apparatus 500 also includes an image composition means 504 which composites the predictive character image data PDc based on the auxiliary information, which indicates the positions and sizes of the respective characters and which is included in the character data Dc, so as to generate predictive document image data PDi corresponding to a predictive document image 505 including only characters corresponding to the document image.

The image decoding apparatus 500 further includes an image blocking means 506 which receives the predictive document image data PDi, divides the predictive document image 505 into image spaces each having a predetermined size (predictive document image blocks), and outputs image data (predictive block data) BPDi corresponding to each block. The image decoding apparatus 500 also includes a block predictive decoding means 507 which performs arithmetic decoding on the coded block data BDe by using the corresponding predictive document block data BPDi, and outputs decoded block data BDd corresponding to the restored document block.

The image decoding apparatus 500 further includes art image block assembly means 508 which receives the decoded block data BDd and the predictive block data BPDi, assembles the predictive document blocks and the decoded document blocks based on the flags Fc1 and Fc0, and outputs document image data Dd corresponding to the document image 509.

Each of the document blocks, predictive document blocks, and decoded document blocks is an image space comprising 16×16 pixels.

The predictive image generation means 503 and the image composition means 504 are identical to the predictive image generation means 103 and the image composition means 104 according to the first embodiment, respectively, and the image blocking means 506 is identical to the first image blocking means 408 according to the fourth embodiment.

The operation of the image decoding apparatus 500 of the fifth embodiment will now be described.

When the composite data MDe and the character data Dc are input to the image decoding apparatus 500, the predictive image generation means 503 generates data of predictive character images (predictive character image data) PDc corresponding to the respective characters which are included in the document image from the character codes which are included in the character data Dc by utilizing the font information, and outputs the predictive character image data PDc so generated to the image composition means 504. in the image composition means 504, the respective predictive character images are composited based on the auxiliary information which is included in the character data Dc, and the predictive document image data PDi corresponding to the predictive document image 505 is output to the image blocking means 506.

In the image blocking means 506, the predictive document image 505 is divided into blocks each having a predetermined size based on the predictive character image data PDc, and predictive block data BPDi corresponding to each block is output Lu the block predictive decoding means 507.

In the block predictive decoding means 507, the block data BDi included in the composite data MDe is subjected to arithmetic decoding by using the predictive block data BPDi based on the predictive block data BPDi and the composite data MDe, whereby the image data BDd of the corresponding document image block is restored.

Further, when the image data BDd and the predictive block data BPDi of the predictive image blocks are input to the image block assembly means 508, the predictive image blocks and the decoded image blocks are assembled based on the flags Fc1 and Fc0 corresponding to the respective blocks which are included in the composite data MDe, whereby the image data Dd corresponding to the document image 509 is restored.

Hereinafter, the decoding process which is performed by the block predictive decoding means 507 will be described specifically.

Figure 30:
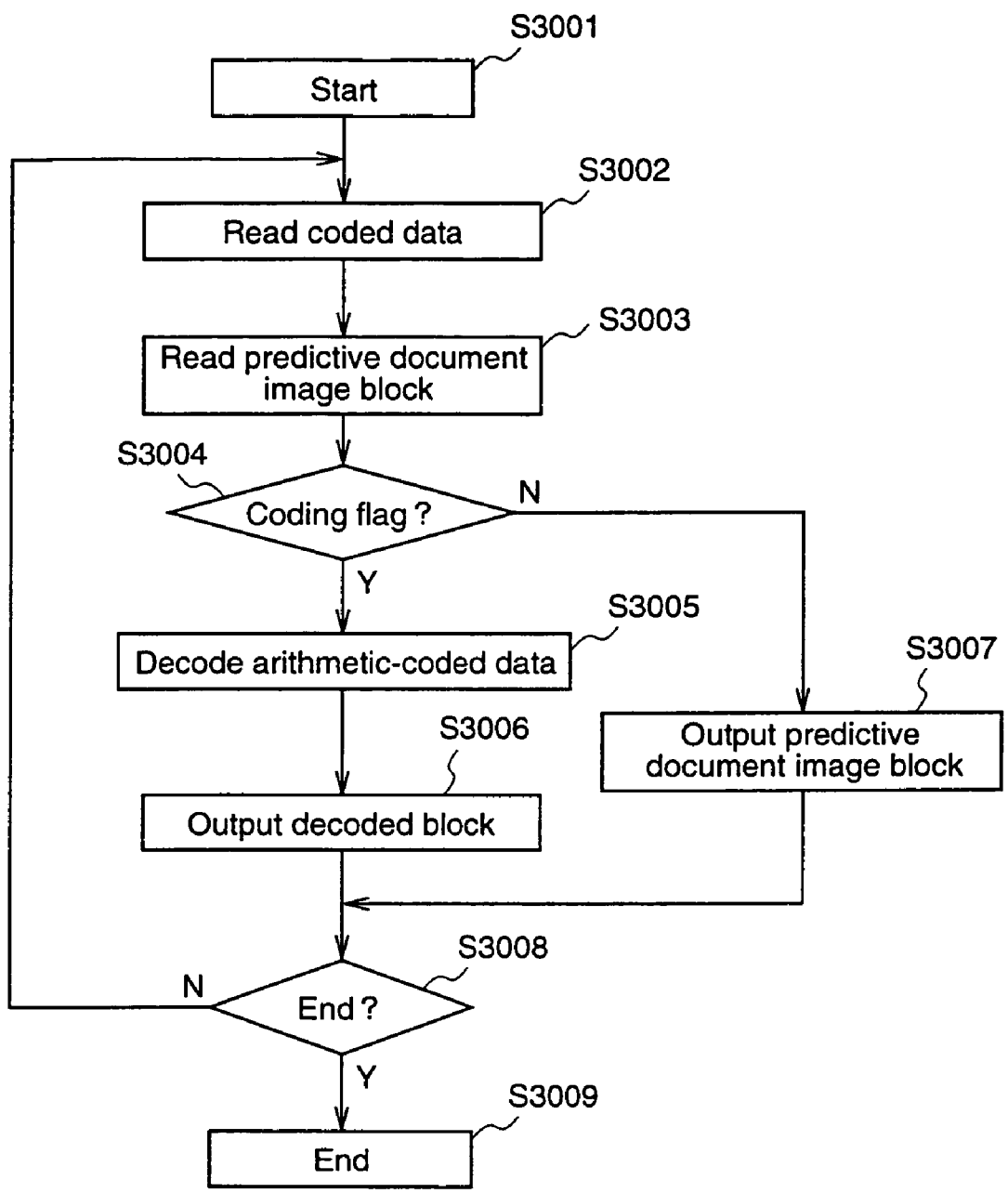
FIG. 30 is a diagram for explaining the flow of the process which is performed by a block predictive decoding means according to the fifth embodiment.

FIG. 30 is a diagram illustrating the flow of the decoding process which is performed by the block predictive decoding means 507.

Initially, the coded data BDe corresponding to each block of the document image is read into the block predictive decoding means 507 (step S3002), and the predictive block data BPDi of the corresponding predictive document image block outputted from the image blocking means 506 is read into the block predictive decoding means 507 (step S3003).

Subsequently, it is decided whether the flag that is included in the composite data MDe is a coding flag Fc1 or a non-coding flag Fc0 (step S3009). When the flag is a coding flag, the block predictive decoding means 507 performs decoding on the arithmetic-coded data DBe which follows the coding flag, with reference to the predictive block data BPDi of the predictive document image block (step S3005), and outputs the image data BDd of the decoded block (step S3006).

On the other hand, when it is decided in step S3004 that the flag is a non-coding flag, the predictive block data BPDi of the predictive document image block is output as it is (step S3007).

Then, it is decided whether or not a target block, which is being processed by the block predictive decoding means 507, is the last image block in the document image (step S3008). When the target block is the last image block, the decoding process is ended (step S3009). When the target block is not the last image block, the following block is subjected to the processes in steps S3002 through S3008.

Thereafter, in the image block assembly means 508, the image blocks, which are input block by block, are successively placed in predetermined image spaces, whereby the image data Dd corresponding to the document image 509 is restored.

As described above, according to this fifth embodiment, a predictive document image is created from character information which has previously been extracted from a document image, and this predictive document image is divided into predictive document blocks each having a predetermined size so as to generate predictive block data BPDi corresponding to each predictive image block. Further, coded data BDe corresponding to each of image blocks having a predetermined size, which are obtained by dividing the document image, is subjected to arithmetic decoding with reference to the predictive block data BPDi of the corresponding predictive image block. At this time, with respect to a document image block having a relatively small prediction error, which has not been coded, the data of the corresponding predictive document image block is output. Therefore, it is possible to realize a decoding process which is adapted to the efficient block-by-block coding process for the document image data Di with reference to the predictive document image data PDi.

Figure 41A:
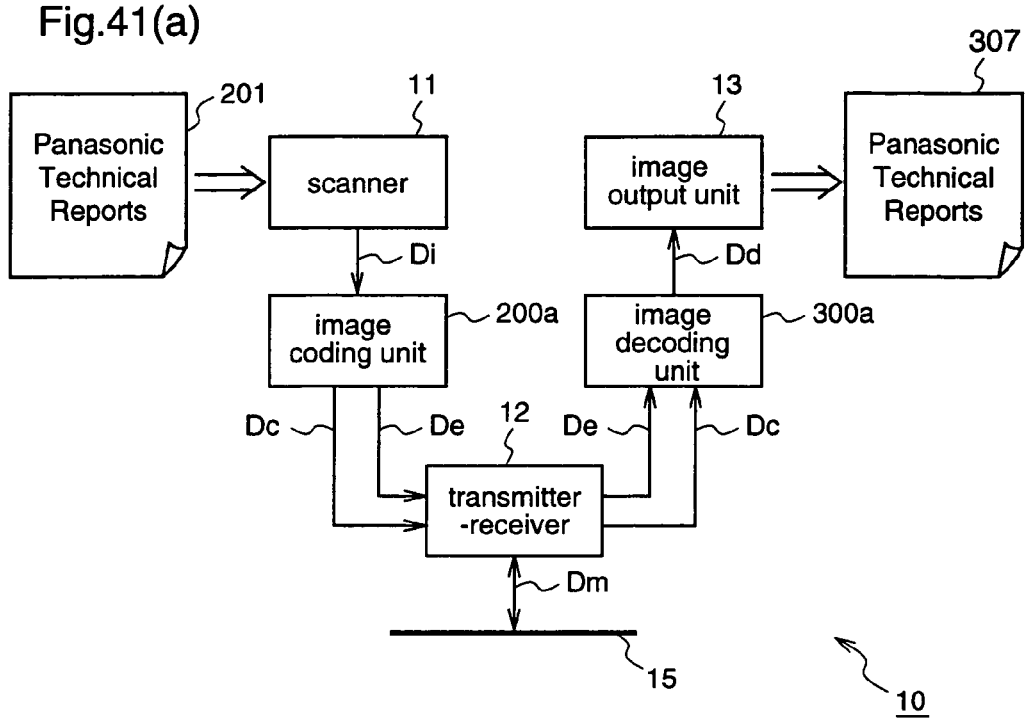
FIG. 41(a) is a block diagram for explaining a facsimile including the image coding apparatus of the second embodiment and the image decoding apparatus of the third embodiment.

Further, a facsimile which is provided with the image coding apparatus 400 of the fourth embodiment and the image decoding apparatus 500 of the fifth embodiment is realized by replacing the image coding unit 200a and the image decoding unit 300a in the facsimile shown in FIG. 41(a) with the image coding apparatus 400 and the image decoding apparatus 500, respectively.

Figure 41B:
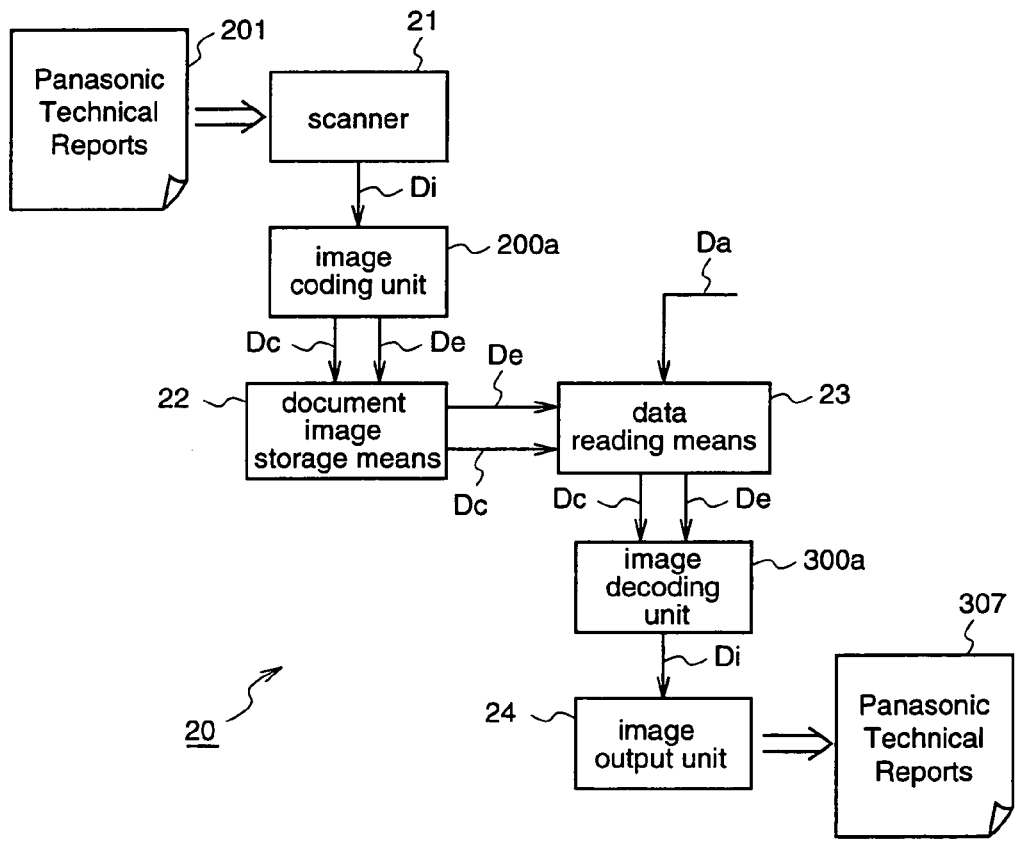
FIG. 41(b) is a block diagram for explaining a document filing apparatus including the image coding apparatus and the image decoding apparatus.

Furthermore, a document filing apparatus which is provided with the image coding apparatus 400 of the fourth embodiment and the image decoding apparatus 500 of the fifth embodiment is realized by replacing the image coding unit. 200a and the image decoding unit 300a in the document filing apparatus shown in FIG. 41(b) with the image coding apparatus 400 and the image decoding apparatus 500, respectively.

Sixth Embodiment

Figure 6:
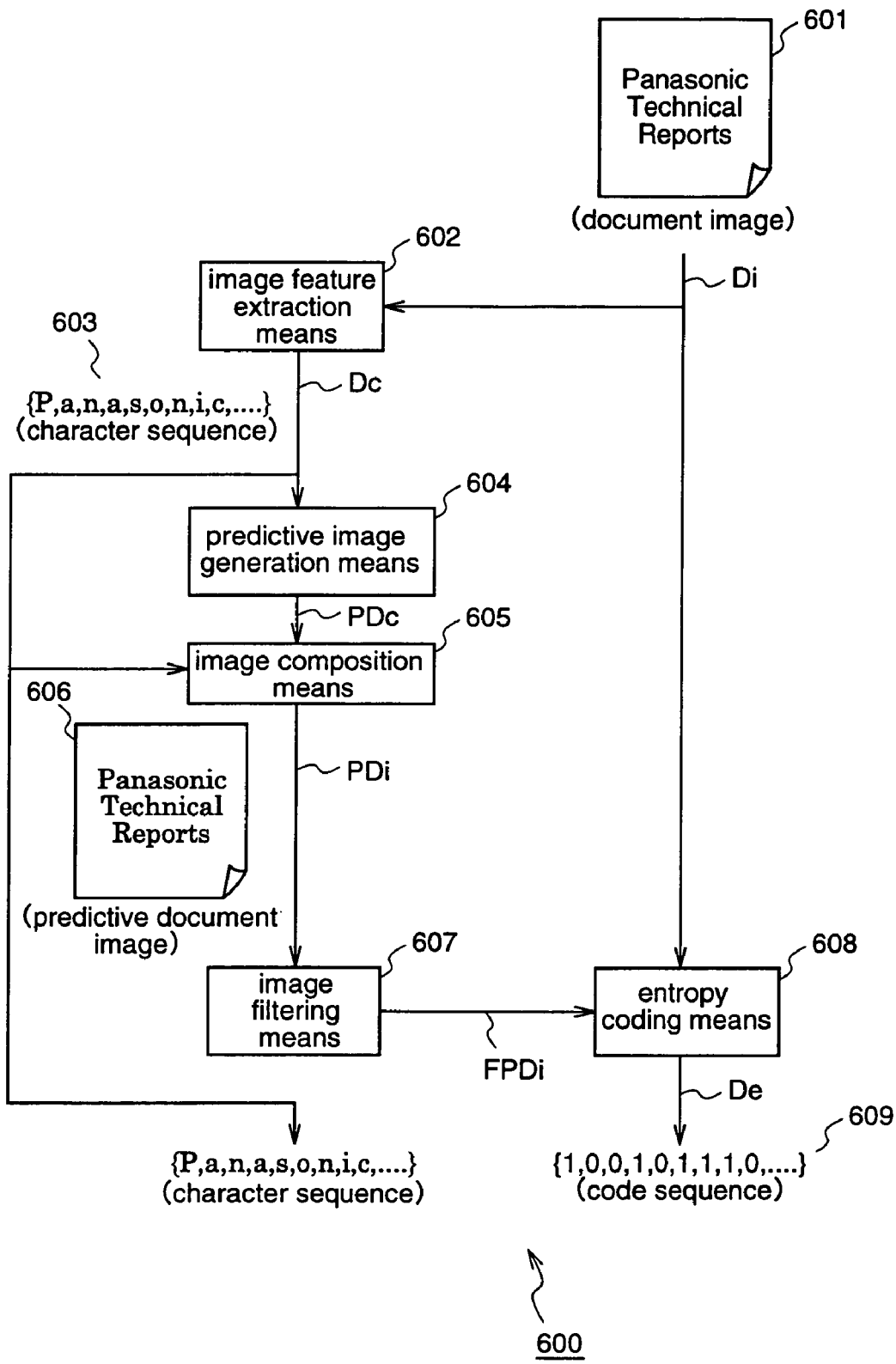
FIG. 6 is a block diagram for explaining an image coding apparatus according to a sixth embodiment of the present invention.

FIG. 6 is a block diagram illustrating the structure of an image coding apparatus according to a sixth embodiment of the present invention. This sixth embodiment corresponds to the fourth aspect described above.

An image coding apparatus 600 according to this sixth embodiment is used as an image coding means in a data processing apparatus performing storage and transmission/reception of image data, for example, an electronic device having a scanner, such as the document filing apparatus 3900 shown in FIG. 39 or a facsimile.

The image coding apparatus 600 or this sixth embodiment includes: an image feature extraction means 602 which receives document image data Di (binary image data which is obtained by converting a document image 601 into electronic form with a scanner or the like), and extracts character data Dc from the document image data Di; a predictive image generation means 604 which outputs predictive character image data PDc based on character codes which are included in the character data Dc; and an image composition means 605 which generates a predictive document image 606 including predictive character images corresponding to the respective characters, based on the predictive character image data PDc and auxiliary information which are included in the character data Dc, and outputs its data (predictive document image data) PDi.

The image coding apparatus 600 further includes an image filtering means 607 which subjects the predictive document image data PDi to filtering such as morphological filtering or smoothing so that minute parts of the predictive document image 606 are omitted, and outputs filtered data FPDi. The image coding apparatus 600 also includes an entropy coding means 608 which subjects the document image data Di to arithmetic coding with reference to the filtered data FPDi by utilizing the correlation between the filtered predictive document image 606 and the document image 601, and outputs a code sequence 609 as coded data De.

The image feature extraction means 602, the predictive image generation means 604, the image composition means 605, and the entropy coding means 608 are identical to the corresponding means 202, 204, 205, and 207 of the image coding apparatus 200 according to the second embodiment, respectively.

The operation of the image coding apparatus 600 of the sixth embodiment will now be described.

The document image data Di to be coded is binary image data which is obtained by converting the document image 601 into electronic form by using a scanner or the like, and the document image 601 includes, as partial images, character images each comprising a character or a symbol, or a part of a character or symbol.

When the document image data Di is input to the image coding apparatus 600 of this sixth embodiment, the image feature extraction means 602, the predictive image generation means 604 and the image composition means 605 respectively perform the same processes as those described for the image feature extraction means 202, the predictive image generation means 204 and the image composition means 205 according to the second embodiment, and the predictive document image data PDi of the predictive document image 606 (predictive document image data) outputted from the image composition means 605 is input to the image filtering means 607.

In the image filtering means 607, the predictive document image data PDi is subjected to filtering using a morphological filter so that the minute parts of the predictive document image 606 are omitted.

Figure 31:
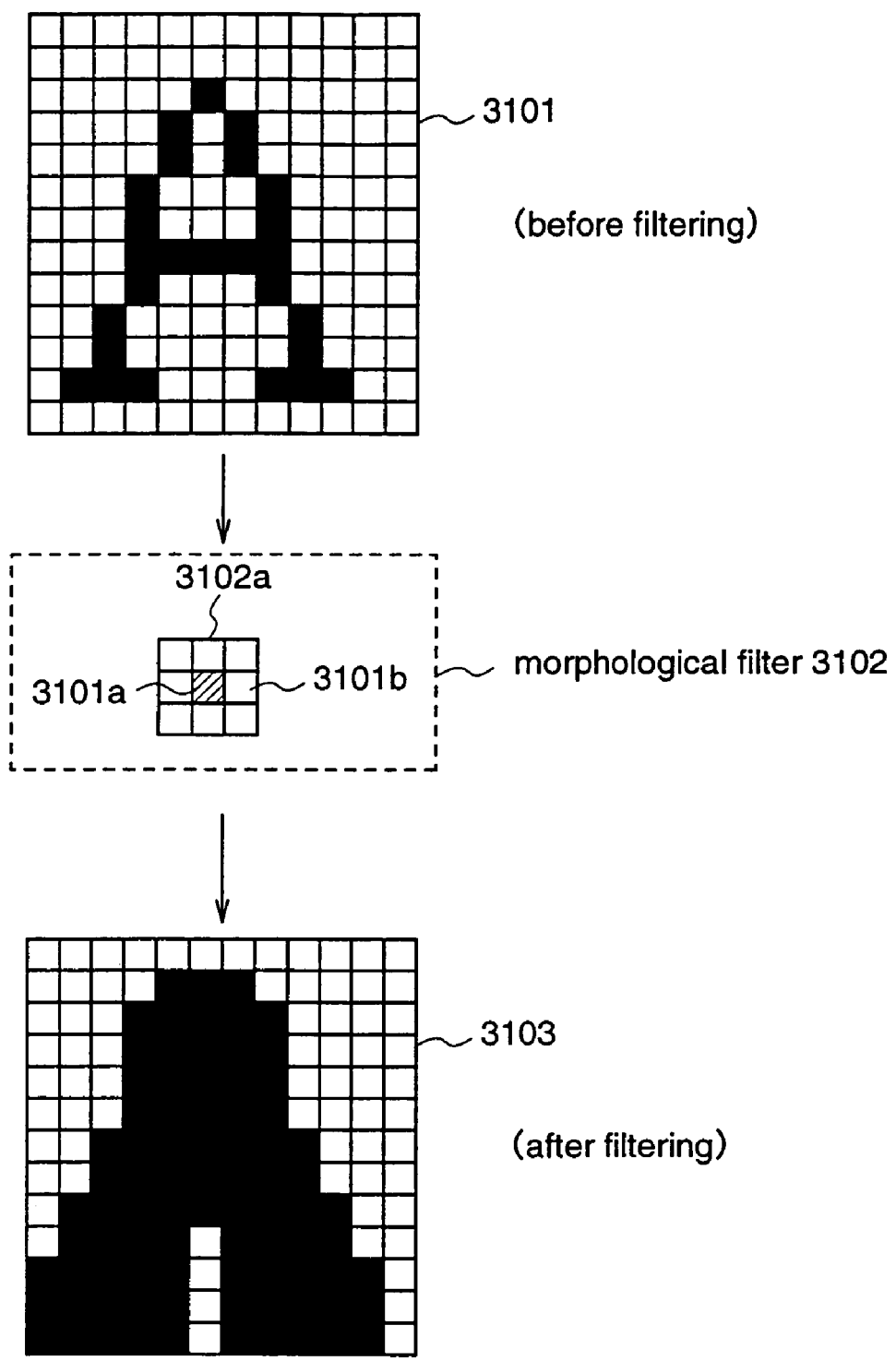
FIG. 31 is a diagram for explaining the operation of a morphological filter according to the sixth embodiment.

FIG. 31 is a schematic diagram for explaining the process using the morphological filter.

In the morphological filter 3102, a region 3102a of a predetermined size (a mask of 3×3 pixels) with a target pixel 3101a to be filtered on the predictive document image being in the center is set for each of the respective pixels constituting the predictive document image, and the pixel value of the target pixel 3101a is replaced with the maximum pixel value of the pixels within the mask. Reference numeral 3101b denotes a pixel having the maximum pixel value within the mask.

For example, assuming that the predictive document image is a monochrome image, in the predictive document image 3103 after the filtering process, its minute parts are omitted as compared with the predictive document image 3101 before the filtering process, and the black region is extended, as shown in FIG. 31.

In the entropy coding means 608, the document image data Di of the document image 601 is subjected to arithmetic coding with reference to the filtered predictive document image data FPDi, and the corresponding code sequence 609 is output as coded data De.

As described above, according to the sixth embodiment, a predictive document image corresponding to the document image is generated based on the character data that is extracted from the document image data, the predictive document image data is subjected to filtering, and the document image data is subjected to arithmetic coding with reference to the filtered predictive document image data. Therefore, the prediction error of the predictive document image to the document image is reduced by the filtering process, whereby the coding efficiency for the document image data by the arithmetic encoder is further improved.

Seventh Embodiment

Figure 7:
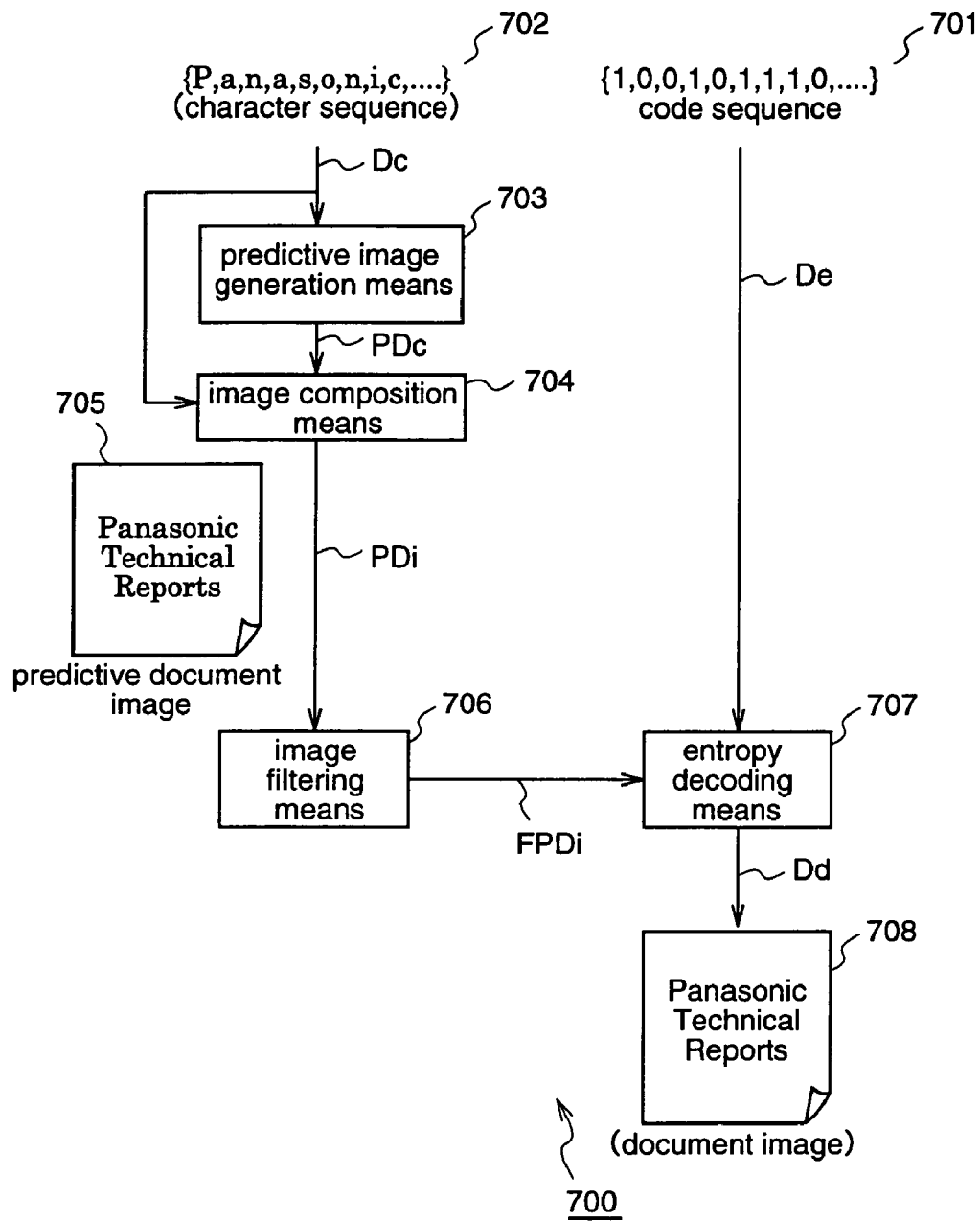
FIG. 7 is a block diagram for explaining an image decoding apparatus according to a seventh embodiment of the present invention.

FIG. 7 is a block diagram illustrating the structure of an image decoding apparatus according to a seventh embodiment of the present invention. This seventh embodiment corresponds especially to the seventh aspect described above.

An image decoding apparatus 700 of this seventh embodiment is adaptable to the image coding apparatus 600 of the sixth embodiment, and it is used as an image decoding means in an electronic device having a scanner, such as the document filing apparatus 3900 shown in FIG. 39 or a facsimile.

That is, the image decoding apparatus 700 receives the coded data De and the character data Dc outputted from the image coding apparatus 600 of the sixth embodiment, and decodes the coded data De based on the character data Dc so as to restore the document image data Di of the document image 701, as decoded data Dd of the document image 708.

To be specific, the image decoding apparatus 700 includes a predictive image generation means 703 which receives the character data Dc corresponding to the respective characters in the character sequence 702, predicts character images in the document image based on the character codes (image features) which are included in the character data Dc by utilizing the font information, and outputs the predictive character image data PDc for displaying the predictive character images. The image decoding apparatus 700 also includes an image composition means 704 which composites the predictive character image data PDc based on the auxiliary information, which indicates the positions and sizes of the respective characters and which is included in the character data Dc, so as to generate predictive document image data PDi corresponding to a predictive document image 705 including only characters corresponding to the document image.

The image decoding apparatus 700 further includes an image filtering means 706 which subjects the predictive document image data PDi to filtering such as morphological filtering or smoothing so that minute parts of the predictive document image 705 are omitted, and outputs the filtered data FPDi. The image decoding apparatus 700 also includes an entropy coding means 708 which receives, as a code sequence 701, coded data De that is obtained by performing arithmetic coding utilizing the correlation between the predictive document image and the document image, subjects the coded data De to arithmetic decoding by using the filtered predictive document image data, i.e., the filtered output FPDi, and outputs document image data (decoded data) Dd corresponding to the document image 708.

The predictive image generation means 703, the image composition means 704, and the entropy decoding means 707 are respectively identical to the corresponding means 303, 304, and 306 of the image decoding apparatus 300 according to the third embodiment.

The operation of the image decoding apparatus 700 of the seventh embodiment will now be described.

When the coded data De and the character data Dc are input to the image decoding apparatus 700, the predictive imago generation means 703 and the image composition means 704 perform the same processes as those described for the predictive image generation means 303 and the image composition means 304 of the third embodiment, and image data (predictive document image data) PDi corresponding to the predictive document image 705 and outputted from the image composition means 704 is input to the image filtering means 706.

In the image filtering means 706, the predictive document image data PDi is subjected to the same filtering as that performed by the image filtering means 607 in the image coding apparatus 600 of the sixth embodiment, and filtered data (predictive document image data which has been filtered) FPDi is output.

In the entropy decoding means 707, the coded data De is decoded with reference to the filtered predictive document image data FPDi, and document image data Dd corresponding to the document image 708 is output.

The process which is performed by the entropy decoding means 707 is identical to that performed by the entropy decoding means 306 of the third embodiment except that decoding is not performed with reference to the predictive document image data as it is but instead with the predictive document image data which has been filtered by the image filtering means 706.

As described above, according to the seventh embodiment, a predictive document image is generated from character information which is previously extracted from a document image, and predictive document image data is subjected to filtering so that minute portions of the predictive document image are omitted. Then, the coded data De corresponding to the document image is subjected to arithmetic decoding with reference to the filtered predictive document image data FPDi. Therefore, it is possible to realize a decoding process which is adaptable to an efficient coding process for document image data Di with reference to filtered predictive document image data FPDi.

Further, a facsimile which is provided with the image coding apparatus 600 of the sixth embodiment and the image decoding apparatus 500 of the seventh embodiment is realized by replacing the image coding unit 200a and the image decoding unit 300a in the facsimile shown in FIG. 41(a) with the image coding apparatus 600 and the image decoding apparatus 700, respectively.

Furthermore, a document filing apparatus which is provided with the image coding apparatus 600 of the sixth embodiment and the image decoding apparatus 700 of the seventh embodiment is realized by replacing the image coding unit 200a and the image decoding unit 300a in the document filing apparatus shown in FIG. 41(b) with the image coding apparatus 600 and the image decoding apparatus 700, respectively.

Eighth Embodiment

Figure 8:
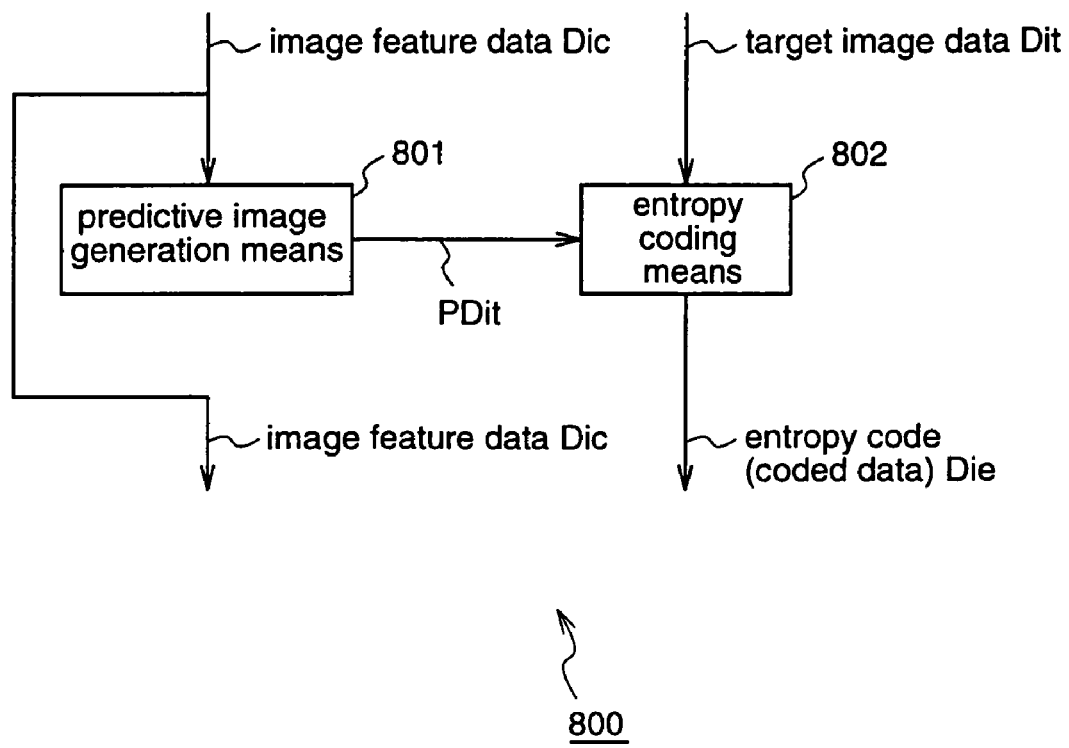
FIG. 8 is a block diagram for explaining an image coding apparatus according to an eighth embodiment of the present invention.

FIG. 8 is a block diagram illustrating the structure of an image coding apparatus according LO an eighth embodiment of the present invention. This eighth embodiment corresponds to the eighth aspect described above.

An image coding apparatus 800 according to this eighth embodiment is used as an image coding means in an electronic device having a scanner, such as the document filing apparatus 39UU shown in FIG. 39 or a facsimile.

To be specific, the image coding apparatus 800 of this eighth embodiment includes a predictive image generation means 801 which receives data indicating an image feature of a target image to be coded (image feature data Dic), and generates data of a predictive image which is similar to the target image (predictive image data PDit) based on the image feature data Dic. The image coding apparatus 800 also includes an entropy coding means 802 which receives data of the target image (target image data Dit) and the predictive image data PDit, subjects the target image data Dit to arithmetic coding with reference to the corresponding predictive image data PDit, and outputs entropy codes corresponding to the target image as coded data Die.

Figure 32:
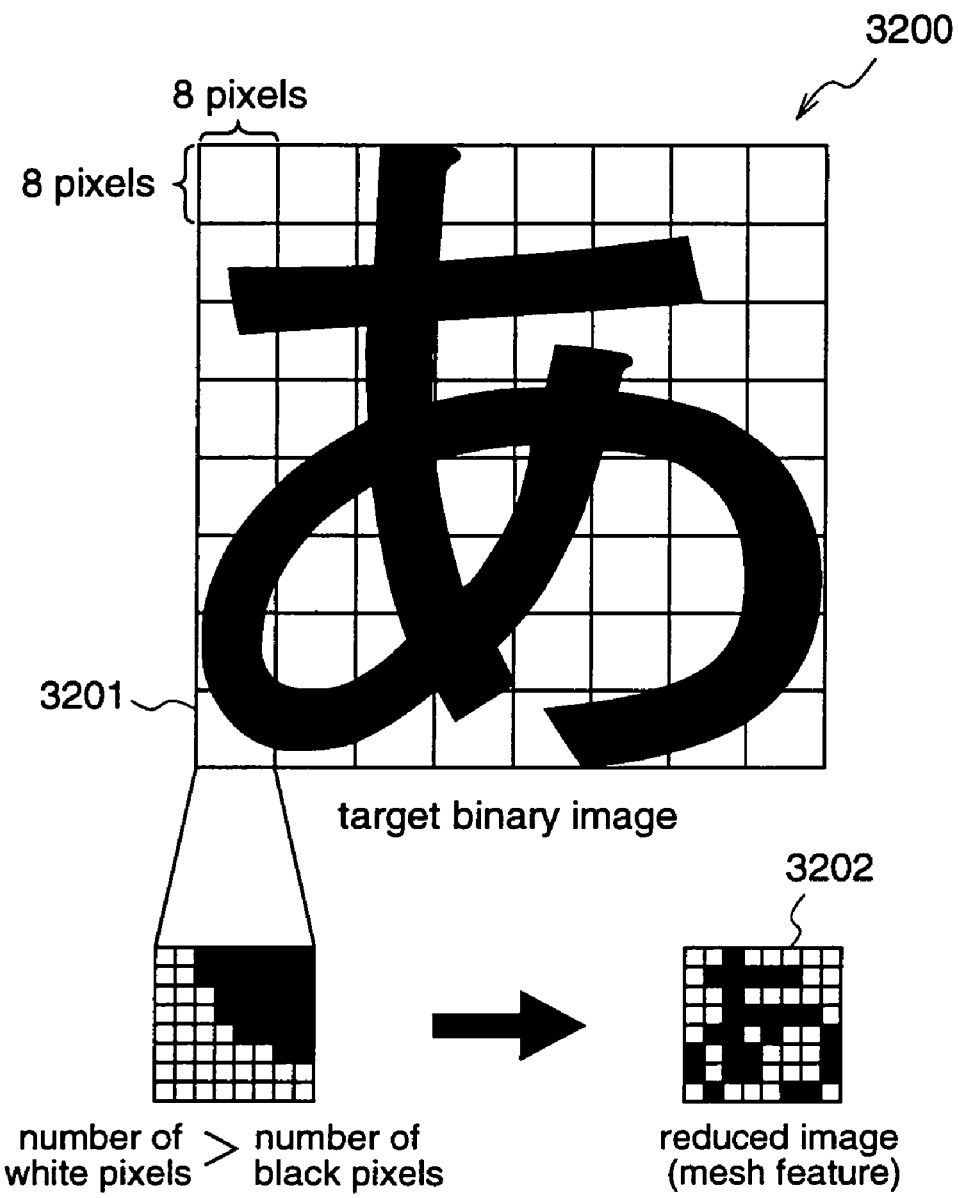
FIG. 32 is a diagram for explaining a method for extracting a mesh feature according to the eighth embodiment.

FIG. 32 is a schematic diagram for explaining the image feature.

It is assumed that an input image is a binary image comprising white pixels and black pixels.

An image feature, by which a binary image similar to a target binary image can be reproduced, is used. For example, when the target binary image is a document image including characters as described in the above-described embodiments, a mesh feature described as follows can be used as an image feature. Further, a character code or a feature vector for character recognition may be employed as an image feature.

Hereinafter, an image feature employed in this eighth embodiment will be described.

A target binary image 3200 is divided into regions of the same size (e.g., blocks each comprising 8×8 pixels). Then, the pixel' values of pixels in each block are replaced with a pixel value of the highest frequency among the pixel values of the pixels in the block. In the case of a binary image, the pixel values in each block are replaced with the pixel value of either the black pixels or the white pixels which are larger in number in the block.

As the result, the image feature of the inputted binary image (e.g., 69×64 pixels) becomes a reduced binary image 3202 comprising 8×8 pixels. Hereinafter, this feature is called a mesh feature.

The operation of the image coding apparatus 800 will now be described.

When the target image data Dit and the image feature data Dic are input to the image coding apparatus 800, the predictive image generation means 801 generates a predictive image corresponding to the target image based on the image feature data indicating the reduced binary image 3202 shown in FIG. 32, and outputs its data (predictive image data) PDit.

The predictive image is generated by enlarging the reduced binary image.

Figure 33:
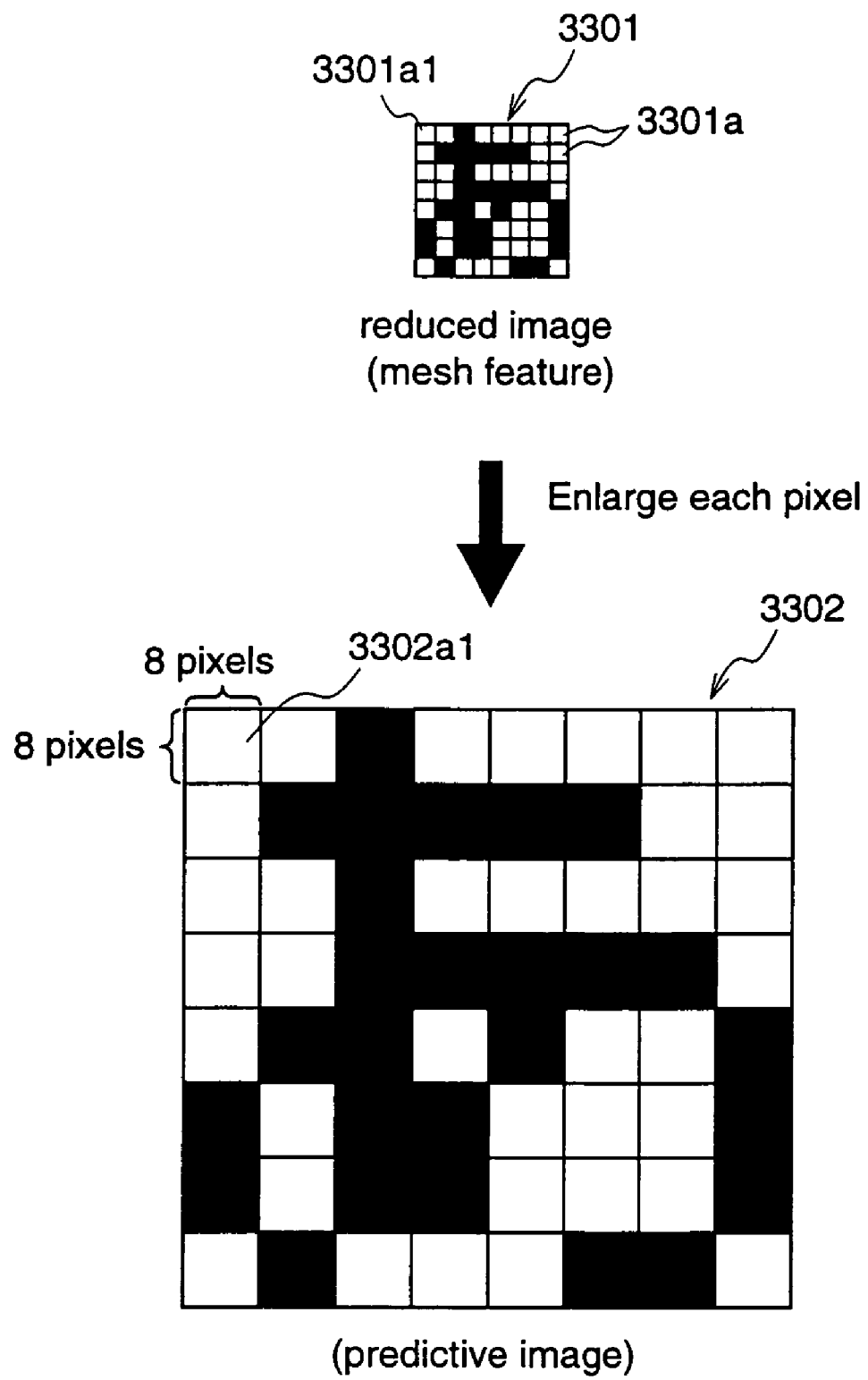
FIG. 33 is a diagram for explaining a method for generating a predictive image from the mesh feature according to the eighth embodiment.

FIG. 33 is a schematic diagram for explaining the method of enlarging the reduced binary image.

For example, a block comprising 8×8 pixels is generated correspondingly to each of plural pixels 3301a in the reduced binary image 3301 so that each pixel in each generated block has the same pixel value as the corresponding pixel.

To be specific, in the enlarging process, a pixel 3301a1 at the upper left corner of the reduced binary image 3301 is converted to an 8×8 pixel block 3302a1 at the upper left corner of the predictive image 3302.

In the entropy coding means 802, arithmetic coding is performed on the target image data Dit with reference to the predictive image data PDit in a similar manner as described for the entropy coding means 106 according to the first embodiment.

As described above, according to the eighth embodiment, the data of the predictive image (predictive image data PDit) corresponding to the target image is generated based on the data indicating the image feature (image feature data Dic) which has previously been extracted from the target image to be coded, and the target image data Dit is subjected to arithmetic coding based on the predictive image data PDit. Therefore, the coding efficiency in the entropy encoder is improved.

Further, since the image feature data corresponding to the target image is output together with the entropy codes (coded data) corresponding to the target image data Dit, the coded data of the target image can he retrieved according to the image feature data.

Ninth Embodiment

Figure 9:
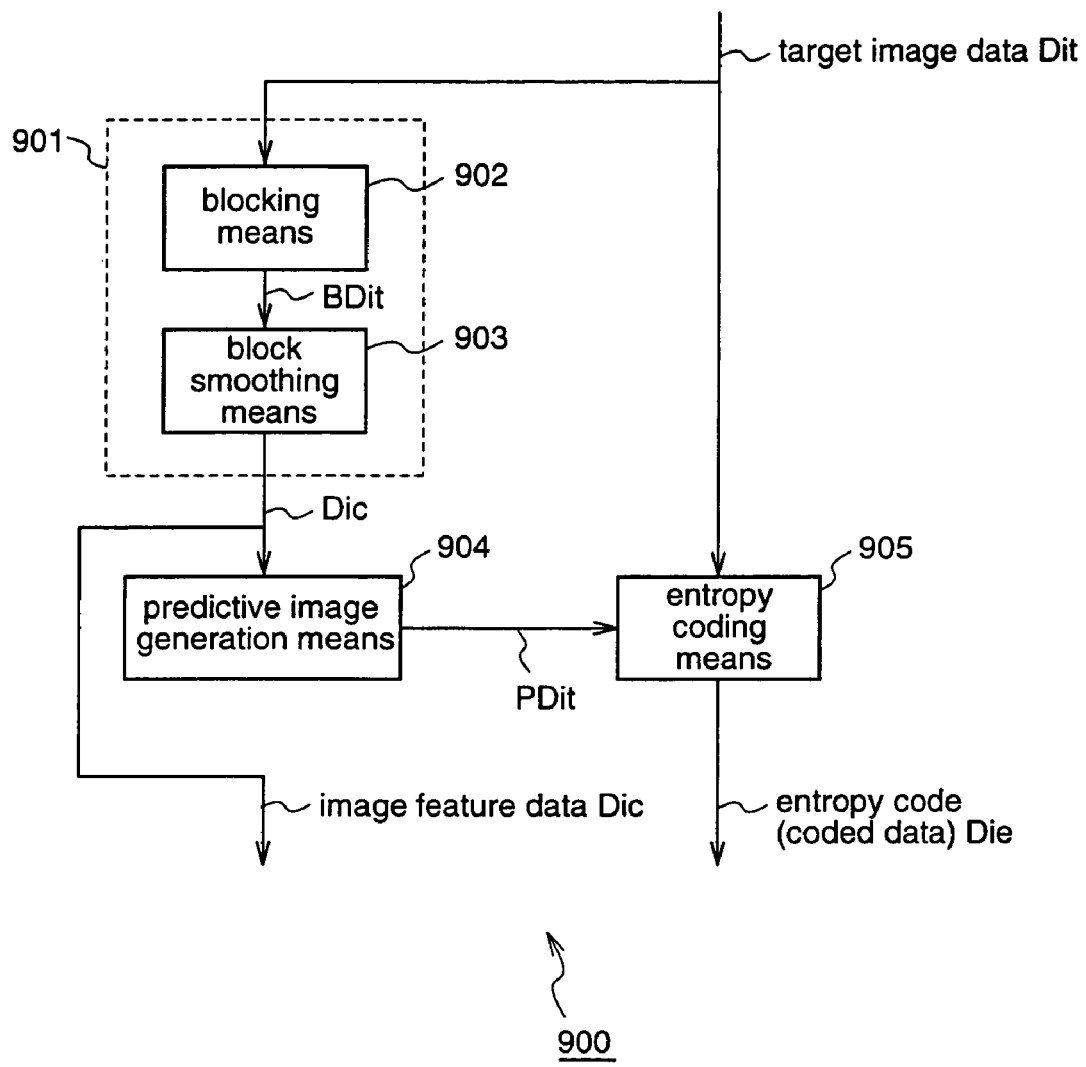
FIG. 9 is a block diagram for explaining an image coding apparatus according to a ninth embodiment of the present invention.

FIG. 9 is a block diagram illustrating the structure of an image coding apparatus according to a ninth embodiment of the present invention. This ninth embodiment corresponds to the ninth, tenth and thirteenth aspects described above.

An image coding apparatus 900 according to this ninth embodiment is used as an image coding means in an electronic device having a scanner, such as the document filing apparatus 3900 shown in FIG. 39 or a facsimile.

The image coding apparatus 900 of this ninth embodiment includes an image feature extraction means 901 which extracts image feature data Dic from target image data Dit, in addition to the constituents of the image coding apparatus 800 according to the eighth embodiment. The image coding apparatus 900 performs arithmetic coding on the target image data Dit with reference to predictive image data PDit which is obtained from the corresponding image feature data Dic. That is, a predictive image generation means 904 and an entropy coding means 905 constituting the image coding apparatus 900 are respectively identical to the predictive image generation means 801 and the entropy coding means 802 or the image coding apparatus 800 according to the eighth embodiment.

The image feature extraction means 901 is constructed so as to extract a mesh feature, as an image feature, from a target image to be coded. The image feature extraction means 901 comprises a blocking means 902 which divides the target image into plural blocks (image spaces each comprising 8×8 pixels) and outputs block image data HDit corresponding to each block, and a block smoothing means 903 which smoothes the pixel values of pixels in each block (pixels constituting each block). To be specific, this block smoothing means 903 replaces the pixel values of pixels in each block with a pixel value of the highest occurrence frequency in the block. For example, in a binary image that is represented by black pixels and white pixels, a pixel. value of the highest occurrence frequency is the pixel value of either the black pixels or the white pixels in the block which are larger in number in the block.

The operation of the image coding apparatus 900 will now be described.

It is assumed that target image data which is inputted to the image coding apparatus 900 of this ninth embodiment is data of a binary image.

When the target image data bit is input to the image coding apparatus 900, the image feature extraction means 901 extracts image feature data Dic from the target image data Dit.

That is, in the blocking means 902 of the image feature extraction means 901, a binary image, as a target image, is divided into plural blocks of the same size (8×8 pixels), and block image data BDit corresponding to each block is output. Next, in the block smoothing means 903, the block image data BDit is subjected Lo smoothing by which the pixel value of each pixel in the block is replaced with the pixel value of the highest occurrence frequency, and the smoothed block image data is output as image feature data Dic.

Since the target image is a binary image, the pixel values of pixels in each block are replaced with either the pixel value of the black pixels or the pixel value of the white pixels which are larger in number in the block.

As the result of the smoothing process, a reduced binary image comprising 8×8 pixels is obtained as an image feature (mesh feature) corresponding to the target binary image when the target binary image comprises 64×64 pixels.

In the predictive image generation means 904, predictive image data PDit for the target image is generated based on the image feature data Dic. In the entropy coding means 905, the target image data Dit is subjected to arithmetic coding with reference to the predictive image data PDit, and entropy codes are output as coded data Die corresponding to the target image data.

As described above, the image coding apparatus 900 of this ninth embodiment is provided with, in addition to the constituents of the eighth embodiment, the image feature extraction means 901 for extracting the data Dic indicating the image feature of the target image from the target image data Dit. Therefore, in addition to the effects of the eighth embodiment, the image feature data is extracted from the target image data in the image coding apparatus, resulting in an image coding apparatus which is suitable for use as an image coding means in a document filing apparatus or in a facsimile.

Further, the image data of the target image is divided such that the target image is divided into plural blocks of the same size, and the image data corresponding to each block is replaced with the pixel value of the highest occurrence frequency among the pixel values of the pixels in the block, whereby image data corresponding to a reduced image which comprises the most-frequent pixel values of the respective blocks is output as image feature data of the target image. Therefore, the image feature data indicating the feature of the target image can be easily created.

Tenth Embodiment

Figure 10:
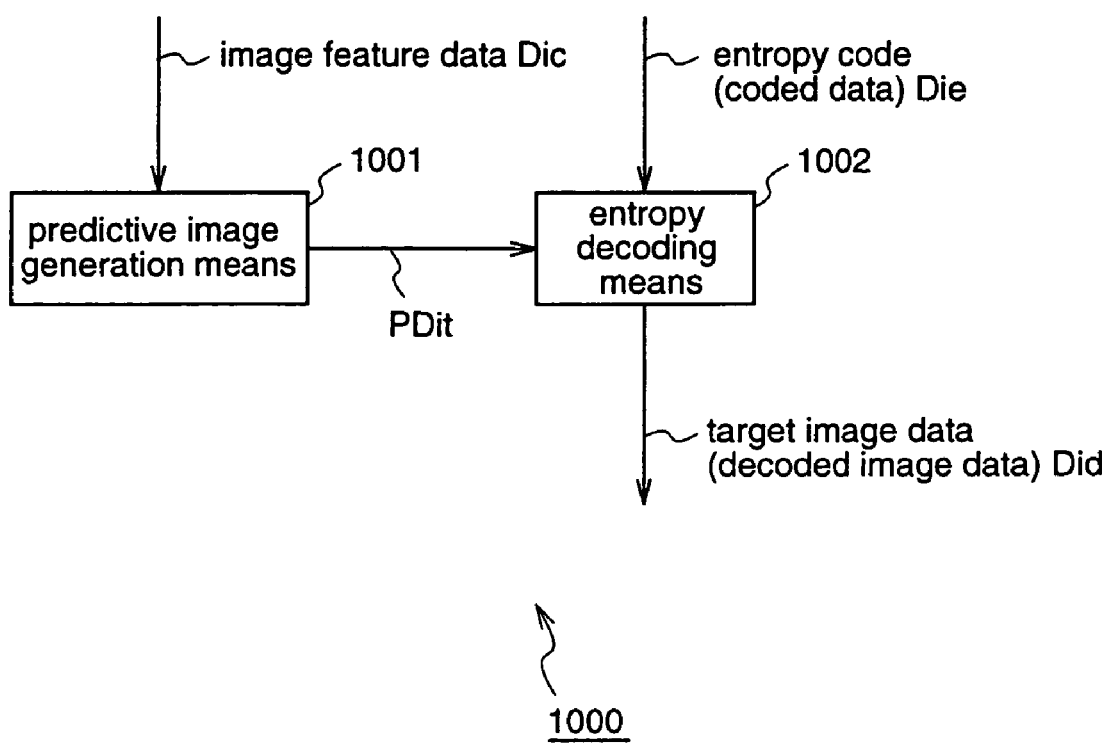
FIG. 10 is a block diagram for explaining an image decoding apparatus according to a tenth embodiment of the present invention.

FIG. 10 is a block diagram illustrating the structure of an image decoding apparatus according to a tenth embodiment of the present invention. This tenth embodiment corresponds to the twelfth and fourteenth aspects.

An image decoding apparatus 1000 of this tenth embodiment is adaptable to the image coding apparatus 800 or 900 according to the eighth or ninth embodiment, and the image decoding apparatus 1000 is used as an image decoding means in an electronic device having a scanner, such as the document filing apparatus 3900 shown in FIG. 39 or a facsimile.

That is, this image decoding apparatus 1000 receives entropy codes (coded data) Die and image feature data Dic which are output from the image coding apparatus 800 or 900 according to the eighth or ninth embodiment, and subjects the coded data Die to arithmetic decoding with reference to predictive image data PDit generated on the based of the image feature data Dic.

To be specific, the image decoding apparatus 1000 includes a predictive image generation means 1001 which generates predictive image data PDit based on the image feature data Dic. The image decoding apparatus 1000 also includes an entropy decoding means 1002 which subjects the coded data Die to arithmetic decoding with reference to the predictive image data PDit, and outputs decoded image data Did corresponding to the target image.

Also, in this tenth embodiment, a reduced image (mesh feature) as described for the eighth embodiment is employed, and the target image is a binary image. Further, the inputted coded data Die is entropy codes which are obtained by arithmetic coding utilizing the correlation between the target image and the predictive image in the image coding apparatus according to the eighth or ninth embodiment.

The operation of the image decoding apparatus 1000 will now be described.

When the coded data Die and the image feature data Dic are input to the image decoding apparatus 1000, the predictive image generation means 1001 generates predictive image data PDit of a predictive image corresponding to the target image based on the image feature data Dic.

In the entropy decoding means 1002, the coded data Die of the target image is subjected to arithmetic decoding with reference to the predictive image data PDit, and decoded image data Did of the target image is output.

As described above, the image decoding apparatus 1000 of this tenth embodiment is provided with the predictive image generation means 1001 which generates predictive image data PDit corresponding to the target image based on the image feature data Dic of the target image, and performs arithmetic decoding on the coded data Die with reference to the predictive image data PDit. Therefore, it is possible to realize an image decoding apparatus which can correctly decode the entropy codes which are obtained by efficient arithmetic coding utilizing the correlation between the target image and the predictive image.

Further, a facsimile which is provided with the image coding apparatus 900 of the ninth embodiment and the image decoding apparatus 1000 of the tenth embodiment is realized by replacing the image coding unit 200a and the image decoding unit 300a in the facsimile shown in FIG. 41(*a*) with the image coding apparatus 900 and the image decoding apparatus 1000, respectively.

Furthermore, a document filing apparatus which is provided with the image coding apparatus 900 of the ninth embodiment and the image decoding apparatus 1000 of the tenth embodiment is realized by replacing the image coding unit 200a and the image decoding unit 300a in the document filing apparatus shown in FIG. 41(*b*) with the image coding apparatus 900 and the image decoding apparatus 1000, respectively.

Eleventh Embodiment

Figure 11:
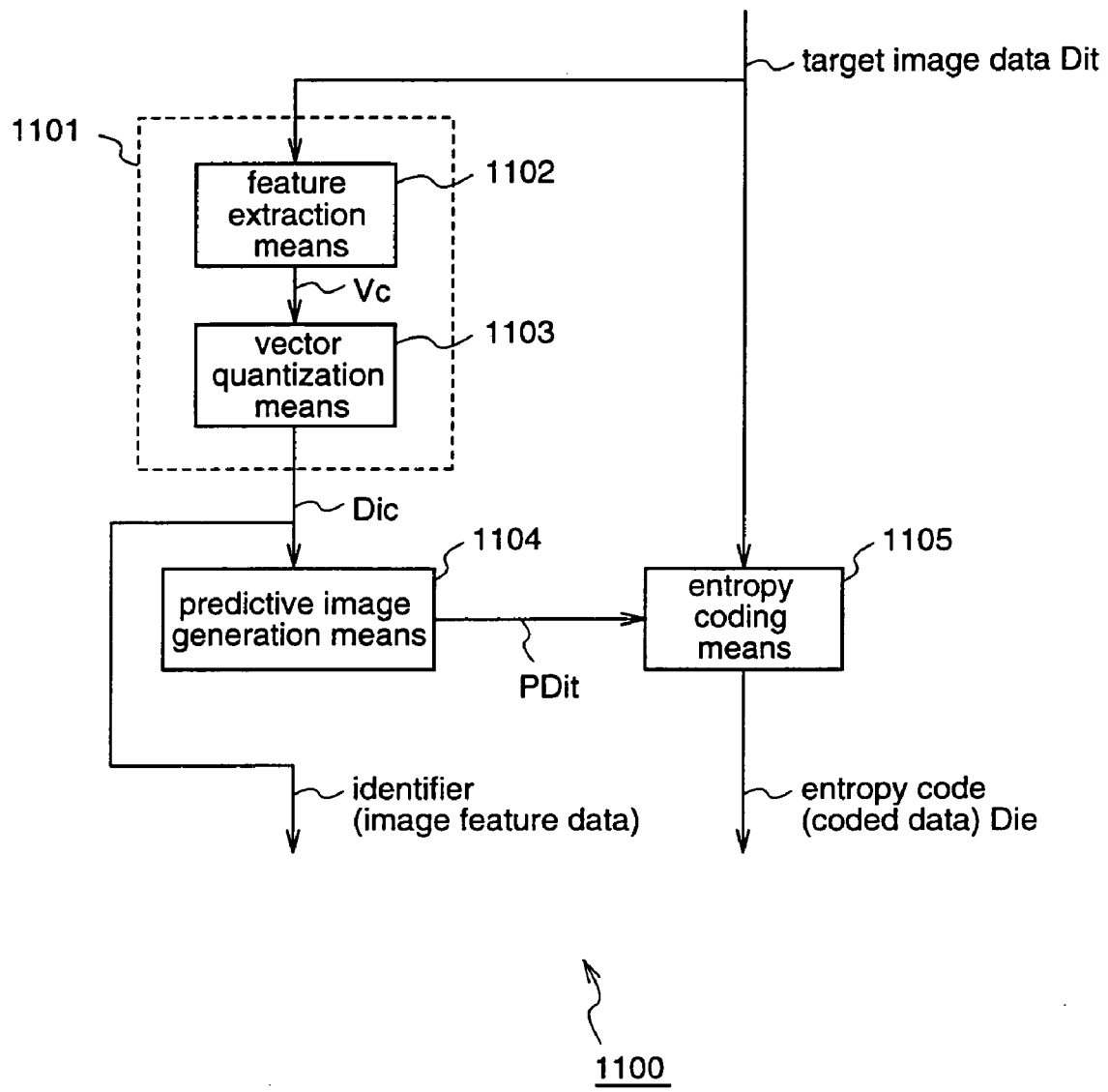
FIG. 11 is a block diagram for explaining an image coding apparatus according to an eleventh embodiment of the present invention.

FIG. 11 is a block diagram illustrating the structure of an image coding apparatus according to an eleventh embodiment of the present invention. This eleventh embodiment corresponds to the ninth, eleventh and fifteenth aspects described above.

An image coding apparatus 1100 according to this eleventh embodiment is used as an image coding means in an electronic device having a scanner, such as the. document filing apparatus 3900 shown in FIG. 39 or a facsimile.

The image coding apparatus 1100 of this eleventh embodiment includes an image feature extraction means 1101 which extracts, as image feature data Dic, an identifier corresponding to an image which is similar to a target image, from target image data Dit, in addition to the constituents of the image coding apparatus 800 according to the eighth embodiment. The image coding apparatus 1100 subjects the target image data Dit to arithmetic coding with reference to predictive image data PDit which is obtained by image feature data Dic corresponding to the data Dit. That is, a predictive image generation means 1104 and an entropy coding means 1105 constituting the image coding apparatus 1100 are identical to the predictive image generation means 801 and the entropy coding means 802 of the image coding apparatus 800 according to the eighth embodiment.

The image feature extraction means 1101 includes a feature vector extraction means 1102 which extracts, from the target image, a feature vector indicating the feature of a target image to be coded, and a vector quantization means 1103 which subjects the feature vector of the target image to vector quantization and output an identifier of a similar image. The feature vector is a kind of a feature which is utilized in character pattern recognition or the like. Although any feature vector may be employed as long as it can be used for character recognition, a background feature or a peripheral feature are especially effective (refer to "Pattern Recognition", The Institute of Electronics, Information and Communication Engineers, p. 43).

For example, as a feature vector corresponding to a binary image showing a hiragana character "あ", there is a vector having an array of "0" and "1" which is obtained by scanning the. respective pixels in the reduced image 3202 of the character image "あ" 3200 shown in FIG. 32, in a predetermined order, with the white pixels being "0" and the black pixels being "1".

In the vector quantization process, the above-mentioned identifier is derived by using a VQ code book based on the feature vector. In the VQ code book, each representative feature vector is associated with an identifier. The representative feature vector is a vector which is set on each of plural groups that are obtained by clustering plural learning vectors defined in a vector space.

When an arbitrary vector is input to the vector quantization means 1103, a group providing the shortest distance between its representative feature vector and the arbitrary vector in the vector space is found, and an identifier which is associated with the representative feature vector of this group is output on the basis of the VQ code book. A VQ code book formation method is described in "Linde, Buzo, Gray; An Algorithm for Vector Quantizer Design, IEEE Trans. commun., COM-28-1, pp. 84–95, 1980".

In this eleventh embodiment, a feature vector obtained from an image is considered. A feature vector obtained from a character font (binary character image) is used as a learning vector, and an Euclidean distance is used as a distance between vectors. The VQ code book is composed of sets of representative feature vectors of plural groups and identifiers.

A predictive image generation means 1104 and an entropy coding means 1105 constituting the image coding apparatus 1100 are respectively identical to the predictive image generation means 801 and the entropy coding means 802 of the image coding apparatus 800 according to the eighth embodiment.

The operation of the image coding apparatus 1100 will now be described.

It is assumed that target image data to be input to the image coding apparatus 1100 of this eleventh embodiment is data of a binary image.

When the target image data Dit is input to the image coding apparatus 1100, the image feature extraction means 1101 extracts image feature data Dic from the target image data Dit.

That is, the feature vector extraction means 1102 in the image feature extraction means 1101 extracts a feature vector Vc from the input image, as a feature to be used for character recognition or the like. Then, the vector quantization means 1103 finds a representative feature vector which is closest to the obtained feature vector Vc, and outputs an identifier Dic which is associated with this representative feature vector.

In the predictive image generation means 1104, predictive image data PDit is obtained based on the identifier (image feature data) Dic outputted from the vector quantization means 1103. The predictive image is an image representing the group in the vector space which is associated with the identifier Dic, and the predictive image is a character image having a feature vector which is closest to the representative feature vector of this group. The predictive image may be one that is obtained by averaging character images corresponding to plural feature vectors which are included in the respective groups in the vector image space.

Finally, in the entropy coding means 1105, as in the ninth embodiment, arithmetic coding utilizing the correlation between the predictive image and the target image is carried out based on the predictive image data outputted from the predictive image generation means 1104.

As described above, the image coding apparatus 1100 of this eleventh embodiment is provided with the image feature extraction means 1101 which extracts an identifier corresponding to an image which is similar to a target image, as an image feature, from the target image. The image coding apparatus 1100 obtains the similar image as a predictive image of the target image based on the identifier, and subjects data of the target image to arithmetic coding with reference to the similar image. Therefore, the coding efficiency of the arithmetic encoder is improved, and coded data De of the target image can be retrieved by using the identifier.

Further, feature vectors Vc corresponding to the respective character images which are included in the target image (document image) are quantized, and predictive images corresponding to the respective character images are generated based on the representative feature vectors corresponding to these feature vectors Vc. Therefore, one representative feature vector is output as data of each character in the document image, whereby the character data of the document image is prevented from being redundant and, further, an adverse effect of errors in character recognition (variations in feature extraction) is reduced when performing retrieval of the document image using the character data.

Twelfth Embodiment

Figure 12:
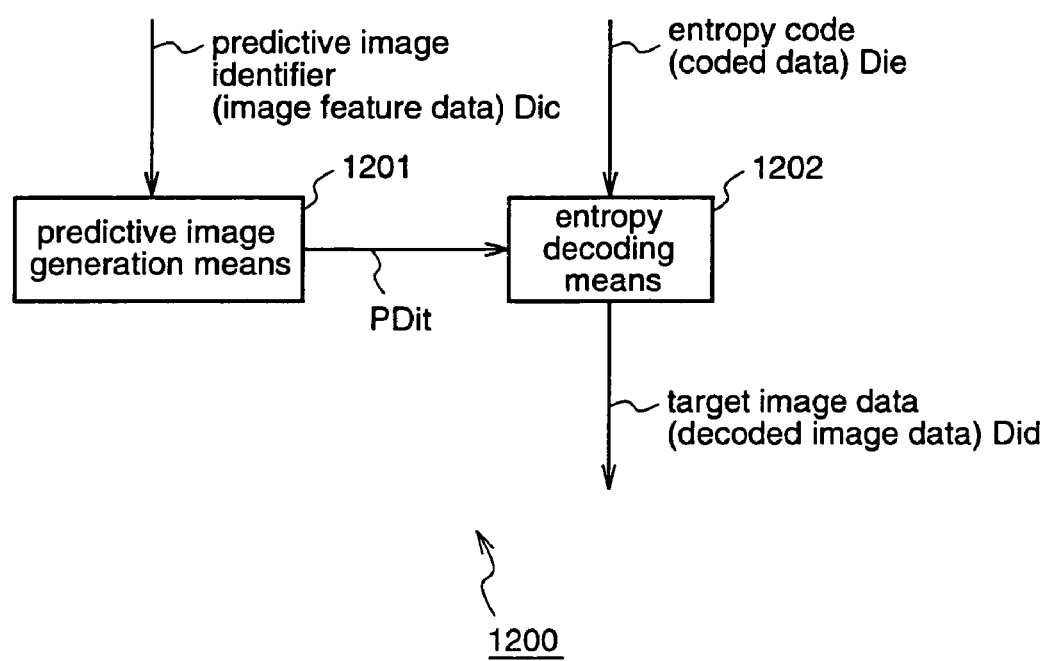
FIG. 12 is a block diagram for explaining an image decoding apparatus according to a twelfth embodiment of the present invention.

FIG. 12 is a block diagram illustrating the structure of an image decoding apparatus according to a twelfth embodiment of the present invention. This twelfth embodiment corresponds to the sixteenth aspect described above.

An image decoding apparatus 1200 of this twelfth embodiment is adaptable to the image coding apparatus 1100 according to the eleventh embodiment, and the image decoding apparatus 1200 is used as an image decoding means in an electronic device having a scanner, such as the document filing apparatus 3900 shown in FIG. 39 or a facsimile.

That is, this image decoding apparatus 1200 receives entropy codes (coded data) Die and image feature data (predictive image identifier) Dic which are output from the image coding apparatus 1100 according to the eleventh embodiment, and subjects the coded data Die to arithmetic decoding with reference to predictive image data PDit which is generated based on the image feature data Dic.

To be specific, the image decoding apparatus 1200 includes a predictive image generation means 1201 which generates predictive image data PDit on the basis of the image feature data Dic, and an entropy decoding means 1202 which subjects the coded data Die to arithmetic decoding with reference to the predictive image data PDit and outputs decoded image data Did corresponding to the target image.

The image feature is an identifier indicating a similar image as described in the eleventh embodiment, and the target image is a binary image. The coded data Die to be input is entropy codes which are obtained by arithmetic coding utilizing the correlation between the target image and the predictive image (similar image) in the image coding apparatus according to the eleventh embodiment.

It is now assumed that the above-mentioned identifier corresponds to a representative feature vector which is obtained by performing vector quantization on the above-mentioned feature vector.

The operation of the image decoding apparatus 1200 will now be described.

When the coded data Die and the image feature data (predictive image identifier) Dic are input to the image decoding apparatus 1200 of this twelfth embodiment, the predictive image generation means 120 generates data of an image which is similar to the target image (predictive image data) PDit based on the predictive image identifier Dic.

In the entropy decoding means 1202, the coded data Die corresponding to the target image is subjected to arithmetic decoding with reference to the predictive image data PDit, and decoded image data Did corresponding to the target image is output.

As described above, the image decoding apparatus 1200 of this twelfth embodiment is provided with the predictive image generation means 1201 which generates the predictive image data PDit of the image which is similar to the target image based on the image feature data (predictive image identifier) Dic corresponding to the target image, and the coded data Die is subjected to arithmetic decoding with reference to the predictive image data PDit. Therefore, it is possible to realize an image decoding apparatus which can correctly decode the entropy codes which are obtained by efficient entropy coding utilizing the correlation between the target image acid the predictive image.

Further, a facsimile which is provided with the image coding apparatus 1100 of the eleventh embodiment and the image decoding apparatus 1200 of the twelfth embodiment is realized by replacing the image coding unit 200a and the image decoding unit 300a in the facsimile shown in FIG. 41(*a*) with the image coding apparatus 1100 and the image decoding apparatus 1200, respectively.

Furthermore, a document filing apparatus which is provided with the image coding apparatus 1100 of the eleventh embodiment and the image decoding apparatus 1200 of the twelfth embodiment is realized by replacing the image coding unit 200a and the image decoding unit 300a in the document filing apparatus shown in FIG. 41(*b*) with the image coding apparatus 1100 and the image decoding apparatus 1200, respectively.

Thirteenth Embodiment

Figure 13:
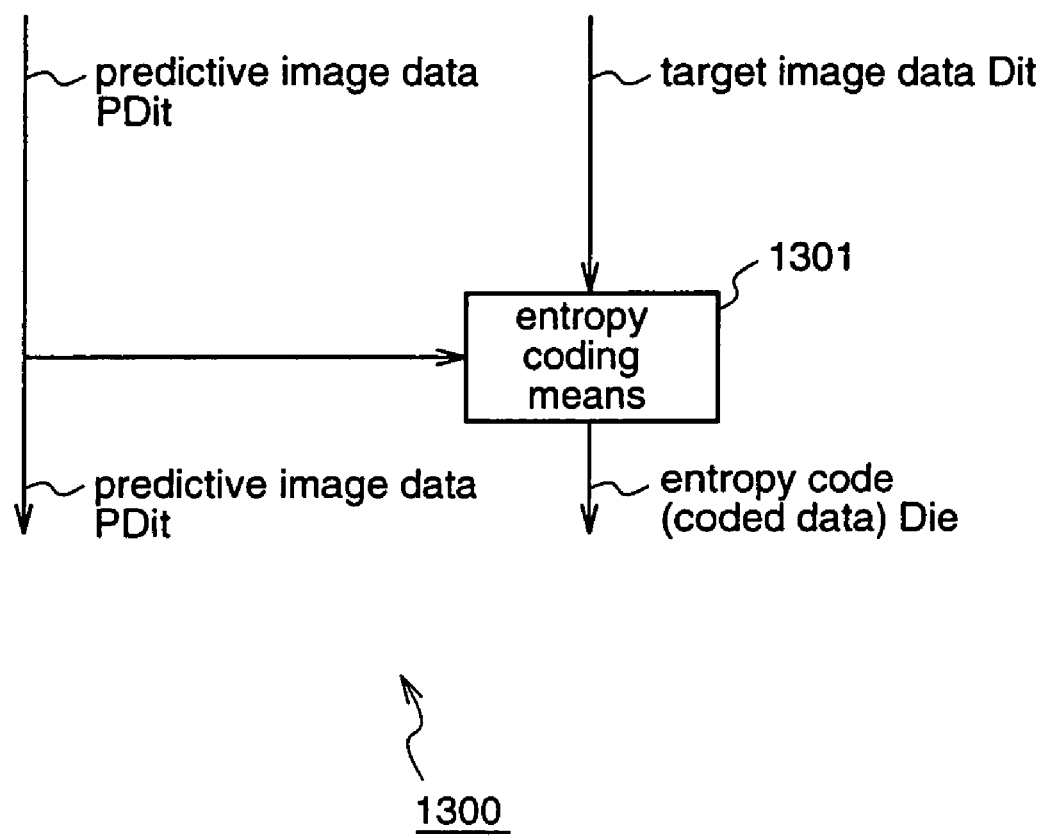
FIG. 13 is a block diagram for explaining an image coding apparatus according to a thirteenth embodiment of the present invention.

FIG. 13 Is a block diagram illustrating the structure of an image coding apparatus according to a thirteenth embodiment of the present invention. This thirteenth embodiment corresponds to the seventeenth aspect described above.

An image coding apparatus 1300 according to this thirteenth embodiment is used as, for example, an image coding means in the document filing apparatus 3900 shown in FIG. 39.

To be specific, the image coding apparatus 1300 includes an entropy coding means 1301 which receives data of a target image to be coded (target image data) Dit and data of a predictive image which is similar to the target image (predictive image data) PDic, and subjects the target image data Dit to arithmetic coding with reference to the corresponding predictive image data PDit so as to output entropy codes corresponding to the target image as its coded data Die.

The function and effect of the image coding apparatus 1300 will now be described.

When the target image data Dit and the predictive image data PDit are input to the image coding apparatus 1300, the entropy coding means 1302 performs arithmetic coding on the target image data Dit with reference to the predictive image data PDit, in the same manner as described for the entropy coding means 106 of the first embodiment.

As described above, the image coding apparatus 1300 of this thirteenth embodiment is provided with the entropy coding means 1301 which performs arithmetic coding on the target image data Dit with reference to the corresponding predictive image data PDit. Therefore, when performing coding on the target image data Dit, the coding efficiency of the arithmetic encoder can be improved by specifying an image which is similar to the target image and inputting its data PDit as predictive image data corresponding to the target image.

Fourteenth Embodiment

Figure 14:
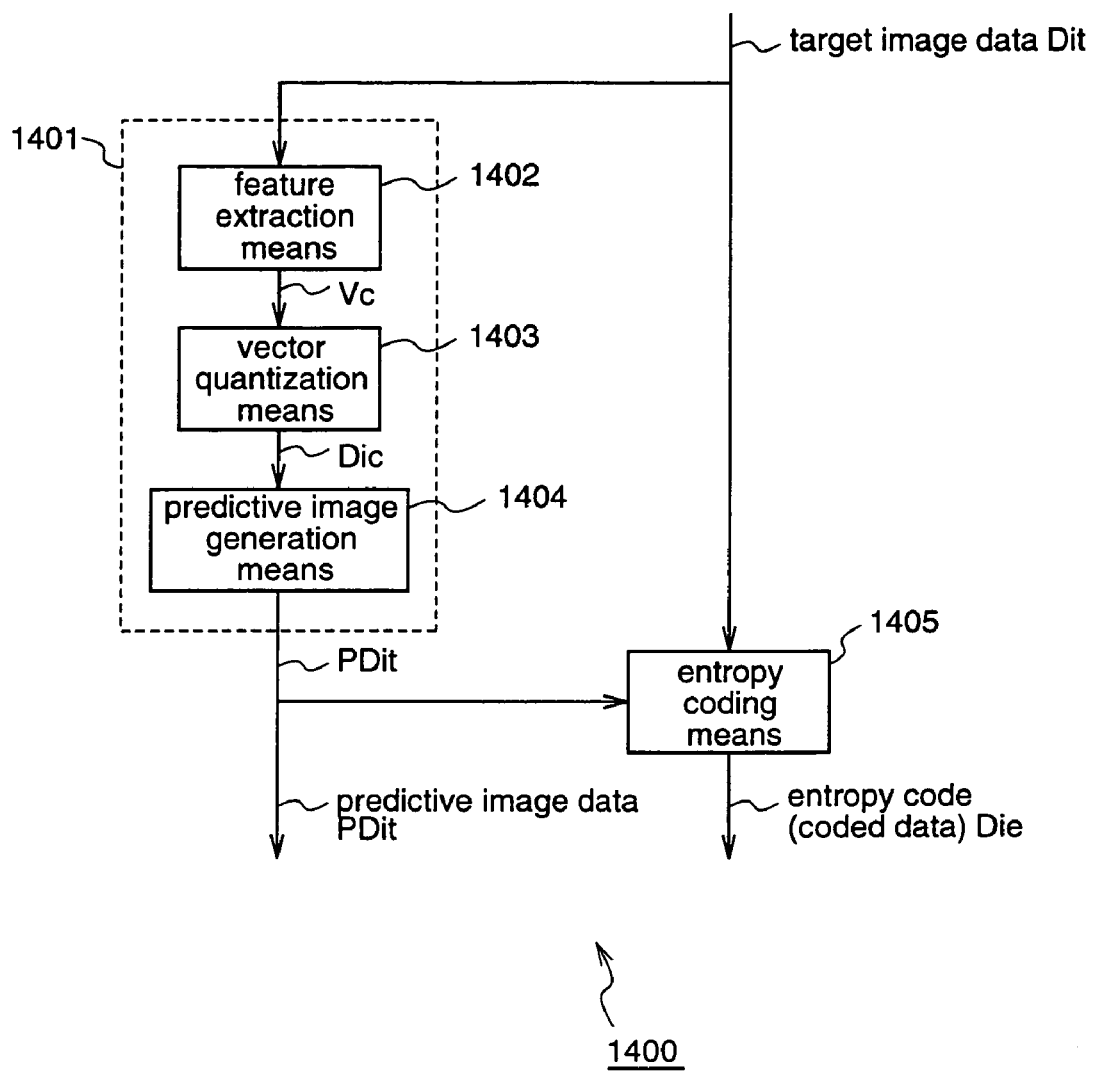
FIG. 14 is a block diagram for explaining do image coding apparatus according to a fourteenth embodiment of the present invention.

FIG. 14 is a block diagram illustrating the structure of an image coding apparatus according to a fourteenth embodiment of the present invention. This fourteenth embodiment corresponds to the eighteenth and nineteenth aspects described above.

An image coding apparatus 1400 according to this fourteenth embodiment is used as an image coding means in an electronic device having a scanner, such as the document filing apparatus 3900 shown in FIG. 39 or a facsimile.

The image coding apparatus 1400 includes an image prediction means 1401 for generating predictive image data PDit corresponding to target image data Dit from the target image data Dit, instead of the image feature extraction means 1101 and the predictive image generation means 1104 of the image coding apparatus 1100 according to the eleventh embodiment. The image coding apparatus 1400 performs arithmetic coding on the target image data Dit with reference to the predictive image data PDit. That is, an entropy coding means 1405 included in the image coding apparatus 1400 is identical to the entropy coding means 1105 of the image coding apparatus 1100 according to the eleventh embodiment.

In this fourteenth embodiment, the image prediction means 1401 comprises a feature extraction means 1402 which extracts, from the target image Dit, a feature vector Vc indicating the feature of a target image to be coded, a vector quantization means 1403 which performs vector quantization on the feature vector of the target image so as to output an identifier Dic of a similar image, and a predictive image generation means 1404 which generates predictive image data PDit corresponding to the target image based on the identifier.

In this fourteenth embodiment, vector quantization is employed as a method for extracting predictive image data, and the feature extraction means 1402, the vector quantization means 1403, and the predictive image generation means 1404 are identical to the feature extraction means 1101, the vector quantization means 1103, and the predictive image generation means 1104 according to the eleventh embodiment, respectively.

The operation of the image coding apparatus 1400 will now be described.

When the target image data Dit is input to the image coding apparatus 1400, the image prediction means 1401 generates predictive image data PDit from the target image data Dit. That is, in the image prediction means 1401, the predictive image data is generated by the feature extraction means 1402, the vector quantization means 1403, and the predictive image generation means 1404 which perform the same processes as described for the corresponding means 1101, 1103, and 1104 according to the eleventh embodiment.

In the entropy coding means 1405, the target image data Dit is subjected to entropy coding utilizing the correlation between the predictive image data PDit and the target image data Dit, in the same manner as described for the entropy coding means 1105 according to the eleventh embodiment.

As described above, the image coding apparatus 1400 of this fourteenth embodiment is provided with the image prediction means 1401 which generates the predictive image data PDit corresponding to the target image data Dit, and the target image Dit is subjected to entropy coding with reference to the predictive image data PDit. Therefore, the coding efficiency of the arithmetic encoder is improved and, furthermore, coded data De of the target image can be retrieved using the predictive image data PDit.

Fifteenth Embodiment

Figure 15:
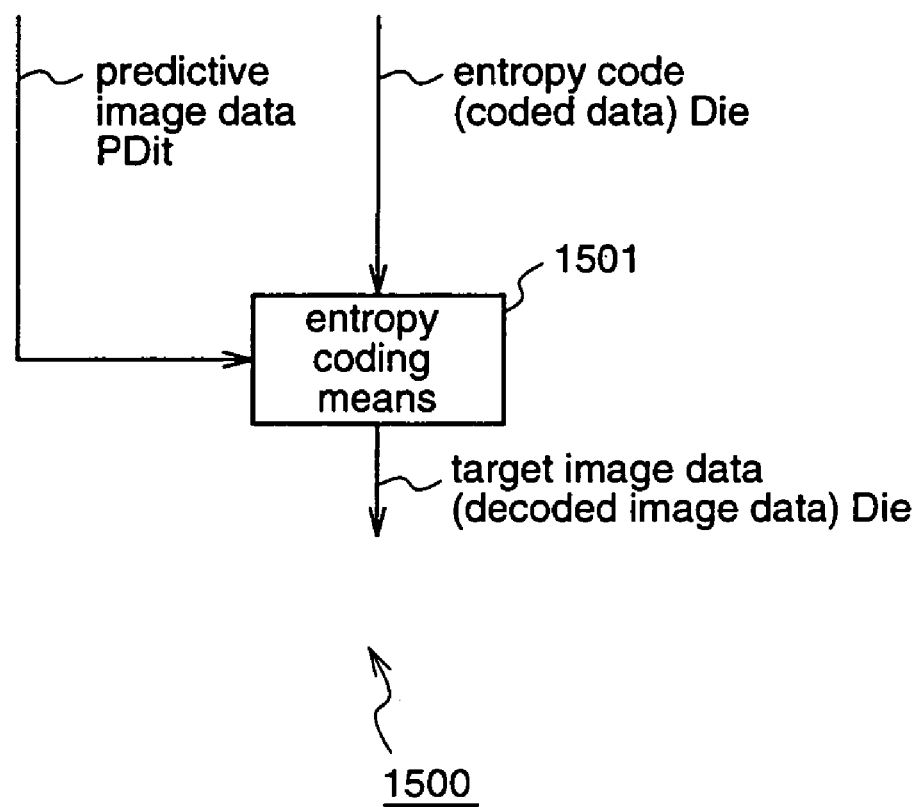
FIG. 15 is a block diagram for explaining an image decoding apparatus according to a fifteenth embodiment of the present invention.

FIG. 15 is a block diagram illustrating the structure of an image decoding apparatus according to a fifteenth embodiment of the present invention. This fifteenth embodiment corresponds to the twentieth aspect described above.

An image decoding apparatus 1500 according to this fifteenth embodiment is adapted to the image coding apparatus 1400 of the fourteenth embodiment, and the image decoding apparatus 1500 is used as an image decoding means in an electronic device having a scanner, such as the document filing apparatus 3900 shown in FIG. 39 or a facsimile.

That is, the image decoding apparatus 1500 receives the entropy codes (decoded data) Die and the predictive image data PDit which are output from the image coding apparatus 1400 of the fourteenth embodiment, and performs arithmetic decoding un the coded data Die with reference to the predictive image data PDit.

The operation of the image decoding apparatus 1500 will now be described.

When the coded data Die and the predictive image data PDic are input Lo the image decoding apparatus 1500, the entropy decoding means 1501 performs arithmetic coding on the coded data Die of the target image with reference to the predictive image data PDit so as to output decoded image data Did of the target image.

As described above, in the image decoding apparatus 1500 of the fifteenth embodiment, since the coded data Die of the target image is subjected to entropy decoding with reference to the predictive image data PDit corresponding to the target image, it is possible to realize an image decoding apparatus which can correctly decode entropy codes which are obtained by efficient entropy coding utilizing the correlation between the target image and the predictive image.

A facsimile which is provided with the image coding apparatus 1300 or 1400 of the thirteenth or fourteenth embodiment and the image decoding apparatus 1500 of the fifteenth embodiment is realized by replacing the image coding unit 200a and the image decoding unit 300a in the facsimile shown in FIG. 41(a) with the image coding apparatus 1300 or 1400 and the image decoding apparatus 1500, respectively.

Furthermore, a document filing apparatus which is provided with the image coding apparatus 1300 or 1400 of the thirteenth or fourteenth embodiment and the image decoding apparatus 1500 of the fifteenth embodiment is realized by replacing the image coding unit 200a and the image decoding unit 300a in the document filing apparatus shown in FIG. 41(b) with the image coding apparatus 1300 or 1400 and the image decoding apparatus 1500, respectively.

Sixteenth Embodiment

Figure 16:
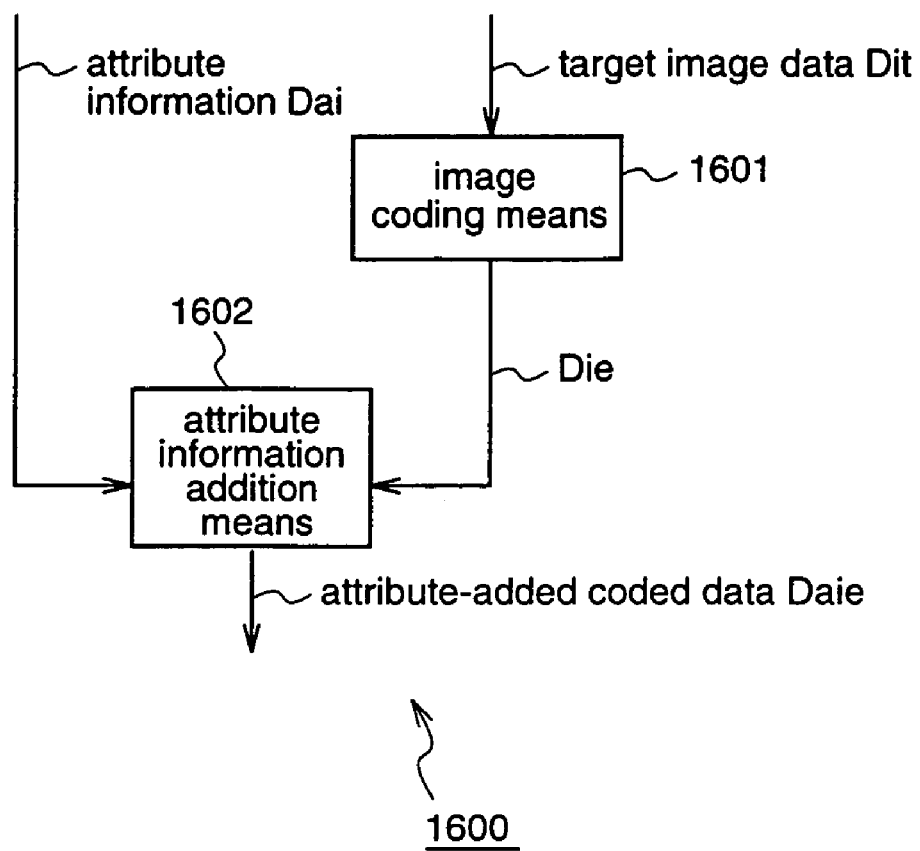

FIG. 16 is a block diagram illustrating the structure of an image coding apparatus according to a sixteenth embodiment of the present invention. This sixteenth embodiment corresponds to the thirty-third aspect described above.

An image coding apparatus 1600 of this sixteenth embodiment is used as an image coding means in an electronic device having a scanner, such as the document filing apparatus 3900 shown in FIG. 39 or a facsimile.

The image coding apparatus 1600 includes an image coding means 1601 which encodes target image data Dit so as to output coded data Die. The image coding apparatus 1600 also includes an attribute information addition means 1602 which receives attribute information Dai relating to the target image as well as coded data Die of the target image, adds the attribute information Dai to the coded data Die, and outputs attribute-added coded data Daie.

The image coding means 1601 is identical in structure to the image coding apparatus 900 of the ninth embodiment. However, the structure of the image coding means 1601 is not restricted to that of the image coding apparatus 900 of the ninth embodiment. The image coding means 1601 may be constituted by any of the image coding apparatuses according to the eighth, eleventh, thirteenth, and fourteenth embodiments. Although a document image including characters or a character image showing a character itself may be employed as a target image, in this sixteenth embodiment, the target image is a character image, and the attribute information indicates the attribute relating to the character image. Accordingly, the image coding means 1601 outputs, as coded data Die, a character image code corresponding to the character image.

Figure 34:
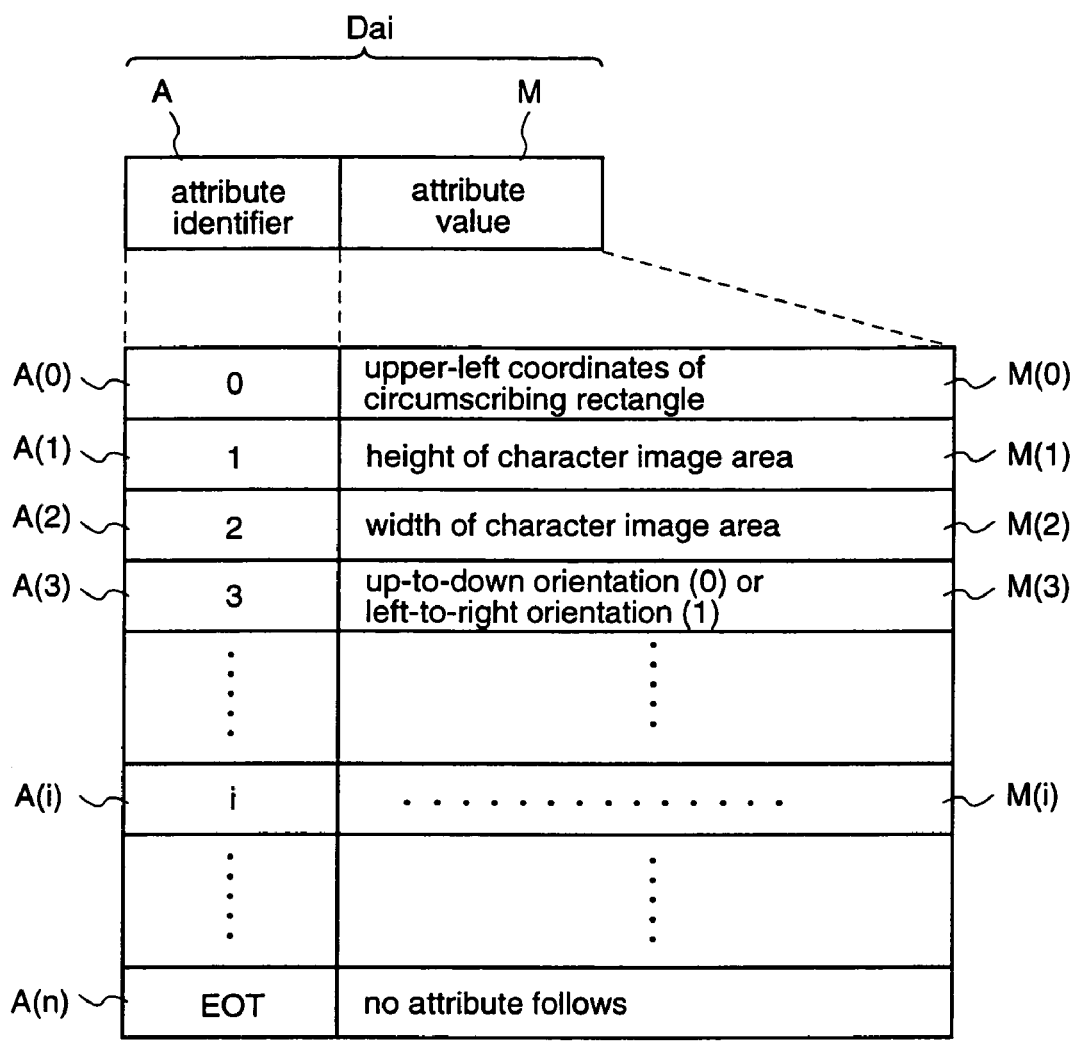
FIG. 34 is a diagram for explaining attribute information according to the sixteenth embodiment.

FIG. 34 is a schematic diagram for explaining the attribute information relating to the character image.

The attribute information includes plural attribute items as follows: the position where the target character image to be coded has been placed in the document image; the height and width of the character image area in the document image; and the orientation (i.e., either top-to-bottom or left-to-right) of the character image areas in the document image. The position of the character image in the document image is represented by the coordinates of an upper-left apex of a rectangle circumscribing the character image (the upper-left coordinates of the circumscribing rectangle). The height of the character image area is the dimension of the character image in the vertical direction.

As shown in FIG. 34, each of the respective attribute items included in the attribute information is described by a set of an identifier A(i) [i=0,1,2, . . . , n) for identifying the attribute item (attribute identifier) and an attribute value M(i) [i=0,1,2, . . . , n] indicating the attribute item in quantity (usually, vectors), and the end of one attribute information in a code sequence is indicated by a special attribute identifier called EOT (End of Table).

For example, an attribute identifier A(O) shows the upper-left coordinates of the circumscribing rectangle as an attribute item and has a value "0", and an attribute value M(0) shows the value of the upper-left coordinates of the circumscribing rectangle. An attribute identifier A(1) shows the height of the character image area as an attribute item and has a value "1", and an attribute value M(1) is a numerical value of the height of the character image area. An attribute identifier A(2) shows the width of the character image area as an attribute item and has a value "2", and an attribute value M(2) is a numerical value of the width of the character image area. All attribute identifier A(3) indicates the orientation, i.e., either top-to-bottom (0) or left-to-right (1), of the character images as an attribute item, and has a value "3", and an attribute value M(3) is either a numerical value "0" indicating the top-to-bottom orientation (0) or a numerical value "1" indicating the left-to-right orientation (1). Further, an attribute identifier A(i) shows the i-th attribute item and has a predetermined value "i", and an attribute value M(i) is a predetermined numerical value indicating the i-th attribute item. Furthermore, an attribute identifier A(n) shows that there is no attribute item following the n-th attribute item, and has a symbol "EOT".

Figure 35A:
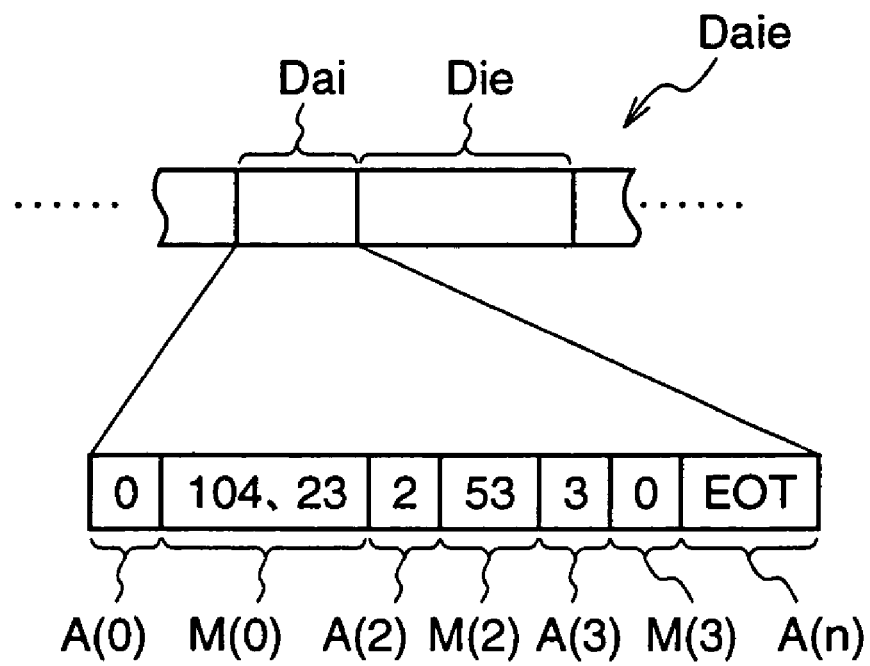
FIG. 35(a) is a schematic diagram illustrating an example of attribute information according to the sixteenth embodiment.

FIG. 35(a) shows a code sequence in attribute-added coded data Daie in the case where attribute information of a character image has the following three attribute items: the coordinates (104,23) of the circumscribing rectangle, the width (53) of the character image area, and the top-to-bottom orientation (0).

In this attribute-added coded data Daie, the attribute information Dai is placed before the coded data Die of the character image, and the code sequence corresponding to this attribute information Dai includes a pair of an attribute identifier A(0) having a value "0" and an attribute value M(0) having a value (104,23), a pair of an attribute identifier A(2) having a value "2" and an attribute value M(2) having a value (53), and a pair of an attribute identifier A(3) having a value "3" and an attribute value M(3) having a value (0). An attribute identifier A(n) having a symbol "EOT" is placed after the attribute value M(3).

The operation of the image coding apparatus 1600 will now be described.

When data Dit of a target image (character image) is input to the image coding apparatus 1600 of this sixteenth embodiment, the image coding means 1601 subjects the target image data Dit to entropy coding with reference to predictive image data PDit, similar to the image coding apparatus 900 of the ninth embodiment, and outputs coded data (character image code) Die as well as image feature data Dic.

At this time, the attribute information addition means 1602 receives the character image code Die, and attribute information Dai of the target image (input character image) from the outside. Then, the attribute information addition means 1602 adds the attribute information Dai to the character image code Die, and outputs attribute-added coded data Daie.

As described above, the image coding apparatus 1600 of this sixteenth embodiment is provided with a coding means of the same structure as that of the image coding apparatus 900 of the ninth embodiment as the image coding means 1601 for coding the character image data and outputting the coded data (character image code) Die, and the attribute information Dai is added to the character image code Die to be output from the image coding means 1601. Therefore, in addition to the effects of the ninth embodiment, the attribute of the character image is obtained without decoding the character image code.

Further, when performing retrieval of the character image using the image feature data, a narrower-scope retrieval can be performed with reference to the attribute information of the character image.

Seventeenth Embodiment

Figure 17:
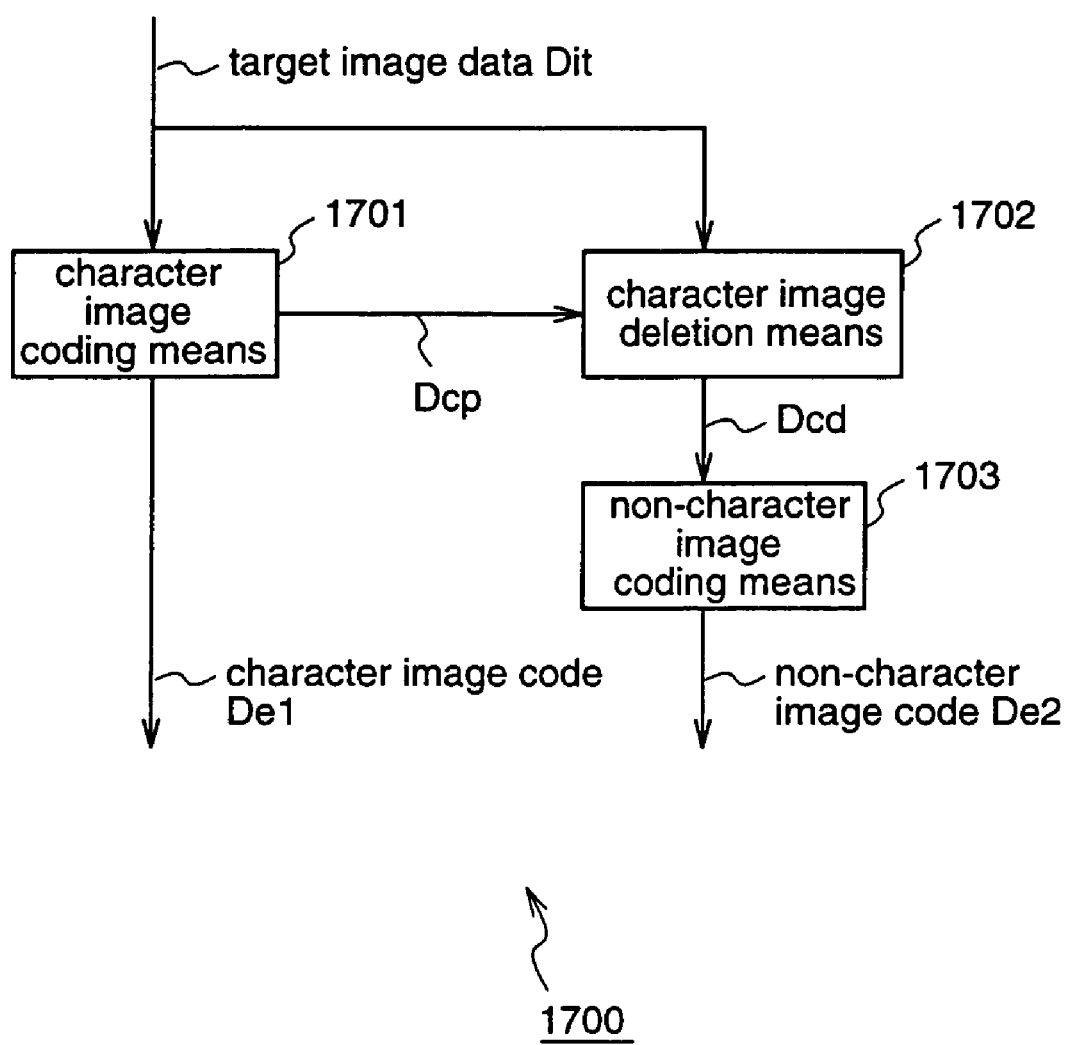
FIG. 17 is a block diagram for explaining an image coding apparatus according to a seventeenth embodiment of the present invention.

FIG. 17 is a block diagram illustrating the structure of an image coding apparatus according to a seventeenth embodiment of the present invention. This seventeenth embodiment corresponds to the thirty-fourth aspect described above.

An image coding apparatus 1700 of this seventeenth embodiment is used as an image coding means in an electronic device having a scanner, such as the document filing apparatus 3900 shown in FIG. 39 or a facsimile.

The image coding apparatus 1700 includes: a character image coding means 1701 which receives target image data Dit of a target image, encodes image data of a character image which is included in the target image, and outputs coded data (character image code) De1 of the character image and positional data Dcp indicating the position of the character image in the target image; a character image deletion means 1702 which receives the target image data Dit and the positional data Dcp of the character image, and outputs non-character image data Dcd of a non-character image which is obtained by deleting the character image from the target image; and a non-character image coding means 1703 which encodes the non-character image data Dcd, and outputs coded data (non-character image code) De2 of the non-character image.

The character image coding means 1701 includes, as its part, the image coding apparatus according to the sixteenth embodiment which encodes the character image data based on the character image data and its attribute information so as to output attribute-added coded data Daie including the attribute information Dai of the character image and the character image code Die.

The operation of the image coding apparatus 1700 will now be described.

When data of a binary document image is input as target image data Dit to the image coding apparatus 1700 of this seventeenth embodiment, the character image coding means 1701 extracts, as a character image, an image of each character part of the target image, encodes the data of each character image, and outputs a character image code De1 as coded data of each character image. At this time, attribute information (not shown) of the character image is output together with the character image code De1.

Next, inn the character image deletion means 1702, each character part (character image) is extracted from the target image (document image). Thereafter, the pixel values of pixels constituting the character-deleted part of the target image are interpolated by the pixel values of pixels that are positioned in the vicinity of the character-deleted part. when the target image is a binary image, the character-deleted part is filled with white pixels. Thereby, non-character image data Dcd (i.e., data corresponding to the image where the pixel values of pixels constituting the character part of the Larger. image is replaced with the pixel values of the peripheral pixels) is output from the character image deletion means 1702.

Finally, in the non-character image coding means 1703, the non-character image data Dcd is encoded by a compressive coding method such as JBIG (Joint Bi-Level Image Coding Experts Group), MMR (Modified Modified Read), or JPEG (Joint Photographic Coding Experts Group), whereby coded data of the non-character image is output as a non-character image code De2.

Hereinafter, the coding process which is performed by the image coding apparatus 1700 will be described more specifically.

Figure 36:
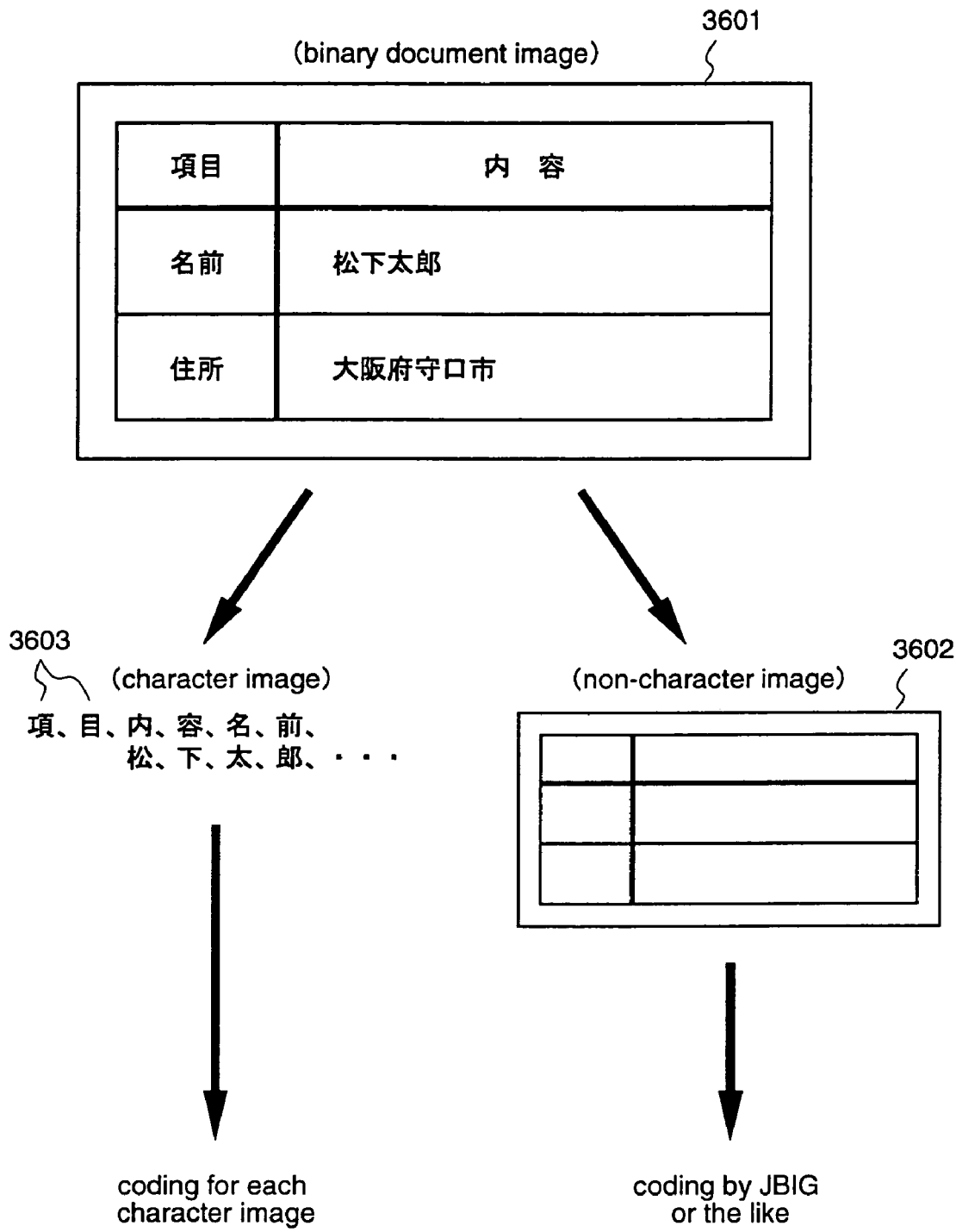
FIG. 36 is a diagram for explaining an example of a process for coding a document image by the image coding apparatus according to the seventeenth embodiment.

FIG. 36 is a diagram for explaining the process which is performed by the image coding apparatus 1700.

For example, when the image coding apparatus 1700 receives a binary document image 3601 as an image of a document using a table together with attribute information indicating the positions and sizes of character images which are included in the document image, the character image coding means 1701 extracts data of the respective character images 3603 in the document image, and encodes the extracted data for each character image. Thereafter, the character image coding means 1701 successively outputs the coded data corresponding to each character image, as a character image code Del.

In the character image deletion means 1702, the part of the document image corresponding to each character image is filled with white pixels (pixel replacement process) based on the attribute information indicating the position and size of each character image which is included in the document image, and non-character image data Dcd of the non-character image 3602, i.e., the document image from which the character parts are deleted, is output.

Then, in the non-character image coding means 1703, the non-character image data Dcd of the non-character image 3602 is encoded by a compressive coding method such as JBIG, MMR, or JPEG, and the coded data of the non-character image is output as a non-character image code De2.

As described above, the image coding apparatus 1700 of this seventeenth embodiment is provided with: the character image coding means 1701 which receives the target image data Dit of the document image, extracts each character image from the document image, and encodes the data of the extracted character image; and the character image deletion means 1702 which receives the document image data Dit, and deletes the character parts from the document image so as to generate data of the non-character image. Thereby, when coding the data of the document image, the character image and the non-character image are coded separately. Therefore, the character image and the non-character image can be coded by different coding methods having high efficiencies and suited to the respective images. Further, document retrieval can be performed utilizing the coded data (character image code) corresponding to each character image.

Eighteenth Embodiment

Figure 18:
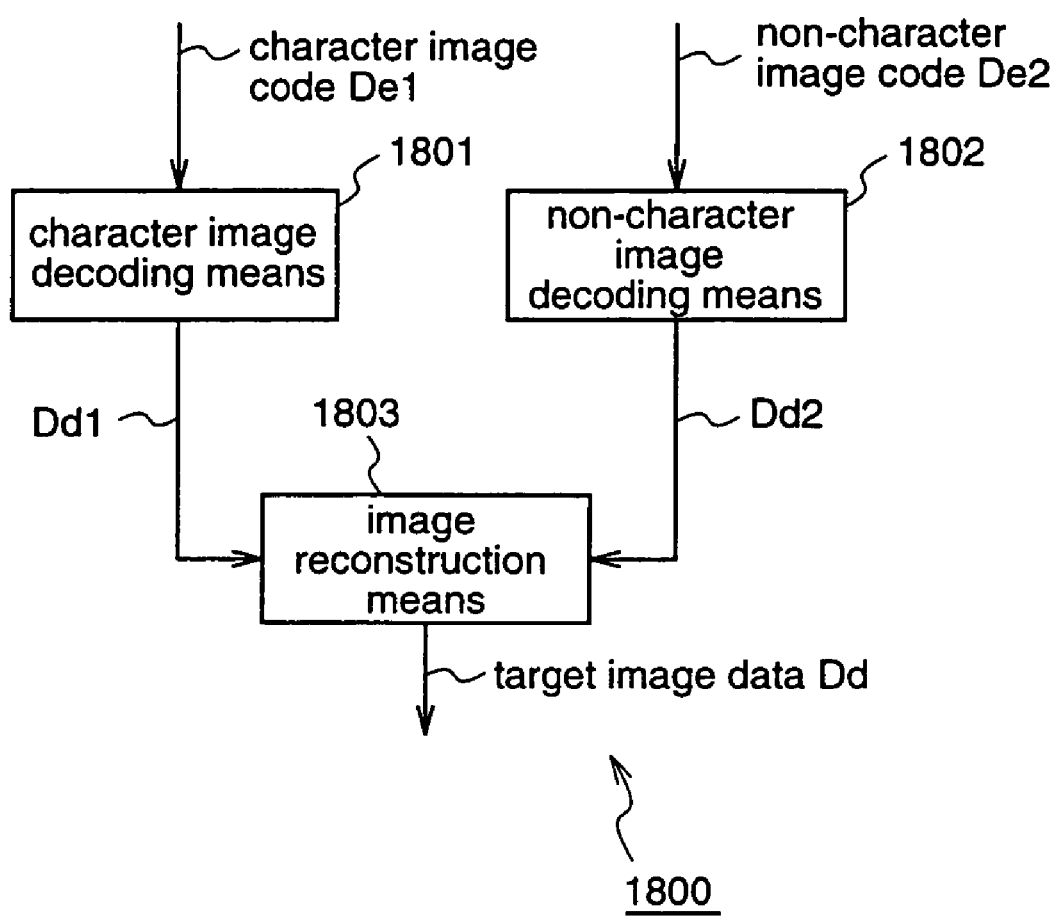
FIG. 18 is a block diagram for explaining an image decoding apparatus according to an eighteenth embodiment of the present invention.

FIG. 18 is a block diagram illustrating the structure of an image decoding apparatus according to an eighteenth embodiment of the present invention. This eighteenth embodiment corresponds to the thirty-fifth aspect described above.

An image decoding apparatus 1800 according to this eighteenth embodiment is adapted to the image coding apparatus 1700 according to the seventeenth embodiment, and the image coding apparatus 1800 is used as, for example, an image decoding means in an electronic device having a scanner, such as the document filing apparatus 3900 shown in FIG. 39 or a facsimile.

The image decoding apparatus 1800 includes: a character image decoding means 1801 which receives sequentially-inputted character image codes Del, and decodes the respective character image codes Del so as to generate character image data Dd1; a non-character image decoding means 1802 which receives a non-character image code De2, and decodes the non-character image code De2 so as to generate non-character image data Dd2; and an image reconstruction means 1803 which receives the non-character image data Dd2 and the character image data Dd1, and reconstructs a document image based on attribute information (not shown) of the document image such that each character image is placed in a predetermined position on the non-character image, thereby generating target image data Dd of the document image as a target image.

The operation of the image decoding apparatus 1800 will now be described.

When the character image codes Del and the non-character image code De2 are input to the image decoding apparatus 1800, the character image decoding means 1801 subjects the character image codes Del to a decoding process which is adapted to the character image coding process performed by the image coding apparatus 1700, thereby generating character image data Dd1. At this time, the non-character image decoding means 1802 subjects the non-character image code De2 to a decoding process which is adapted to the non-character image coding process performed by the image coding apparatus 1700, thereby generating non-character image data Dd2.

Thereafter, the image reconstruction means 1803 reconstructs a document image based on the attribute information (not shown) of the document image by using the non-character image data Dd2 and the character image data Dd1, thereby generating target image data Dd of the document image wherein the respective character images are placed in predetermined positions on the non-character image.

As described above, in the image decoding apparatus 1800 of this eighteenth embodiment, the coded data Del of the respective character images in the document image and the coded data De2 of the non-character image, which is obtained by deleting the character images from the document image, are received separately as coded data corresponding to the document image, and the respective coded data are decoded separately so as to generate the character image data Dd1 and the non-character image data Dd2. Thereafter, the document image is reconstructed based on these data Dd1 and Dd2 so as to generate document image data Dd. Therefore, it is possible to realize an image decoding apparatus which can correctly decode the coded data Del and De2 which have been obtained by efficient coding methods that are suited to the character images and the non-character image, respectively.

Further, the document image can be retrieved by using the coded data (character image codes) corresponding to the character images.

A facsimile which is provided with the image coding apparatus 1600 or 1700 of the sixteenth or seventeenth embodiment and the image decoding apparatus 1800 of the eighteenth embodiment is realized by replacing the image coding unit 200a and the image decoding unit 300a in the facsimile shown in FIG. 41(*a*) with the image coding apparatus 1600 or 1700 and the image decoding apparatus 1800, respectively.

Furthermore, a document filing apparatus which is provided with the image coding apparatus 1600 or 1700 of the sixteenth or seventeenth embodiment and the image decoding apparatus 18UO of the eighteenth embodiment is realized by replacing the image coding unit 200a and the image decoding unit 300a in the document filing apparatus shown in FIG. 41(*b*) with the image coding apparatus 1600 or 1700 and the image decoding apparatus 1800, respectively.

Nineteenth Embodiment

Figure 19:
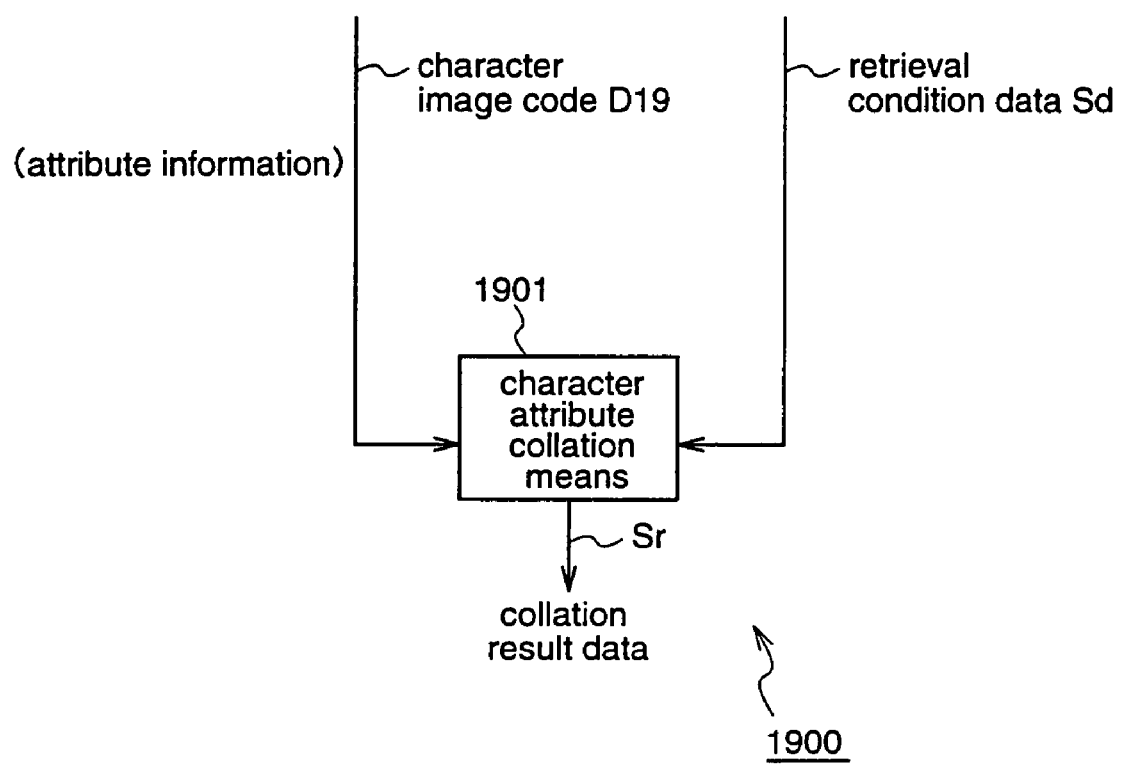
FIG. 19 is a block diagram for explaining a character collation apparatus according to a nineteenth embodiment of the present invention.

FIG. 19 is a block diagram illustrating the structure of a character collation apparatus according to a nineteenth embodiment of the present invention. This nineteenth embodiment corresponds to the thirty-sixth aspect described above.

The character collation apparatus 1900 of this nineteenth embodiment is used as a component of an information retrieval apparatus which is employed in an electronic device such as the document filing apparatus 3900 shown in FIG. 39.

The character collation apparatus 1900 includes a character attribute collation means 1901 which receives a character image code D19 to which attribute information Dai is added, and outputs collation result data Sr indicating the result of collation as to whether the character image code D19 satisfies an externally supplied retrieval condition based on retrieval condition data Sd of the retrieval condition.

The character image code D19 to which the attribute information Dai is added is identical in data structure to the attribute-added coded data Daie which is outputted from the image coding apparatus 1600 of the sixteenth embodiment.

This attribute information includes attribute identifiers A(i) and attribute values M(i) corresponding to various kinds of attributes, and the attribute information comprises a set of plural pairs of attribute identifiers and attribute values (generally, vectors) corresponding to the respective attribute items.

Further, the retrieval condition data Sd includes plural conditions according to the respective attributes (attribute-based conditions), and each attribute-based condition is described by a pair of an attribute identifier and a conditional expression having a variable as its attribute value. When the attribute value of a specific attribute in the character image code D19 satisfies the conditional expression of the attribute value of the corresponding attribute-based condition, this condition is regarded as "true". when the attribute value of the specific attribute does not satisfy the conditional expression of the attribute value of the corresponding attribute-based condition, this condition is regarded as "false".

When all of the attribute-based conditions in the retrieval condition are "true", it is decided that the character image code to be retrieved satisfies the retrieval condition.

Figure 35B:
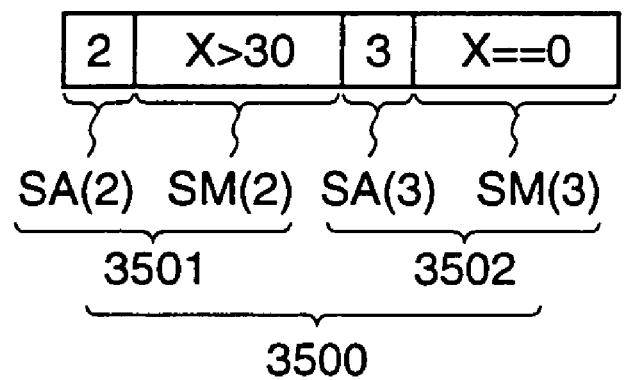
FIG. 35(b) is a schematic diagram illustrating an example of a retrieval condition according to the nineteenth embodiment.

For example, it is assumed that the character image code D19 has attribute information as shown in FIG. 35(*a*). That is, the attribute value M(O) of the attribute (the upper-left coordinates of the circumscribing rectangle) shown by the attribute identifier A(O) is (104,23), the attribute value M(2) of the attribute (the width of the character image area) shown by the attribute identifier A(2) is 53, and the attribute value M(3) of the attribute (up-to-down or left-to-right) shown by the attribute identifier A(3) is 0 (up-to-down).

Further, as shown in FIG. 35(*b*), the retrieval condition includes two attribute-based conditions 3501 and 3502. The attribute-based condition 3501 includes an attribute identifier SA(2) and a conditional expression SM(2) of an attribute value relating to an attribute (the width of the character image area) which is shown by the identifier, and the conditional expression SA(2) of the attribute value is x>30 which means that the width is larger than 30. The attribute-based condition 3502 includes an attribute identifier SA(3) and an attribute value SM(3) relating to an attribute (up-to-down or left-to-right) which is shown by the identifier, acid the attribute value SM(3) is X==0 which means that the orientation is up-to-bottom.

Since the character image code D19 having the attribute information Dai shown in FIG. 35(*a*) satisfies both of the two attribute-based conditions 3501 and 3502 in the retrieval condition 3500, the character image code 019 is decided as satisfying the retrieval condition 3500.

The operation of the character collation apparatus 1900 will now be described.

When the character image code D19 and the retrieval condition data Sd indicating the retrieval condition 3500 are input to the character collation apparatus 1900, the character attribute collation means 1901 decides whether or not the character image code D19 satisfies each of the attribute-based conditions in the retrieval condition 3500.

That is, since the retrieval condition 3500 includes the attribute-based condition 3501 comprising the attribute identifier SA(2) and the attribute value SM(2), and the attribute-based condition 3502 comprising the attribute identifier SA(3) and the attribute value SM(3) as shown in FIG. 35(*b*), the character image satisfying the retrieval condition should be one having a width of its area larger than 30 and being oriented up-to-down.

On the other hand, since the character image code D19 has the attribute information including the attribute identifiers A(0), A(2) and A(3) and the attribute values M(0), M(2) and M(3) as shown in FIG. 35(*a*), it is clear that this character image has the upper-left coordinates (104,23) of its circumscribing rectangle and the width (53) of its area, and is oriented up-to-down.

Accordingly, the character attribute collation means 1901 decides that the character image corresponding to the character image code D19 satisfies both of the attribute-based conditions 3501 and 3502 in the retrieval condition 3500, and the character collation apparatus 1900 outputs, for example, a large character which is included in the title line of the document image, and a character image code (coded data of a character image) corresponding to an up-to-down character line.

As described above, the character collation apparatus 1900 of this nineteenth embodiment is provided with the character collation means 1901 which collates the attribute information attached to the character image code and the retrieval condition so as to decide whether the attribute information satisfies the retrieval condition. Therefore, even in the state where the character image data is coded, only a large character which is included in the title line of the document image or only a character line such as an up-to-down oriented line can be extracted.

Twentieth Embodiment

Figure 20:
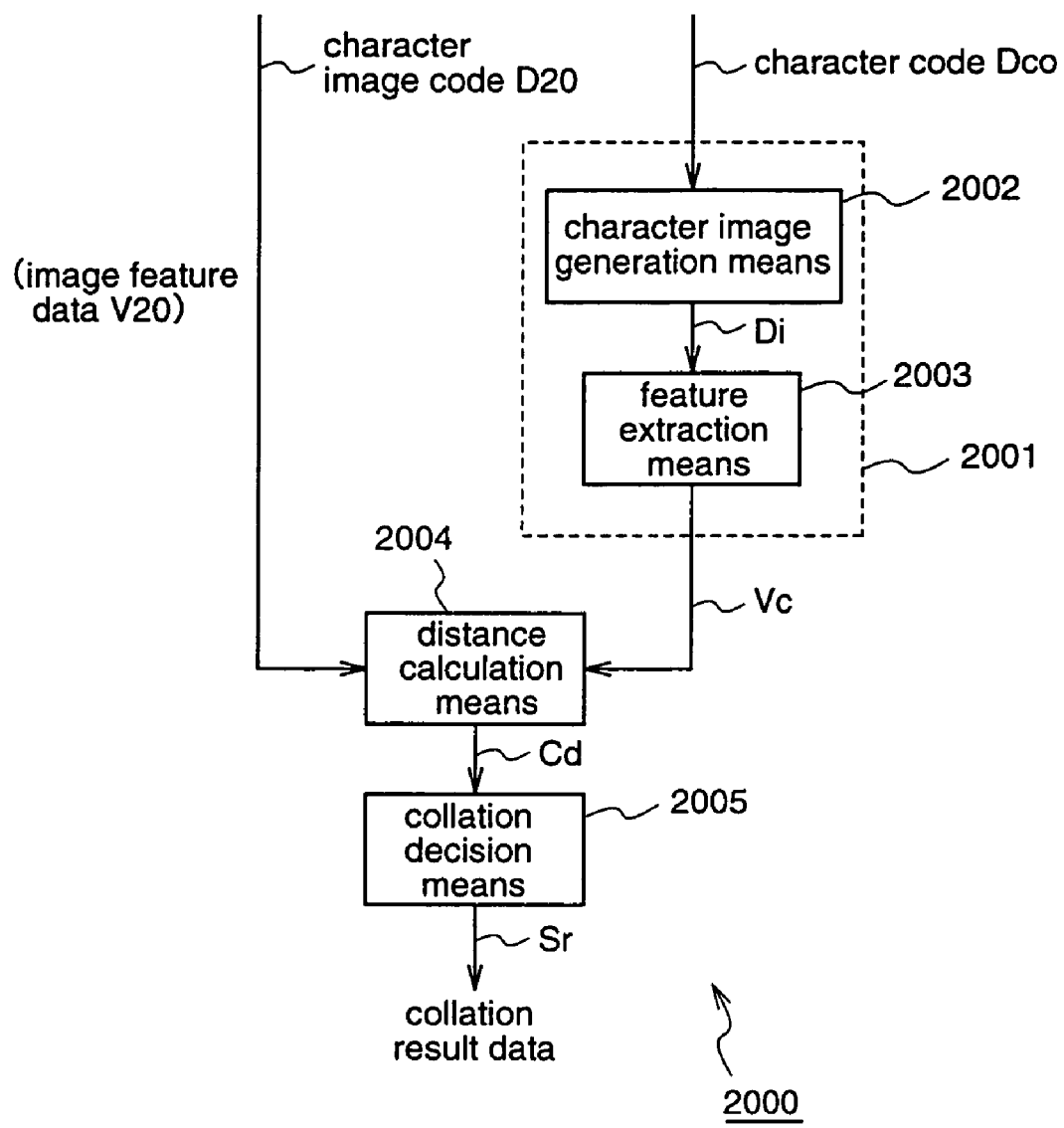
FIG. 20 is a block diagram for explaining a character collation apparatus according to a twentieth embodiment of the present invention.

FIG. 20 is a block diagram illustrating the structure of a character collation apparatus according to a twentieth embodiment of the present invention. This twentieth embodiment corresponds to the thirty-seventh and the thirty-eight aspects described above.

A character collation apparatus 2000 according to this twentieth embodiment is used as a component of an information retrieval apparatus which is employed in an electronic device such as the document filing apparatus 3900 shown in FIG. 39.

This character collation apparatus 2000 receives a character image code Dco specifying an externally supplied character image, collates a character image corresponding to a character image code D20 to which image feature data V20 is attached, with the character image specified by the character code, and outputs collation result data Sr indicating the result of the collation.

To be specific, the character collation apparatus 2000 includes an image feature extraction means 2001 for extracting an image feature which is included in the character image specified by the character code. The image feature extraction means 2001 comprises: a character image generation means 2002 which generates character image data Di of a character image that is specified by the character code Dco; and a feature extraction means 2003 which receives the character image data Di, extracts the image feature that is included in the character image specified by the character code, and outputs image feature data Vc. The image feature data V20 and the image feature data Vc are represented by vectors similar to the image feature data that is outputted from the character extraction means 1102 of the image coding apparatus 1100 according to the eleventh embodiment.

The character collation apparatus 2000 further includes: a distance calculation means 2005 which obtains a Euclidean distance between the image feature data V20 possessed by the character image code D20 and the image feature data Vc obtained from the image feature extraction means 2001, and outputs distance information Cd; and a collation decision means 2006 which outputs collation result data Sr indicating the result of collation as to whether the character image corresponding to the character image code D20 matches the character image specified by the character code, based on the distance information Cd.

In this twentieth embodiment, the image feature included in the character image is a reduced image (mesh feature) 3202 as shown in FIG. 32, and the image feature data is a vector comprising plural values which are obtained by scanning the pixel values of the respective pixels (mesh) of the reduced image.

The operation of the character collation apparatus 2000 will now be described.

When the character image code D20 and the character code Dco are input to the character collation apparatus 2000 of the twentieth embodiment, the character image generation meant 2002 generates character image data Di of a character image which is specified by the character code Dco based on character font information used in a computer or the like.

When this character image data Di is input to the feature extraction means 2003, the feature extraction means 2003 extracts the image feature of the character image, and generates image feature data (vector) Vc indicating the image feature. The feature extraction means 2003 performs this process in the same manner as described for the feature extraction means 901 of the ninth embodiment.

When the reduced image obtained as the image feature is composed of 8×8 pixels, the reduced image can be regarded as a vector (feature vector) in the sixty-four-dimensional Euclidean space.

In the distance calculation means 2004, based on the image feature data V20 attached to the character image code D20 and the image feature data Vc outputted from the image feature extraction means 2001, a Euclidean distance between the two feature vectors indicated by these data is obtained, and distance information Cd is output.

In the collation decision means 2005, based on the distance information Cd, it is decided that the character image corresponding to the character image code D20 matches the character image which is specified by the character code Dco when the Euclidean distance is smaller than a predetermined threshold, and it is decided that these character images do not match when the Euclidean distance is larger than the threshold.

As described above, since the character collation apparatus 2000 of this twentieth embodiment is provided with the image feature extraction means 2001 which extracts the image feature of a character image which is specified by the externally supplied character image code Dco so as to output image feature data Vc, the image feature data V20 which is included in the character image code D20 is compared with the image feature data Vc of the character image corresponding to the character code Dco.

Therefore, it is possible to perform collation of corresponding character images between the character image code D20 to which the image feature data V20 is added, and the character code Dco.

Accordingly, when the character image specified by the character code Dco matches the character image corresponding to the character image code D20, the character image corresponding to the character image code D20 is known without decoding the character image code D20, whereby the shape of the character image corresponding to the character image code D20 can be compared with the shape of another character image.

Twenty-First Embodiment

Figure 21:
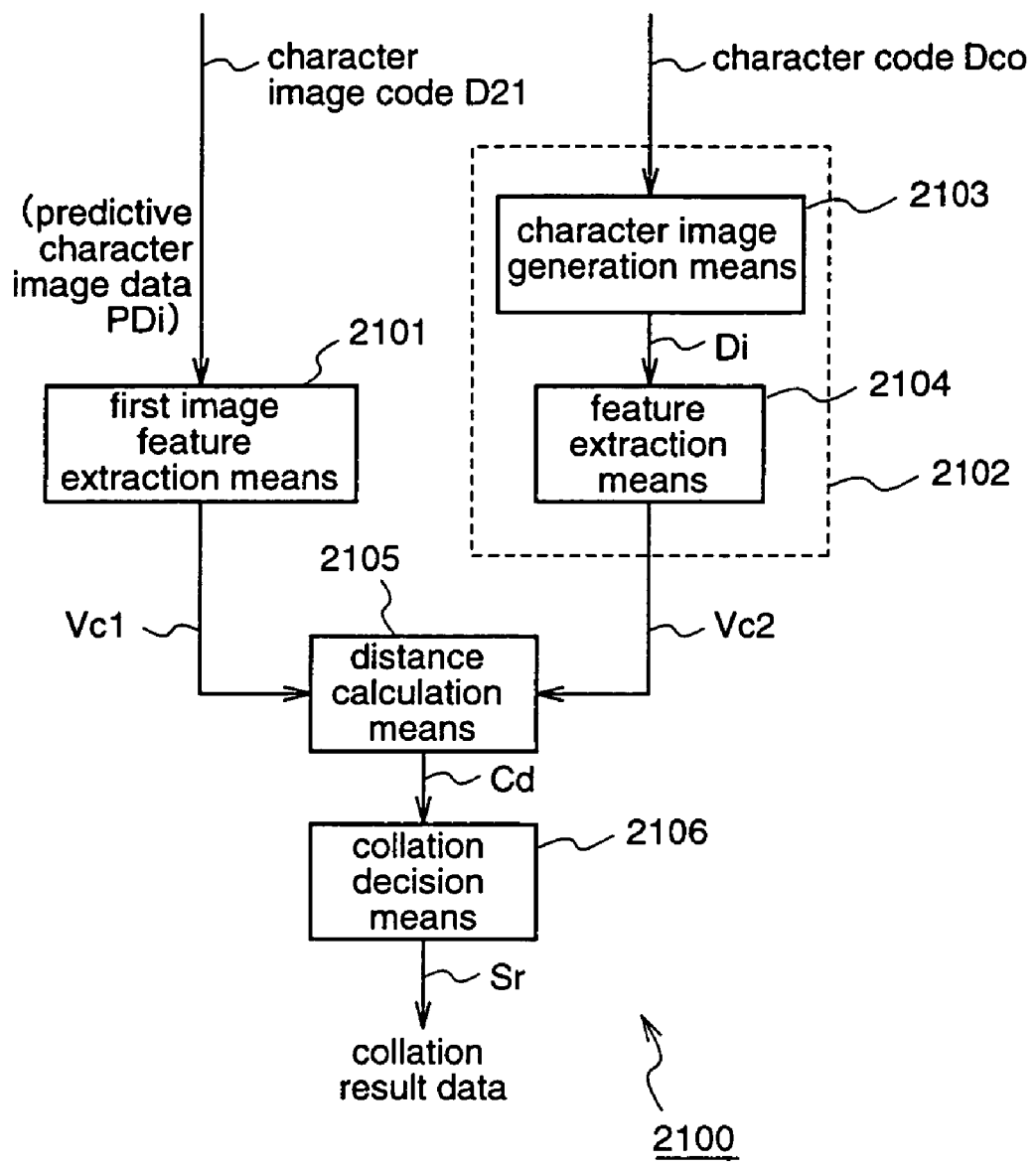
FIG. 21 is a block diagram for explaining a character collation apparatus according to a twenty-first embodiment of the present invention.

FIG. 21 is a block diagram illustrating the structure of a character collation apparatus according to a twenty-first embodiment of the present invention. This twenty-first embodiment corresponds to the thirty-ninth and fortieth aspects described above.

A character collation apparatus 2100 of this twenty-first embodiment is used as a component of an information retrieval apparatus which is employed in an electronic device such as the document filing apparatus 3900 shown in FIG. 39.

The character collation apparatus 2100 receives a character code Dco specifying an externally supplied character image, collates a character image corresponding to a character image code D21 to which data of a predictive character image (predictive character image data PDi) similar to the above-mentioned character image is added, with the character image specified by the character code, and outputs collation result data Sr showing the result of the collation.

That is, the character collation apparatus 2100 is provided with: a first image feature extraction means 2101 which receives the character image code D21, extracts the image feature from the predictive character image based on the predictive character image data PDi added to the code 021, and outputs first image feature data Vc1; and a second image feature extraction means 2102 which receives the character code Dco, extracts the image feature of the character image which is specified by the character code, and outputs second image feature data Vc2.

The second image feature extraction means 2102 comprises a character image generation means 2103 which generates character image data Di of a character image which is specified by the character code Dco, and a feature extraction means 2104 which outputs the second image feature data Vc2 based on the character image data Di. The character image generation means 2103 is identical in structure to the character image generation means 2002 according to the twentieth embodiment, and each of the feature extraction means 2104 and the first image feature extraction means 2101 is identical in structure to the feature extraction means 1102 of the eleventh embodiment. Accordingly, the first and second image feature data vc1 and Vc2 are represented by feature vectors which are used for character recognition or the like in the eleventh embodiment, similar to the image feature data outputted from the feature extraction means 1102 of the image coding apparatus 1100 of the eleventh embodiment.

The character collation apparatus 2100 further includes a distance calculation means 2105 which obtains a Euclidean distance between the first image feature data Vc1 outputted from the first image feature extraction means 2101 and the second image feature data Vc2 outputted from the second image feature extraction means 2103, and outputs distance information Cd. The character collation apparatus 2100 also includes a collation decision means 2106 which outputs collation result data Sr indicating the result of collation as to whether the character image corresponding to the character image code D21 matches the character image specified by the character code based on the distance information Cd outputted from the distance calculation means 2105.

The operation of the character collation apparatus 2100 will now be described.

When the character image code D21 and the character code Dco are input to the character collation apparatus 2100 of this twenty-first embodiment, the character image generation means 2103 performs a process similar to that performed by the character image generation means 2002 of the twentieth embodiment based on the character code Dco, and each of the feature extraction means 2104 and the first image feature extraction means 2101 performs an image feature extraction process similar to that performed by the feature extraction means 1102 of the eleventh embodiment. Thereby, first image feature data (feature vector) vc1 is output from the first image feature extraction means 2101, and second image feature data (feature vector) Vc2 is output from the feature extraction means 2104.

In the distance calculation means 2105, based on the first and second image feature data Vc1 and Vc2, a Euclidean distance between these feature vectors is obtained, and distance information Cd is output.

In the collation decision means 2106, it is decided that the character image corresponding to the character image code D21 matches the character image specified by the character code Dco when the Euclidean distance is smaller than a predetermined threshold, and it is decided that these character images do not match when the Euclidean distance is larger than the threshold.

As described above, the character collation apparatus 2100 of this twenty-first embodiment is provided with: the first image feature extraction means 2101 which receives the character image code D21, and outputs the first image feature data Vc1 corresponding to the predictive character image based on the predictive character image data PDi which is added to the code D21; and the second image feature extraction means 2102 which extracts the image feature of the character image that is specified by the externally supplied character code Dco, and outputs the second image feature data Vc2. Thereby, the image feature data Vc2 of the character image corresponding to the character code Dco is compared with the feature image data Vc1 of the predictive character image which is included in the character image code D21.

Therefore, it is possible to perform collation of the corresponding character images between the character image code D21 to which the predictive character image data PDi is added, and the character code Dco.

Accordingly, when it is decided that the character image which is specified by the character code Dco matches the predictive character image corresponding to the character image code D21, the character image corresponding to the character image code D21 is known without decoding the character image code D21, whereby the shape of the character image corresponding to the character image code D21 can be compared with the shape of another character image.

Twenty-Second Embodiment

Figure 22:
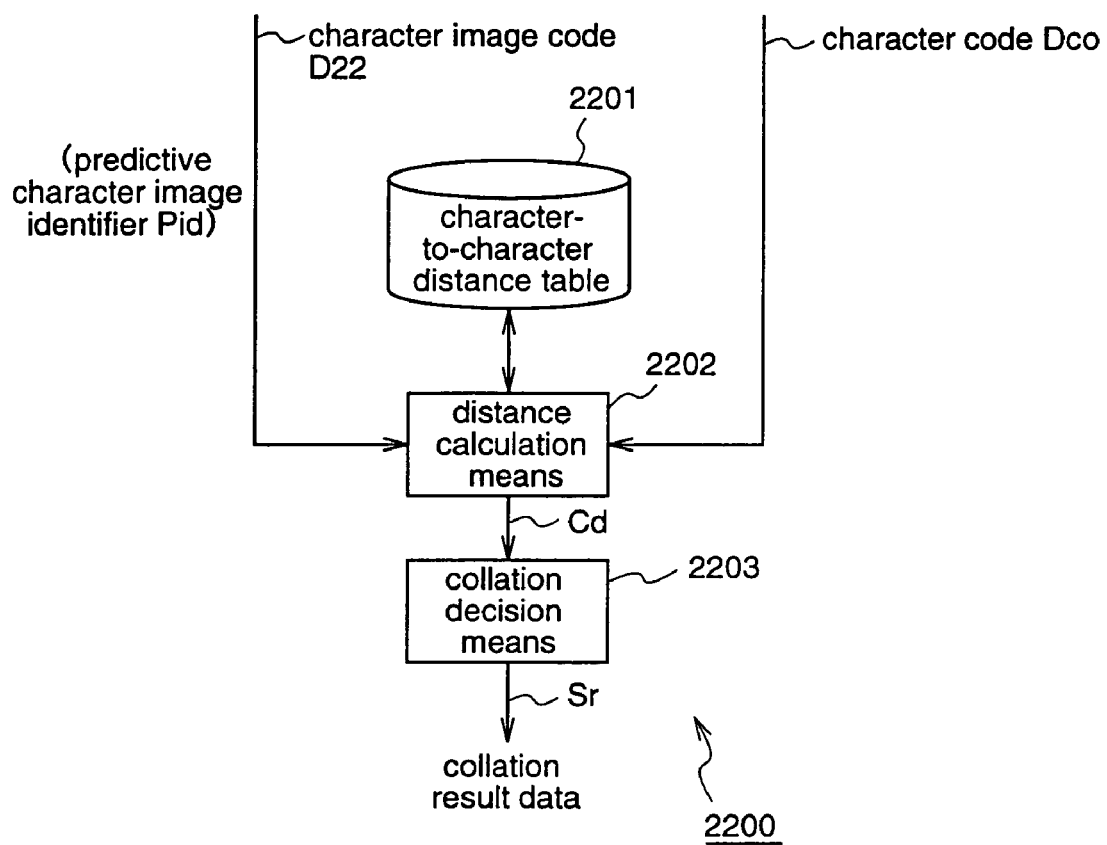
FIG. 22 is a block diagram for explaining a character collation apparatus according to a twenty-second embodiment of the present invention.

FIG. 22 is a block diagram illustrating the structure of a character collation apparatus according to a twenty-second embodiment of the present invention. This twenty-second embodiment corresponds to the forty-first aspect described above.

A character collation apparatus 2200 of this twenty-second embodiment is used as a component of an information retrieval apparatus which is employed in an electronic device such as the document filing apparatus 3900 shown in FIG. 39.

The character collation apparatus 2200 receives a character code Dco specifying an externally supplied character image, collates a character image corresponding to a character image code D21 to which a predictive character image identifier Pid is added with the character image specified by the character code, and outputs collation result data Sr showing the result of the collation. The predictive character image identifier Pid is an identifier for identifying a predictive character image similar Lo the character image specified by the character code Dco.

That is, the character collation apparatus 2200 includes: a table storage unit 2201 which stores a character-to-character distance table 2201 (3701) in which the predictive character image identifier Pid and the character code Dco are respectively associated with distance information which is calculated with the Pid and the Dco as variables; a distance calculation means 2202 which receives the character image code D22 and the character code Dco, and obtains distance information Cd having, as variables, the predictive character image identifier Pid added to the character image code D22, and the character code Dco, with reference to the character-to-character distance table 2201; and a collation decision means 2203 which outputs collation result data Sr indicating the result of collation as to whether the character image corresponding to the character image code D22 matches the character image which is specified by the character code Dco.

Figure 37:
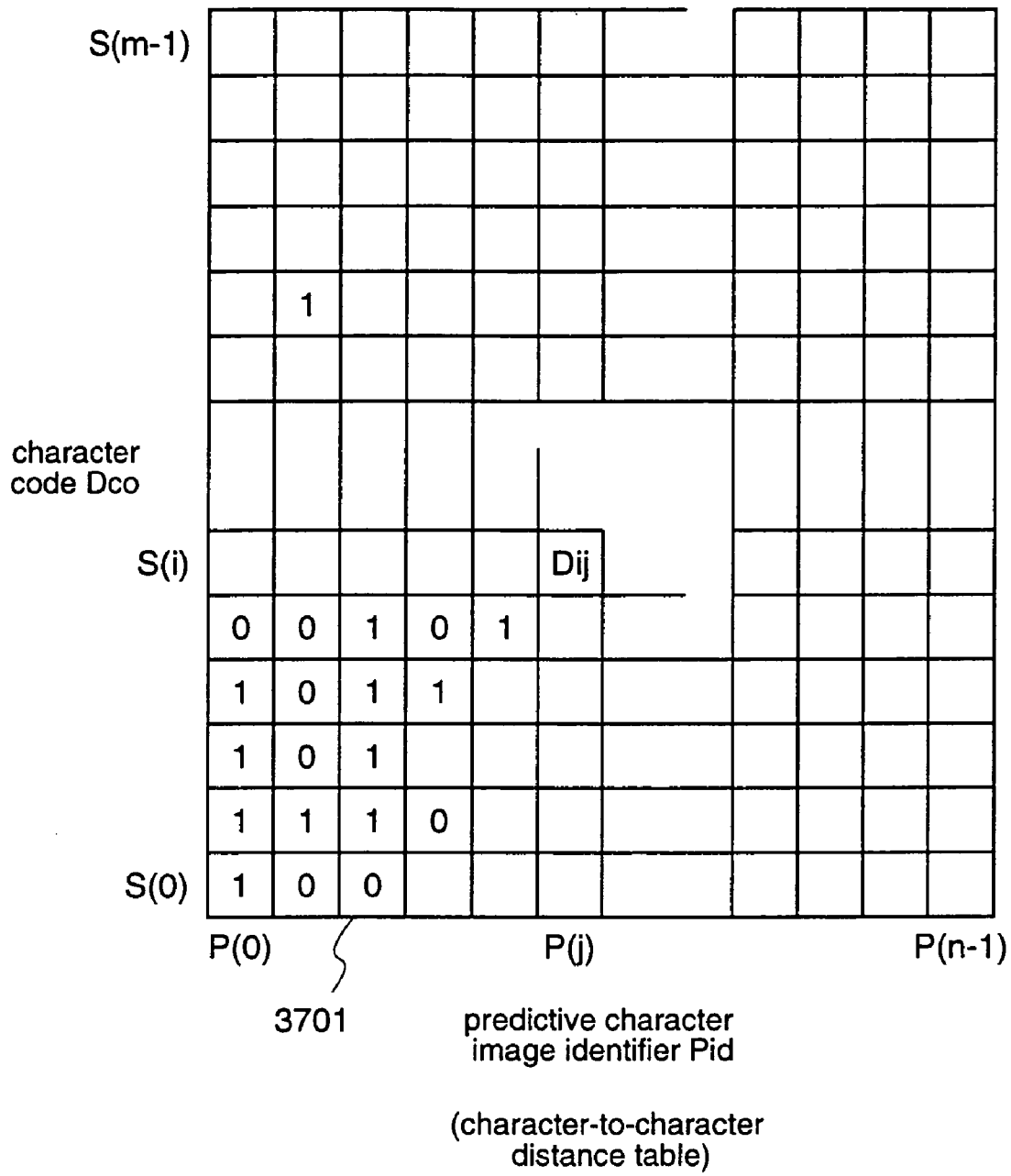
FIG. 37 is a diagram for explaining a character-to-character distance table according to the twenty-second embodiment.

FIG. 37 is a diagram for explaining the character-to-character distance table 3701.

The predictive character image identifier Pid corresponds to each of the representative feature vectors which are obtained by quantizing the feature vectors by the vector quantization means 1103 according to the eleventh embodiment.

In the character-to-character distance table 3701, based on the value P(j) (j=0–n–1) of the predictive character image identifier Pid and the value S(i) (i=0–m–1) of the character code Dco, the value Dij of the distance information Cd having these values as variables is defined.

Hereinafter, the distance information Cd will be described briefly.

The value P(j) of each predictive character image identifier is associated with each representative feature vector V(j) according to the VQ code book. The value S(i) of the character code corresponds to a feature vector W(i) which is obtained in the image feature extraction process performed on the character code, which process is similar to that performed by the image feature extraction means 2001 of the twentieth embodiment.

Each element (value of distance information) Dij of the character-to-character distance table 3701 is a Euclidean distance between the feature vector W(i) and the representative feature vector V(j).

The element (value of distance information) Dij of the character-to-character distance table may be compared with a threshold T, and set at "1" when it is smaller than the threshold T and set at "0" when it is equal to or larger than the threshold T. Thereby, the size of the table is reduced, resulting in high-speed collation. In this case, the collation decision means 2203 decides that the character image matches the character code when the distance is "1", and decides that the character image and the character code do not match when the distance is "0".

The operation of the character collation apparatus 2200 will now be described.

When the character image code D21 and the character code Dco are input to the character collation apparatus 2.200 of this twenty-second embodiment, initially, the distance calculation means 2202 calculates distance information Cd which is defined by the predictive character image identifier Pid that is added to the character image code 022 and the character code Dco, with reference to the character-to-character distance table 2201. The value Dij of the distance information Cd is a Euclidean distance between the feature vector W(i) obtained from the value S(i) of the character code Dco and the representative feature vector V(j) obtained from the value P(j) of the predictive character image identifier Pid.

In the collation decision means 2203, it is decided that the character image code D22 matches the character code Dco when the value Dij of the distance information is smaller than the predetermined threshold T, and it is decided that the character image code D22 does not match the character code Dco when the value Dij of the distance information is larger than the threshold T.

As described above, the character collation apparatus 2200 of this twenty-second embodiment is provided with the table storage unit 2201 which stores the character-to-character distance table 2201 (3701) in which the predictive character image identifier Pid added to the character image code D22 and the character code Dco are respectively associated with the distance information Cd which is defined with the predictive character image identifier Pid and the character code Dco as variables. The predictive character image identifier Pid is an identifier to identify the predictive character image similar to the character image corresponding to the character image code D22, and the value Dij of the distance information Cd is a Euclidean distance between the feature vector W(i) obtained from the value S(i) of the character code Dco and the representative feature vector V(j) obtained from the value P(j) of the predictive character image identifier Pid. Accordingly, the feature vector corresponding to the character code Dco is compared with the feature vector corresponding to the predictive character image identifier which is included in the character image code D22.

Therefore, it is possible to collate the character image corresponding to the character image code D22 to which the predictive character image identifier Pid is added, with the character image corresponding to the character code Dco.

Accordingly, when it is decided that the character image specified by the character code Dco matches the predictive character image corresponding to the character image code D22, the character image corresponding to the character image code D22 is known by the inputted character code Dco without decoding the character image code D22, whereby the shape of the character image corresponding to the character image code D22 can be compared with the shape of another character image.

Twenty-Third Embodiment

Figure 23:
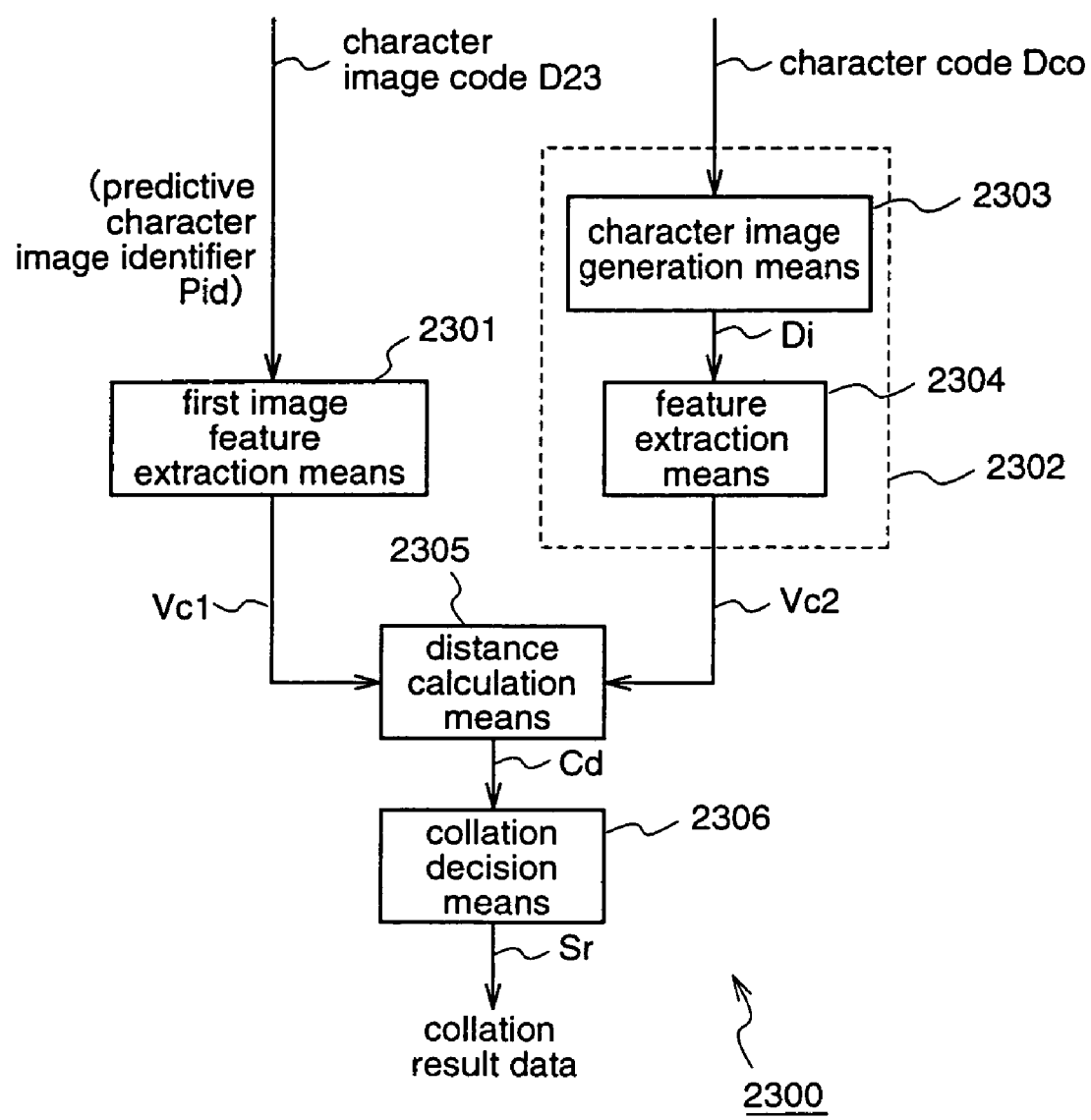
FIG. 23 is a block diagram for explaining a character collation apparatus according to a twenty-third embodiment of the present invention.

FIG. 23 is a block diagram illustrating the structure of a character collation apparatus according Lu d twenty-third embodiment of the present invention. This twenty-third embodiment corresponds to the forty-second and forty-third aspects described above.

A character collation apparatus 2300 of this twenty-third embodiment is used as a component of an information retrieval apparatus which is employed in an electronic device such as the document filing apparatus 3900 shown in FIG. 39.

The character collation apparatus 2300 receives a character code Dco specifying an externally supplied character image, collates a character image corresponding to a character image code D23 to which data of a predictive character image (predictive character image data PDi) similar to the above-mentioned character image is added, with the character image which is specified by the character code, and outputs collation result data Sr showing the result of the collation.

That is, the character collation apparatus 2300 is provided with: a first image feature extraction means 2301 which receives the character image code D23, extracts the image feature from the predictive character image which is indicated by the predictive character image data PDi added to the character image code D23, and outputs first image feature data Vc1; and a second image feature extraction means 2302 which receives the character code Dco, extracts the image feature of the character image which is specified by the character code Dco, and outputs second image feature data Vc2.

The second image feature extraction means 2302 comprises a character image generation means 2303 which generates character image data Di of the character image which is specified by the character code Dco, and a feature extraction means 2304 which outputs the second image feature data Vc2 based on the character image data Di. The character image generation means 2303 is identical in structure to the character image generation means 2002 according to the twentieth embodiment, and the feature extraction means 2304 is identical in structure to the feature extraction means 1102 of the eleventh embodiment. The second image feature extraction means 2302 is identical in structure to the image feature extraction means 2001 of the twentieth embodiment. Further, the first and second image feature data Vc1 and Vct are represented by feature vectors which are used for character recognition or the like in the eleventh embodiment, similar to the image feature data that is outputted from the feature extraction means 1102 of the image coding apparatus 1100 of the eleventh embodiment.

The character collation apparatus 2300 further includes a distance calculation means 2305 which obtains a Euclidean distance between the first image feature data Vc1 outputted from the first image feature extraction means 2301 and the second image feature data Vc2 outputted from the second image feature extraction means 2302, and outputs distance information Cd. The character collation apparatus 2300 also includes a collation decision means 2306 which outputs collation result data Sr indicating the result of collation as to whether the character image corresponding to the character image code D23 matches the character image specified by the character code Dco, based on the distance information Cd.

It is assumed that the predictive image identifier is obtained by vector quantization as described for the eleventh embodiment.

The operation of the character collation apparatus 2300 will now be described.

When the character image code D23 to which the predictive character image identifier Pid is added and the character code Dco are input to the character collation apparatus 2300 of this twenty-third embodiment, the first image feature extraction means 2301 extracts the image feature from the predictive character image which is indicated by the predictive character image identifier Pid, and outputs first image character data Vc1.

The character image generation means 2303 performs a process similar to that described for the character image generation means 2002 of the twentieth embodiment based on the character code Dco. Further, the feature extraction means 2304 performs an image feature extraction process similar to that described for the feature extraction means 1102 of the eleventh embodiment, and outputs second image feature data (feature vector) Vc2.

In the distance calculation means 2305, based on the first and second image feature data Vc1 and Vc2, a Euclidean distance between these feature vectors is obtained, and distance information Cd is output.

In the collation decision means 2306, it is decided that the character image corresponding to the character image code D23 matches the character image which is specified by the character code Dco when the Euclidean distance is smaller than a predetermined threshold, and it is decided that these character images do not match when the Euclidean distance is larger than the threshold.

If the predictive character image identifier Pid is a character code which is obtained as the result of character recognition performed on a character image, the first feature extraction means 2301 becomes identical in structure to the feature extraction means 2001 of the twentieth embodiment.

As described above, the character collation apparatus 2300 of this twenty-third embodiment is provided with: the first image feature extraction means 2301 which receives the character image code D23, and outputs the first image feature data Vc1 corresponding to the predictive character image based on the predictive character image data Pid which is added to the character image code D23; and the second image feature extraction means 2302 which extracts the image feature of the character image which is specified by the externally supplied character code Dco, and outputs the second image feature data Vc2. Thereby, the image feature data Vc2 of the character image corresponding to the character code Dco is compared with the feature image data Vc1 of the predictive character image which is included in the character image code D23.

Therefore, it is possible to perform collation on the corresponding character images between the character image code D23 to which the predictive character image data Pid is added, and the character code Dco.

Accordingly, when it is derided that. the character image which is specified by the character code Dco matches the predictive character image corresponding to the character image code D23, the character image corresponding to the character image code D23 is known by the inputted character code Dco without decoding the character image code D23, whereby the shape of the character image corresponding to the character image code D23 can be compared with the shape of another character image.

It is possible to make a computer perform the operation of an apparatus according to any of the aforementioned embodiments by using a magnetic recording medium or an optical recording medium which contains a program for making the computer perform the functions of all or part of the plural means constituting the apparatus. Also in this case, the same effects as described above are achieved.

While a character code which is obtained from a character recognition apparatus is used as an image feature in the first to seventh embodiments, a feature by which an image shape can be roughly reproduced, such as the mesh feature of the eighth embodiment, may be used. In this case, the predictive image generation means possessed by the respective apparatuses shown in FIGS. 1 to 7 have the same structure as that of the predictive image generation means 801.

The apparatus having such a structure can be applied not only to coding of a document image but also to coding of a general image.

Further, while a character code which is obtained from a character recognition apparatus is used as an image feature in the first to seventh embodiments, a predictive image identifier may be used by utilizing vector quantization as described for the eleventh embodiment. In this case, the predictive image generation means possessed by the apparatuses shown in FIGS. 1 to 7 becomes identical in structure to the predictive image generation means 1104 shown in FIG. 11.

Figure 38:
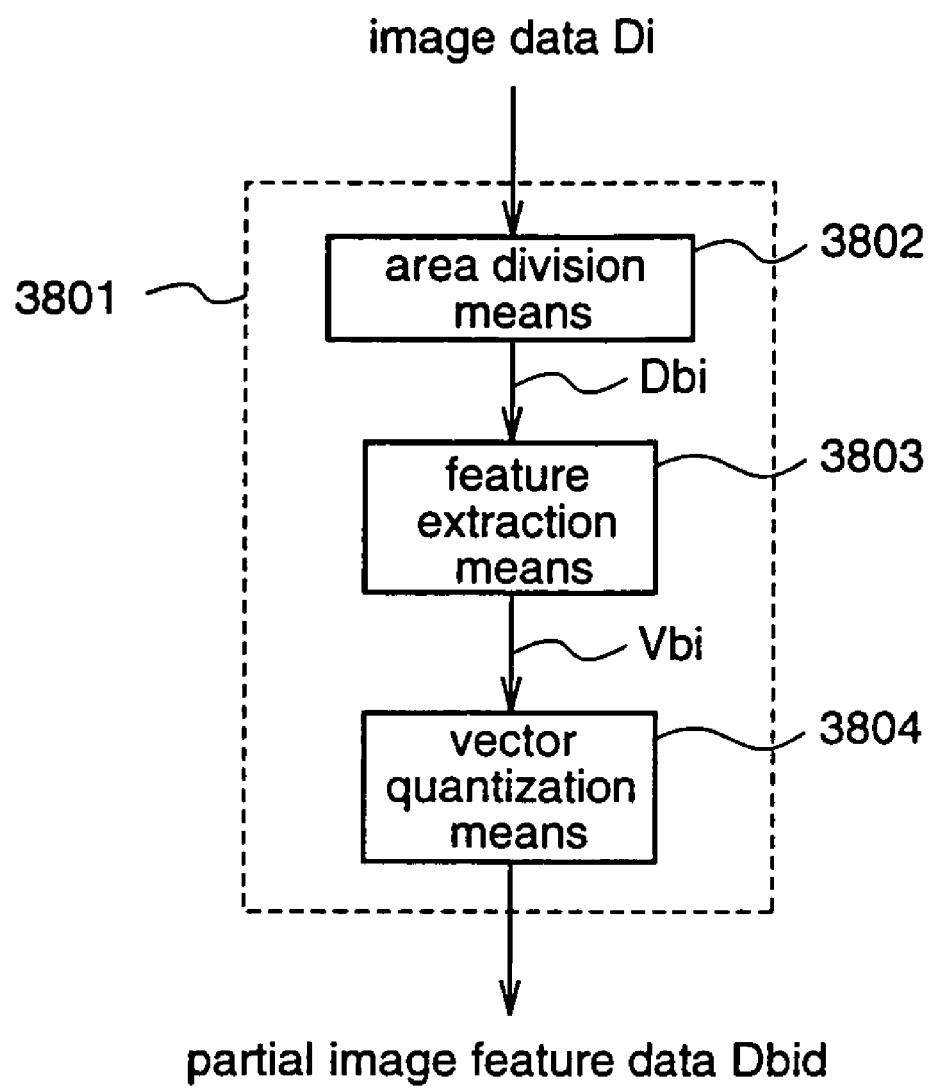
FIG. 38 is a block diagram illustrating another structure of an image feature extraction means according to the second, fourth, and sixth embodiments.

Further, the image feature extraction means shown in FIGS. 2, 4, and 6 according to the second, fourth, and sixth embodiments may have the structure of an image feature extraction means 3801 shown in FIG. 38.

The image feature extraction means 3801 comprises: an area division means 3802 which extracts a partial image from an image based on image data Di, and outputs partial image data Dbi; a feature extraction means 3803 which extracts a feature vector Vbi corresponding to each partial image based on the corresponding partial image data Dbi; and a vector quantization means 3804 which obtains a predictive image identifier Dbip corresponding to a representative feature vector from the obtained feature vectors Vbi.

An image coding apparatus having the image feature extraction means 3801, in place of the image feature extraction means according to the second, fourth, or sixth embodiment, outputs partial image feature data Dbid in which the character code in the character data Dc is replaced with the predictive image identifier.

Although a division method which is employed by the area division means 3802 depends on the type of a target image to be processed, when the target image is a document image, the area division means 3802 may employ a method described in "Analysis of Document Image Structure by Split Detection, Tsuji, The Institute of Electronics, Information and Communication Engineers, Vol.J74-D-II, No.4, pp. 491–999".

Further, while an identifier of a predictive image similar to a target image is obtained by using vector quantization in the eleventh and twelfth embodiments, a character recognition apparatus may be used when the target image is limited to a character.

To be specific, in the image coding apparatus according to the eleventh embodiment shown in FIG. 11, a character recognition means is used instead of the image feature extraction means 1101, and a character code is output instead of the predictive character image identifier. In this case, the predictive image generation means 1104 and 1201 shown in FIGS. 11 and 12 must be identical in structure to the predictive image generation means 103 shown in FIG. 1.

Furthermore, while the entropy coding means, entropy decoding means, block predictive coding means, and block predictive decoding means in the first to fifteenth embodiments perform arithmetic coding and arithmetic decoding which is adaptable to the arithmetic coding, these coding and decoding means may perform Huffman coding and Huffman decoding which is adaptable to the Huffman coding.

Twenty-Fourth Embodiment

Figure 42:
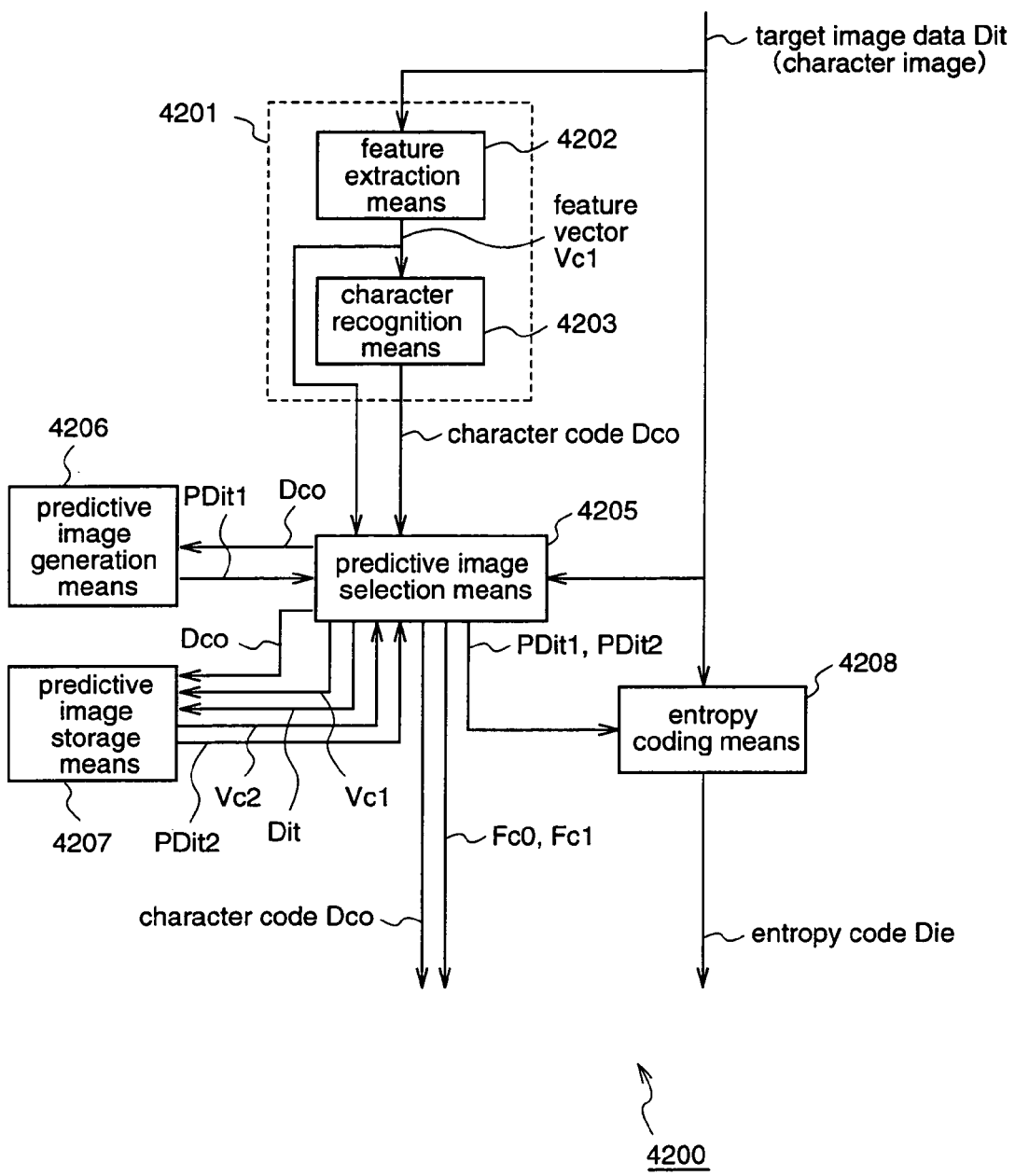
FIG. 42 is a block diagram for explaining an image coding apparatus according to a twenty-fourth embodiment of the present invention.

FIG. 42 is a block diagram illustrating the structure of an image coding apparatus according to a twenty-fourth embodiment of the present invention. This twenty-fourth embodiment corresponds to the twenty-first and twenty-second aspects described above.

An image coding apparatus 4200 according to the twenty-fourth embodiment is used as an image coding means in an electronic device having a scanner, such as the document filing apparatus 3900 shown in FIG. 39 or a facsimile.

The image coding apparatus 4200 receives, as target image data Dit to be coded, data of a character image corresponding to a character, and performs entropy coding on the target image data Dit with reference to a predictive image so as to output an entropy code Die as coded data of the target image.

To be specific, the image coding apparatus 4200 includes an image feature extraction means 4201 which performs character recognition on the target image so as to output a character code Dco corresponding to the target image, and a first feature vector Vc1 indicating the feature of the target image.

The image feature extraction means 4201 comprises a feature extraction means 4202 which extracts the image feature from the target image so as to output the first feature vector Vc1, and a character recognition means 4203 which performs character recognition on the target image by using the first feature vector Vc1 so as to output the character code Dco corresponding to the target image.

The image coding apparatus 4200 further includes a predictive image selection means 4205 which receives the target image data Dit, and which receives the character code Dco and the feature vector Vc1 which are obtained from the target image data Dit. The predictive image selection means 4205 selects either first predictive image data PDit1 which is obtained by prediction based on the character rode Dco corresponding to a character image to be currently processed (target image), or image data corresponding to an already-processed character image (second predictive image data PDit2). The predictive image selection means 4205 outputs the selected predictive image data PDit1 or PDit2, a flag Fc0 or Fc1 indicating that either the first predictive image data PDit1 or the second predictive image data PDit2 is selected, and the character code Dco corresponding to the target image.

The image coding apparatus 4200 further includes a predictive image generation means 4206 which receives the character code Dco corresponding to the target image through the predictive image selection means 4205, and generates first predictive image data PDit1 based on a font image corresponding to the character code Dco of the target image. The image coding apparatus 4200 also includes a predictive image storage means 4207 which associates the target image data Dit with the corresponding character code Dco and a first feature vector Vc1, and stores them as a set of data corresponding to one entry. The predictive image generation means 4206 is identical in structure to the predictive image generation means 103 in the image coding apparatus 100 according to the first embodiment. Further, the predictive image storage means 4207 receives a request from the predictive image selection means 4205, i.e., the character code Dco corresponding to the target image, and outputs the character image data and the feature vector corresponding to the character code Dco, as the second predictive image data PDit2 and the second feature vector Vc2, respectively.

The image coding apparatus 4200 further includes an entropy coding means 4208 which performs arithmetic coding on the target image data Dit with reference to the first predictive image data PDit1 or the second predictive image data POit2 outputted from the predictive image selection means 4205, and outputs an entropy code Die corresponding to the target image.

The operation of the image coding apparatus 4200 will now be described.

When image data Dit of a character image to be coded (target image) is input to the image coding apparatus 4200, the image feature extraction means 4201 generates a character code Dco and a first feature vector Vc1 corresponding to the target image data Dit.

To be specific, in the feature extraction means 4202, a feature to be utilized in character recognition or the like is extracted from the target image, and a first feature vector Vc1 corresponding to this feature is output. Then, in the character recognition means 4203, an image feature closest to the first feature vector Vc1 and a character having the closest image feature are retrieved, and a character code Dco corresponding to this character is output. Since the character recognition method employed by the character recognition means 4203 is described in, for example, "Pattern Recognition, The Institute of Electronics, Information and Communication Engineers", it is not necessary to describe this method in detail.

Subsequently, in the predictive image selection means 4205, either the first predictive image data PDit1 generated by the predictive image generation means 4206 or the second predictive image data PDit2 stored in the predictive image storage means 4207 is selected according to the character code Dco and the first feature vector Vc1. Then, a flag Fc0 or Fc1 indicating the selected predictive image data, and the character code Dco are output together with the selected predictive image data.

In the entropy coding means 4208, the target image data Dit is subjected to arithmetic coding according to the first or second predictive image data PDit1 or PDit2 which is selected by the predictive image selection means 4205, and an entropy code Die is output as coded data of the target image.

Hereinafter, the process which is performed by the predictive image selection means 4205 will be described in detail.

Figure 44:
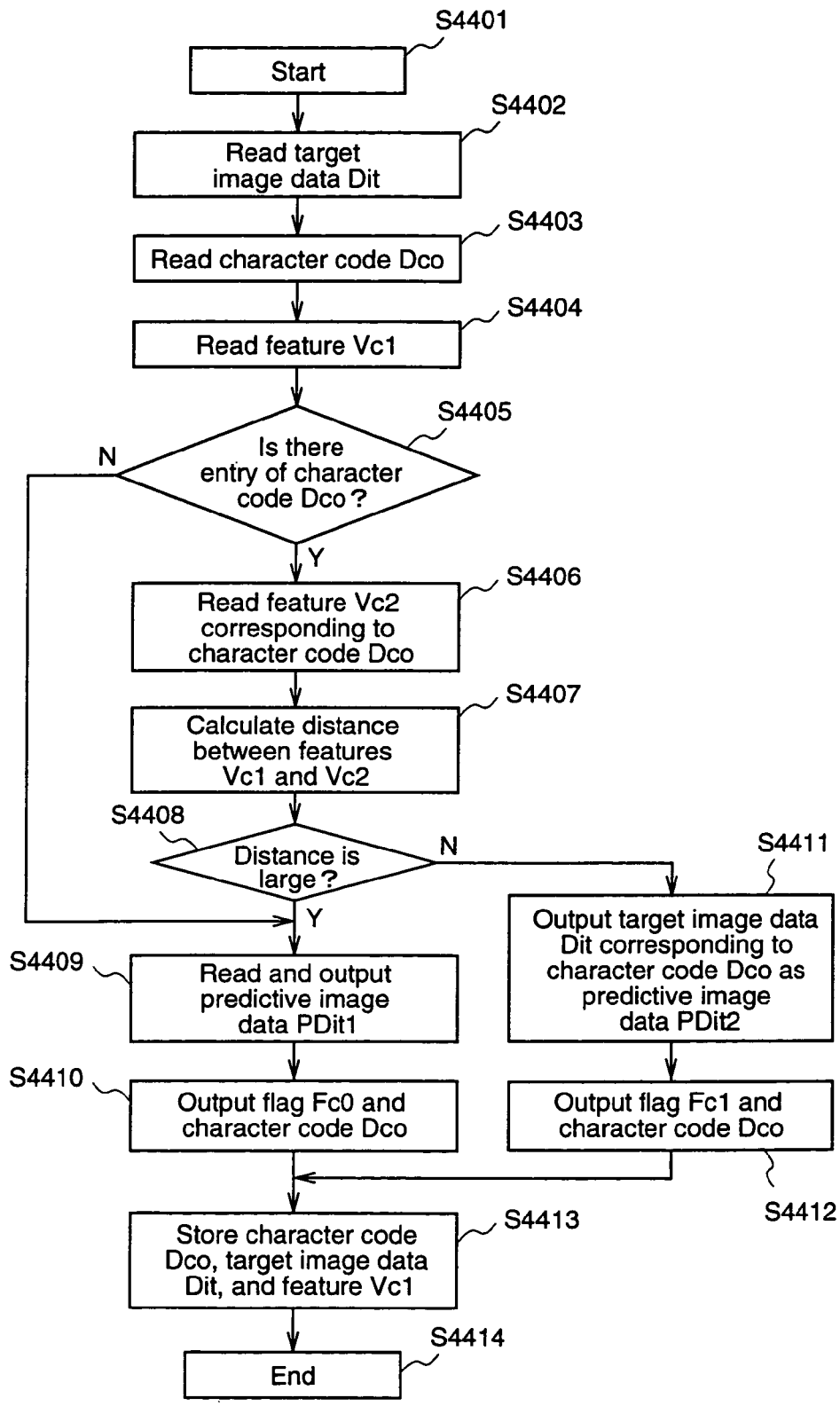
FIG. 44 is a diagram illustrating the flow of operation of a predictive image selection means as a component of the image coding apparatus according to the twenty-fourth embodiment.

FIG. 44 shows the operation flow of the predictive image selection means 4205.

Initially, when the predictive image selection means 4205 starts the process (step S4401), the target image data Dit, the character code Dco from the image feature extraction means 4201, and the first feature vector Vc1 are successively read into the predictive image selection means 4205 (steps S4402–S4404).

Next, it is decided whether there is an entry of the character code Dco of the target image in the predictive image storage means 4207 (step S4405). When there is an entry corresponding to the character code of the target image, the feature (second feature vector) Vc2 corresponding to the character code Dco is read from the predictive image storage means 4207 (step S4406).

Then, a Euclidean distance between the first feature vector Vc1 and the second feature vector Vc2 is obtained (step S4407), and it is decided whether this distance is larger than a predetermined threshold (step S4408). When the distance is larger than the threshold, the first predictive image data VDit1 generated by the predictive image generation means 4206 is output from the predictive image selection means 4205 to the entropy coding means 4208 (step S4409), and simultaneously, the flag Fc0 indicating that the first predictive image data PDit1 is selected is output together with the character code Dco of the target image (step S4410).

On the other hand, when the result of the decision in step 54408 is that the Euclidean distance is equal to or smaller than the predetermined threshold, the character image data corresponding to the character code Dco, which is stored in the predictive image storage means 4207, is output as the second predictive image data PDit2 for the target image from the predictive image selection means 4205 to the entropy coding means 4208 (step S4411), and simultaneously, the flag Fc1 indicating that the second predictive image data PDit2 is selected is output together with the character code Dco of the target image (step S4412).

Finally, the target image data Dit, the character code Dco, and the feature (first feature vector) Vc1, which have been read into the predictive image selection means 4205 through steps S4402–S4404, are stored in the predictive image storage means 4207 as a set of data corresponding to a new entry (step S4413).

When the data of the new entry corresponding to the character code Dco of the target image is stored in the predictive image storage means 4207, if an entry corresponding to the same character code Dco has already been stored in the storage means 4207, the feature and the target image data corresponding to the already-existing entry are replaced with those corresponding to the new entry, or the feature and the target image data corresponding to the character code Dco of the target image are respectively averaged between the new entry and the existing entry, and then, the feature and the target image data corresponding to the existing entry are replaced with the averaged feature and the averaged target image data.

As described above, the image coding apparatus 4200 of this twenty-fourth embodiment is provided with: the predictive image generation means 4206 which generates the first predictive image data PDit1 (i.e., the data of the font image corresponding to the character code of the target image) based on the character code Dco of the target image; and the predictive image storage means 4207 which stores the target image data Dit, and which stores the corresponding character code Dco and first feature vector Vc1 in association with each other. Between the font image that is obtained from the character code of the target image (first predictive image) and the character image which has already been coded (second predictive image), one of higher similarity to the target image is selected as a predictive image, and the arithmetic coding on the target image data is performed while switching the incidence probability model according to the selected predictive image data. Therefore, the coding efficiency of the arithmetic encoder is improved and, furthermore, the process of generating predictive image data for the target image is dispensed with when the character image to be coded is identical to the already-coded character image, whereby the load on the arithmetic coding process using the predictive image is reduced.

Further, since the character code Dco corresponding to the target image is output together with the entropy code Die corresponding to the target image, the coded data Die of the target image can be retrieved using the character code.

Twenty-Fifth Embodiment

Figure 43:
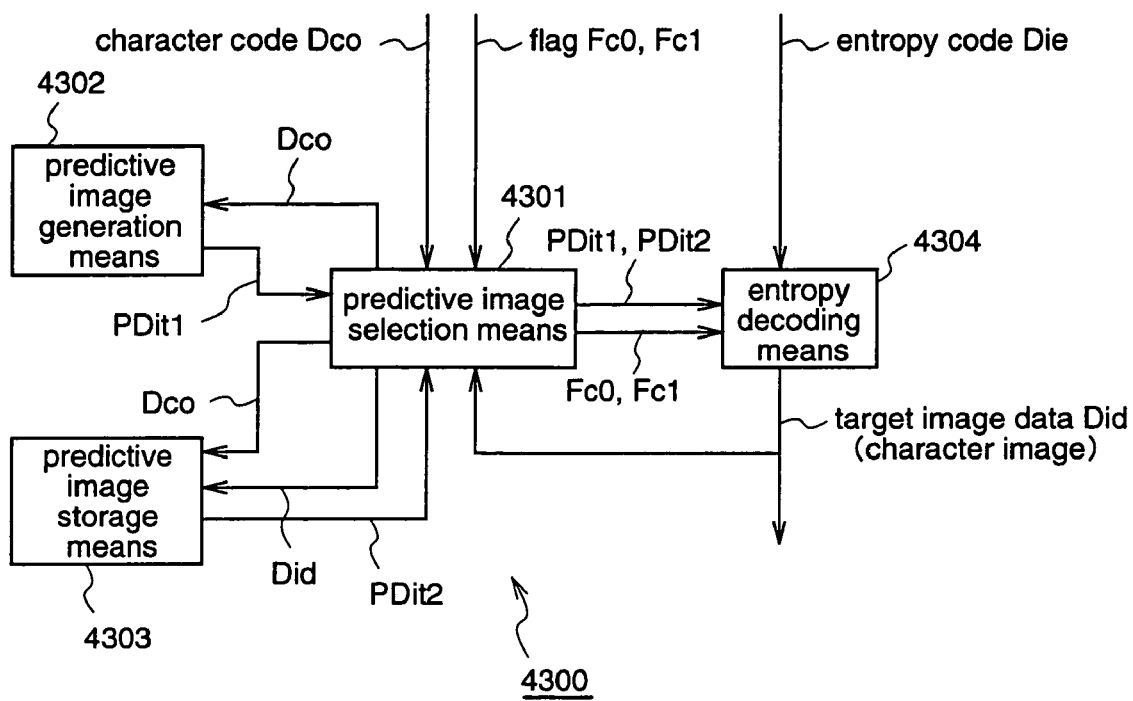
FIG. 43 is a block diagram for explaining an image decoding apparatus according to a twenty-fifth embodiment of the present invention.

FIG. 43 is a block diagram illustrating an image decoding apparatus according to a twenty-fifth embodiment of the present invention. This twenty-fifth embodiment corresponds to twenty-third and twenty-fourth aspects described above.

An image decoding apparatus 4300 according to the twenty-fifth embodiment is adapted to the image coding apparatus 4200 according to the twenty-fourth embodiment, and the image decoding apparatus 4300 is used as an image decoding means in an electronic device having a scanner, such as the document filing apparatus 3900 shown in FIG. 39 or a facsimile.

That is, the image decoding apparatus 4300 receives the entropy code (coded data) Die, the character code Dco, and the flag Fc0 or Fc1, which are output from the image coding apparatus 4200 of the twenty-fourth embodiment, and subjects the coded data Die Lo arithmetic decoding with reference to the predictive image data PDit, which is generated according to the character code Dco and the flag Fc0 or Fc1, so as to restore the target image data Did.

To be specific, the image decoding apparatus 4300 includes a predictive image generation means 4302 which generates first predictive image data PDit1 for the target image by using the font information or the like based on the character code Dco of the target image inputted, and a predictive image storage means 4303 which associates the target image data Dit with the corresponding character code Dco and which stores them as a set of data corresponding to one entry. The predictive image generation means 4302 is identical in structure to the predictive image generation means 103 of the image coding apparatus 100 according to the first embodiment. Further, the predictive image storage means 4303 receives the character code Dco corresponding to the target image, and outputs the character image data corresponding to the character code Dco as the second predictive image data PDit2.

The image decoding apparatus 4300 further includes a predictive image selection means 4301 which selects either the first predictive image data PDit1 obtained from the predictive image generation means 4302 or the second predictive image data PDit2 obtained from the predictive image storage means 4303 based on the character code Dco corresponding to the entropy code Die to be decoded and the flag Fc0 or Fc1.

Further, the image decoding apparatus 4300 includes an entropy decoding means 4304 which performs arithmetic decoding on the entropy code Die with reference to the first predictive image data PDit1 or the second predictive image data PDit2 outputted from the predictive image selection means 4302, and outputs the decoded data as target image data Did. The entropy decoding means 4304 is identical in structure to the entropy decoding means 306 of the image decoding apparatus 300 according to the third embodiment.

The operation of the image decoding apparatus 4300 will now be described.

When the image decoding apparatus 4300 receives the character code Dco corresponding to the character image that is the target of coding (target image), the flag Fc0 or Fc1, and the entropy code Die, which are output from the image coding apparatus 4200 of the twenty-fourth embodiment, the predictive image selection means 4301 selects either the first predictive image data PDit1 generated by the predictive image generation means 4302 or the second predictive image data PDit2 stored in the predictive image storage means 4303, according to the character code Dco and the flag Fc0 or Fc1. Then, the selected predictive image data PDit1 or PDit2 and the corresponding flag Fc0 or Fc1 are output to the entropy decoding means 4304.

In the entropy decoding means 4304, the entropy code Die is subjected to arithmetic decoding according to the predictive image data PDit1 or PDit2 selected by the predictive image selection means 4301, and target image data Did is output as decoded data of the target image.

Hereinafter, the process which is performed by the predictive image selection means 4301 will be described in detail.

Figure 45:
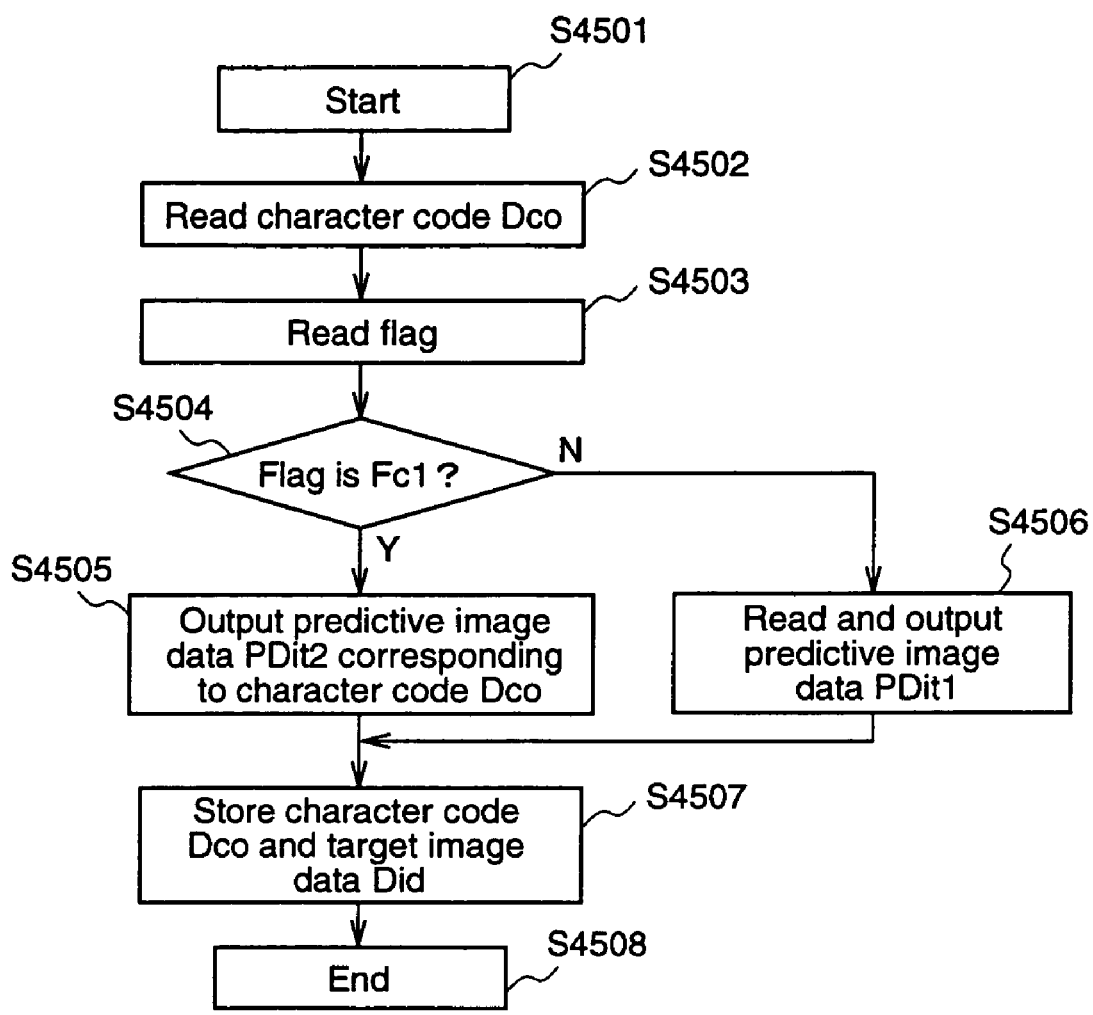
FIG. 45 is a diagram illustrating the flow of operation of a predictive image selection means as a component of the image decoding apparatus according to the twenty-fifth embodiment.

FIG. 45 shows the operation flow of the predictive image selection means 4301.

Initially, when the predictive image selection means 4301 starts the process (step S4501), the character code Dco corresponding to the target image and the flag Fc0 or Fc1, which are output from the image coding apparatus 4200, are successively read into the image selection means 4301 (steps S4502 and S4503).

Then, it is decided that the inputted flag is either the flag Fc0 indicating that the first predictive image data PDit1 generated by the predictive image generation means 4302 is to be used for decoding the entropy code, or the flag Fc1 indicating that the second predictive image data PDit2 stored in the predictive image storage means 4303 is to be used (step S4504).

When the inputted flag is the flag Fc1, the character image data (second predictive image data PDit2) corresponding to the character code Dco is read from the predictive image storage means 4303 (step S4505).

When the inputted flag is the flag Fc0, the first predictive image data PDit1 generated in the predictive image generation means 4302 according to the character code Dco is read (step S4506).

Then, the decoded data (target image data) Did, which is obtained by performing arithmetic decoding on the entropy code by using the predictive image data PDit1 or PDit2 selected by the predictive image selection means 4301, and the corresponding character code Dco are stored in the predictive image storage means 4303 as a set of data corresponding to a new entry (step S4507).

When the data of the new entry corresponding to the character code Dco of the target image is stored in the predictive image storage means 4303, if an entry corresponding to the same character code Dco has already been stored in the storage means 4303, the feature and the target image data corresponding to the already-existing entry are replaced with those corresponding to the new entry, or the feature and the target image data corresponding to the character code Dco of the target image are respectively averaged between the new entry and the existing entry, and then, the feature and the target image data corresponding to the existing entry are replaced with the averaged feature and the averaged target image data.

As described above, the image decoding apparatus 4300 of this twenty-fifth embodiment is provided with: the predictive image generation means 4302 which generates the first predictive image data PDit1 (i.e., the data of the font image corresponding to the character code of the target image) based on the character code Dco of the target image; and the predictive image storage means 4303 which stores the target image data Did and the corresponding character code Dco in association with each other. Between the font image which is obtained from the character code of the target image (first predictive image) and the character image which has already been decoded (second predictive image), one of higher similarity to the target image is selected as a predictive image, and the arithmetic decoding on the entropy code of the target image is performed while switching the incidence probability model according to the selected predictive image data. Therefore, it is possible to realize an arithmetic decoding process which is adapted to an arithmetic coding process which provides high coding efficiency of the arithmetic encoder, and to omit the process of generating predictive image data for the target image when the character image to be coded is identical to the already-coded character image, thereby reducing the arithmetic load.

Further, in the image decoding apparatus 4300, since the character code Dco corresponding to the target image is received together with the entropy code Die corresponding to the target image, the coded data Die of the target image can be retrieved by using the character code.

Further, while the entropy coding means performs arithmetic coding in the twenty-fourth embodiment, the entropy coding means may perform Huffman coding.

Furthermore, while the entropy decoding means performs arithmetic decoding in the twenty-fifth embodiment, the entropy decoding means may perform Huffman decoding.

A facsimile which is provided with the image coding apparatus 4200 of the twenty-fourth embodiment and the image decoding apparatus 4300 of the twenty-fifth embodiment is realized by replacing the image coding unit 200*a* and the image decoding unit 300*a* in the facsimile shown in FIG. 41 (*a*) with the image coding apparatus 4200 and the image decoding apparatus 4300, respectively.

Furthermore, a document filing apparatus which is provided with the image coding apparatus 4200 of the twenty-fourth embodiment and the image decoding apparatus 4300 of the twenty-fifth embodiment is realized by replacing the image coding unit 200*a* and the image decoding unit 300*a* in the document filing apparatus shown in FIG. 41(*b*) with the image coding apparatus 4200 and the image decoding apparatus 4300, respectively.

Twenty-Sixth Embodiment

Figure 46:
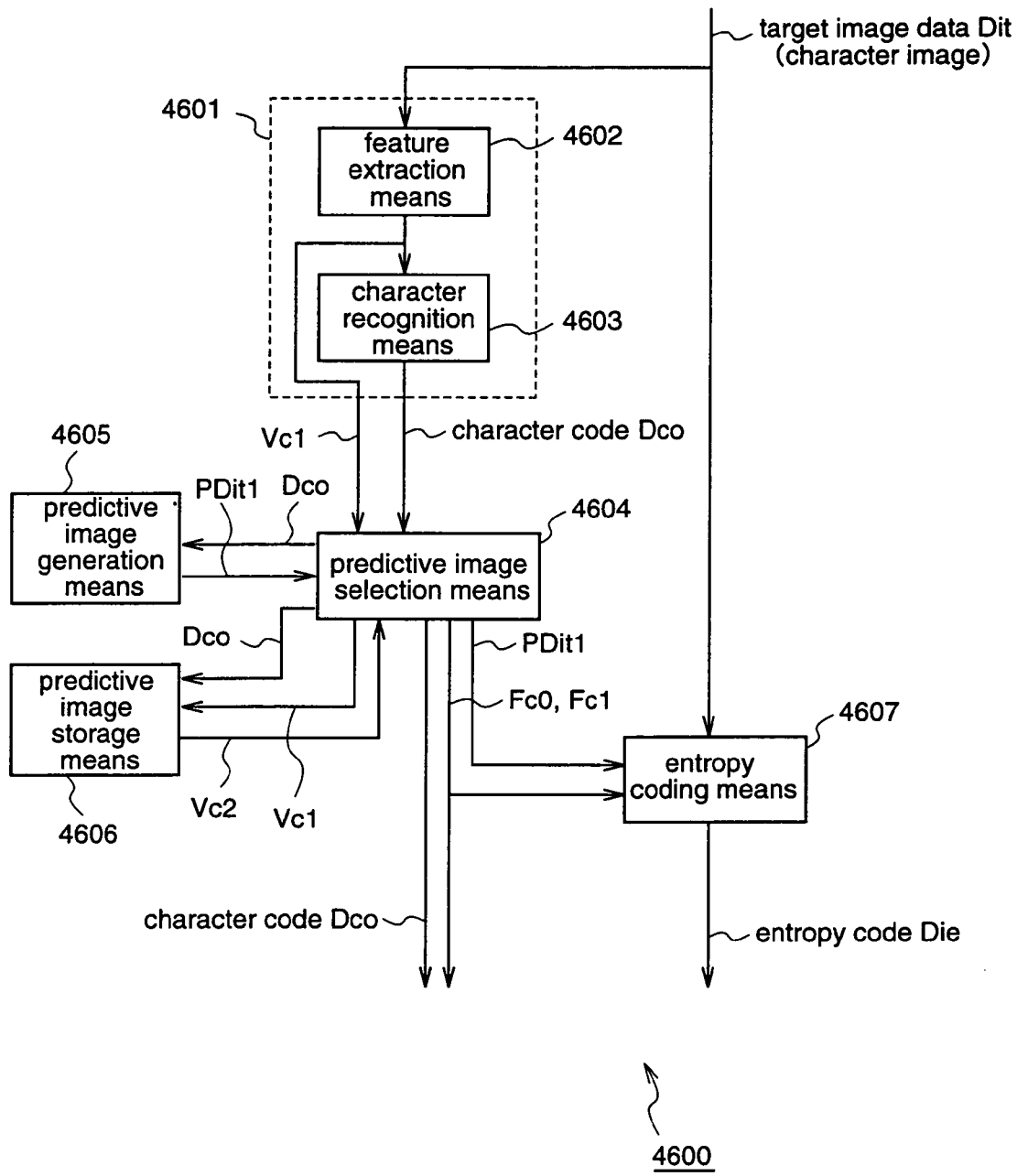
FIG. 46 is a block diagram for explaining an image coding apparatus according to a twenty-sixth embodiment of the invention.

FIG. 46 is a block diagram illustrating an image coding apparatus according to a twenty-sixth embodiment of the present invention. This twenty-sixth embodiment corresponds to the twenty-fifth and twenty-sixth aspects described above.

An image coding apparatus 4600 of this twenty-sixth embodiment is used as an image coding means in an electronic device having a scanner, such as the document filing apparatus 3900 shown in FIG. 39 or a facsimile.

The image coding apparatus 4600 receives, as target image data Dit to be coded, data of a character image corresponding to a character, performs entropy coding on the target image data Dit according to a feature indicating an image feature of the character image, and outputs an entropy code Die as coded data of the target image as well as information relating to the entropy coding process.

To be specific, the image coding apparatus 4600 includes an image feature extraction means 4601 which performs character recognition on the target image so as to output a character code Dco corresponding to the target image, and a feature vector (first feature vector) Vc1 indicating the feature of the target image. The image feature extraction means 4601 comprises a feature extraction means 4602 which extracts the image feature from the target image so as to output the first feature vector Vc1. The image feature extraction means 4601 also comprises a character recognition means 4603 which performs character recognition on the target image by using the first feature vector Vc1 so as to output the character code Dco corresponding to the target image.

The image coding apparatus 4600 further includes a predictive image selection means (data output control means) 4604 which performs either a first data output process or a second data output process according to the character code Dco which is obtained from the target image data Dit and the first feature vector Vc1. In the first data output process, a character code Dco corresponding to a character image which is currently processed (target image), predictive image data PDit1, and a flag Fc0 are output in the second data output process, the character code Dco of the target image and a flag Fc1 are output.

The image coding apparatus 4600 further includes a predictive image generation means 4605 which receives the character code Dco corresponding to the target image through the predictive image selection means 4604, and outputs image data of a font image corresponding to the character code Dco of the target image as the first predictive image data PDit1. The image coding apparatus 4600 also includes a predictive image storage means 460b which associates the target image data Dit with the corresponding character code Dco and feature vector (first feature vector) Vc1, and stores them as a set of data corresponding to one entry.

The image feature extraction means 4601 is identical in structure to the image feature extraction means 4201 of the twenty-fourth embodiment, and the predictive image generation means 4605 is identical in structure to the predictive image generation means 103 of the image coding apparatus 100 according to the first embodiment. Further, the predictive image storage means 4606 receives a request from the predictive image selection means 4603, i.e., the character code Dco corresponding to the target image, and outputs the feature vector (second feature vector) Vc2 indicating the image feature of an already-processed character image which is specified by the character code Dco.

The image coding apparatus 4600 further includes an entropy coding means 4607 which performs, when receiving the flag Fc0, arithmetic coding on the target image data Dit, with reference to the predictive image data PDit1 for the target image, by utilizing the correlation in pixel values between the target image and the predictive image, and outputs an entropy code Die as coded data of the target image. When receiving the flag Fc1, the entropy coding means 4607 does not perform arithmetic coding on the target image data Dit and, therefore, does not output coded data.

The operation of the image coding apparatus 4600 will now be described.

When image data Dit of a character image to be coded (target image) is input to the image coding apparatus 4600, the image feature extraction means 4601 generates a character code Dco and a feature vector (first feature vector) Vc1 corresponding to the target image data Dit.

To be specific, in the feature extraction means 4602, a feature to be utilized in character recognition or the like is extracted from the target image, and the first feature vector Vc1 corresponding to this feature is output. Then, in the character recognition means 4603, a character having an image feature which is closest to the image feature indicated by the first feature vector Vc1 is retrieved, and a character code Dco corresponding to this character is output. Since the character recognition method which is employed by the character recognition means 4603 is described in, for example, "Pattern Recognition, The Institute of Electronics, Information and Communication Engineers", it is not necessary to describe this method in detail.

Subsequently, in the predictive image selection means 4604, one of the first and second data output processes is selected according to the character code Dco and the first feature vector Vc1. When the first data output process is selected, the character code Dco of the character image which is currently processed (target image), the predictive image data PDit1, and the flag Fc0 are output. On the other hand, when the second data output process is selected, the character code Dco of the target image and the flag Fc1 are output.

When the entropy coding means 4607 receives the flag Fc0, the entropy coding means 4607 performs arithmetic coding on the target image data Dit with reference to the predictive image data PDit1 for the target image, and outputs an entropy code Die as coded data of the target image. On the other hand, when the entropy coding means 4607 receives the flag Fc1, the entropy coding means 4607 does not perform arithmetic coding on the target image data Dit and, therefore, does not output coded data.

Hereinafter, the process which is performed by the predictive image selection means 4604 will be described in detail.

Figure 48:
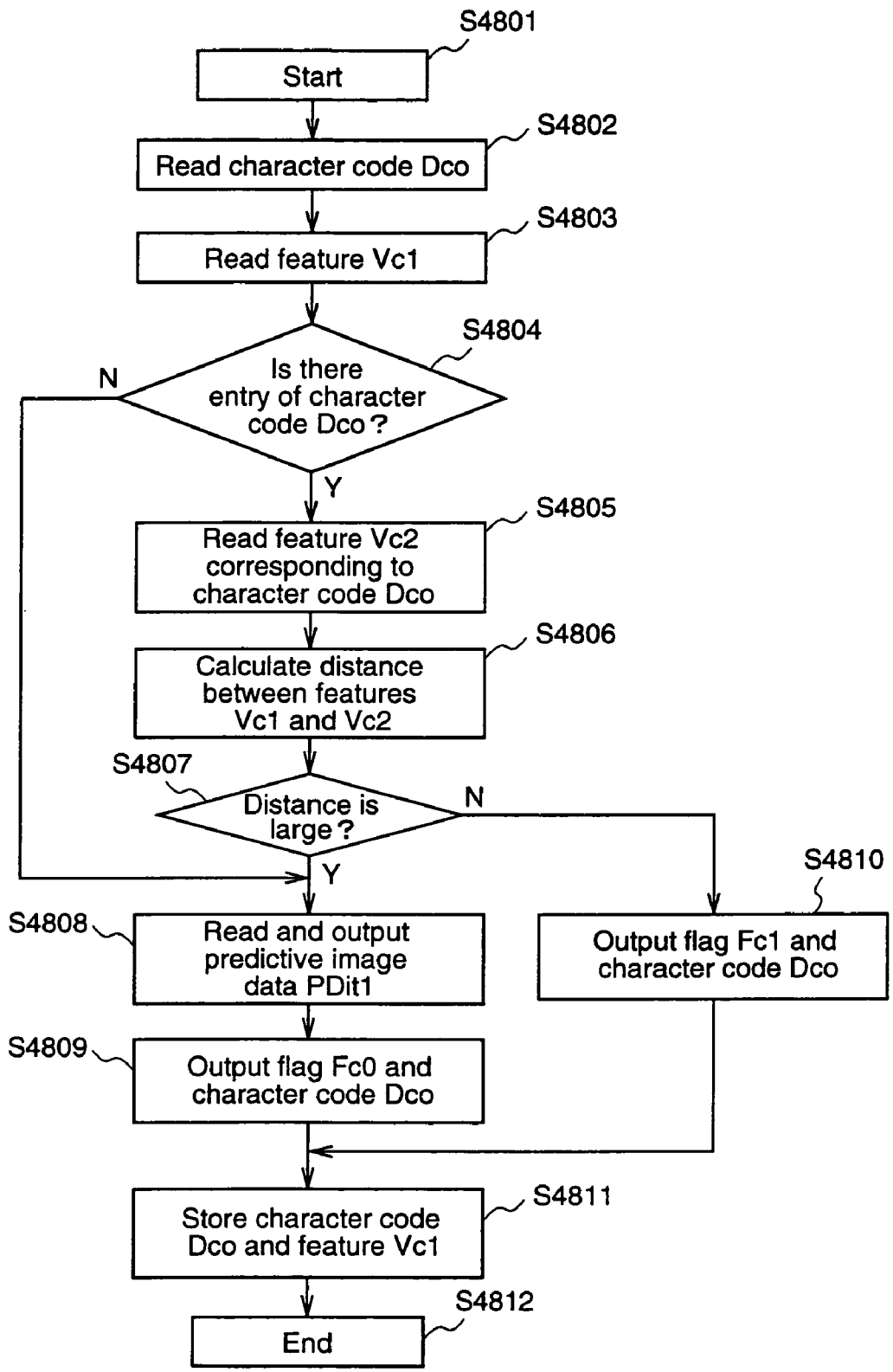
FIG. 48 is a diagram illustrating the flow of operation of a predictive imago selection means as a component of the image coding apparatus according to the twenty-sixth embodiment.

FIG. 48 shows the operation flow of the predictive image selection means 4604.

Initially, when the predictive image selection means 4604 starts the process (step S4801), the character code Dco from the image feature extraction means 4601 and the first feature vector Vc1 are successively read into the predictive image selection means 4604 (steps S4802 and S4803).

Next, it is decided whether there is an entry of the character code Dco of the target image in the predictive image storage means 4606 (step S4804). When there is an entry corresponding to the character code of the target image, the feature (second feature vector) Vc2 corresponding to the character code Dco is read from the predictive image storage means 4605 (step S4805).

Then, a Euclidean distance between the first feature vector Vc1 and the second feature vector Vc2 is obtained (step S4806), and it is decided whether this distance is larger than a predetermined threshold (step S4807). When the distance is larger than the threshold, the first predictive image data PDit1 generated by the predictive image generation means 4605 is output from the predictive image selection means 4604 to the entropy coding means 4607 (step S4808), and simultaneously, the flag Fc0 is output together with the character code Dco of the target image (step S4809).

On the other hand, when the result of the decision in step S4807 is that the Euclidean distance is equal to or smaller than the predetermined threshold, the flag Fc1 is output together with the character code Dco of the target image (step S4810).

Finally, the character code Dco and the feature (first feature vector) Vc1, which have been read into the predictive image selection means 4604 through steps S4802 and S4803, are stored in the predictive image storage means 4606 as a set of data corresponding to a new entry (step S4812).

When the data of the new entry corresponding to the character code Dco of the target image is stored in the predictive image storage means 4606, if an entry corresponding to the same character code Dco has already been stored in the storage means 4606, the feature corresponding to the already-existing entry is replaced with that corresponding to the new entry, or the feature is averaged between the new entry and the existing entry, and then, the feature corresponding to the existing entry is replaced with the averaged feature.

As described above, the image coding apparatus 4600 of this twenty-sixth embodiment is provided with: the predictive image generation means 4605 which generates the first predictive image data PDit1 (i.e., the data of the font image corresponding to the character code of the target image) based on the character code Dco of the target image; and the predictive image storage means 4606 which stores the target image data Dit, and which stores the corresponding character code Dco and first feature vector Vc1 in association with each other. Based on the result of comparison between the feature vector (first feature vector) Vc1 of the target character image to be processed and the feature vector (second feature vector) Vc2 corresponding to the already-processed character image, either the first data processing (i.e., performing arithmetic coding on the target image by using the font image as a predictive image, and outputting the entropy code Die, the character code Dco, and the flag Fc1) or the second data processing (i.e., outputting only the character code Dco and the flag Fc1) is performed. Therefore, the coding efficiency of the arithmetic encoder is improved and, furthermore, the process of generating predictive image data for the target image and the process of performing arithmetic coding on the target image data are dispensed with when the target character image to be coded is identical to the already-coded character image, whereby the load on the arithmetic coding process using the predictive image is reduced.

Further, since the character code Dco of the target character image to be coded is output regardless of the first or second data processing, the coded data Die of the target image can be retrieved using the character code.

Twenty-Seventh Embodiment

Figure 47:
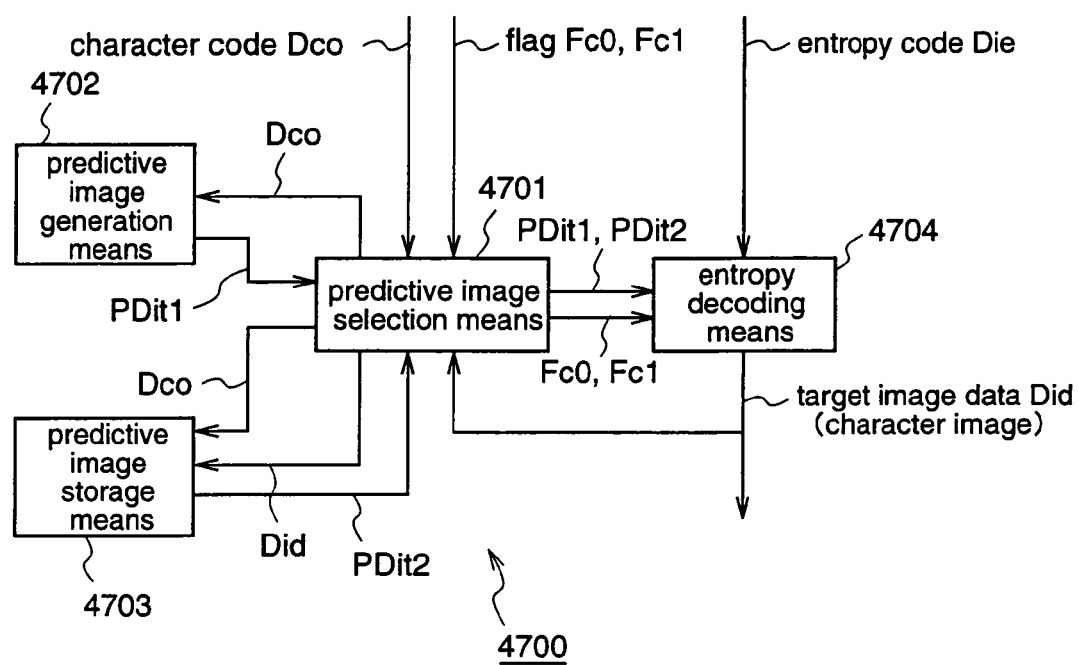
FIG. 47 is a block diagram for explaining an image decoding apparatus according to a twenty-seventh embodiment of the present invention.

FIG. 47 is a block diagram illustrating an image decoding apparatus according to a twenty-seventh embodiment of the present invention. This twenty-seventh embodiment corresponds to the twenty-seventh and twenty-eighth aspects descried above.

An image decoding apparatus 4700 according to the twenty-seventh embodiment is adapted to the image coding apparatus 4600 according to the twenty-sixth embodiment, and the image decoding apparatus 4700 is used as an image decoding means in an electronic device having a scanner, such as the document filing apparatus 3900 shown in FIG. 39 or a facsimile.

That is, the image decoding apparatus 4700 receives the entropy code (coded data) Die, the character code Dco, and the flag Fc0 or Fc1, which are output from the image coding apparatus 4600 of the twenty-sixth embodiment, and subjects the coded data Die to arithmetic decoding based on the character code Dco and the flag Fc0 or Fc2, thereby restoring the target image data Did.

To be specific, the image decoding apparatus 4700 includes: a predictive image generation means 4702 which generates first predictive image data PDit1 for the target image by using the font information or the like, based on the character code Dco of the inputted target image, and a predictive imago storage means 4703 which associates the target image data Dit with the corresponding character code Dco and stores them as a set of data corresponding to one entry. The predictive image generation means 4702 is identical in structure to the predictive image generation means 103 of the image coding apparatus 100 according to the first embodiment. Further, the predictive image storage means 4703 receives the character code Dco corresponding to the target image, and outputs the character image data which is associated with the character code Dco, as the second predictive image data PDit2.

The image decoding apparatus 4700 further includes a predictive image selection means 4701 which selects either the first predictive image data PDit1 obtained from the predictive image generation means 4702 or the second predictive image data PDit2 obtained from the predictive image storage means 4703, based on the character code Dco corresponding to the entropy code Die to be decoded and the flag Fc0 or Fc1, and outputs the selected data together with the corresponding flag Fc0 or Fc1.

Further, the image decoding apparatus 4700 includes an entropy decoding means 4704 which performs either a first data processing or a second data processing according to the flag Fc0 or Fc1. The first data processing is subjecting the entropy code Die to arithmetic decoding with reference to the first predictive image data PDit1 which is outputted from the predictive image selection means 4702, and outputting the decoded data as the target image data Did, and the second data processing is outputting the second predictive image data PDit2 as it is.

The flag Fc0 indicates that arithmetic decoding with reference to the first predictive image data PDit1 obtained from the predictive image generation means 4702 should be performed, and the flag Fc1 indicates that the second predictive image data PDit2 obtained from the predictive image storage means 4703 should be output as decoded data.

The operation of the image decoding apparatus 4700 will now be described.

When the image decoding apparatus 4700 receives the character code Dco corresponding to the character image that has been the target of coding (target image), the flag Fc0 or Fc1 and the entropy code Die, which are output from the image coding apparatus 4600 of the twenty-sixth embodiment, the predictive image selection means 4701 selects either the first predictive image data PDit1 generated by the predictive image generation means 4702 or the second predictive image data PDit2 stored in the predictive image storage means 4703, according to the character code Dco and the flag Fc0 or Fc1. Then, the selected predictive image data PDit1 or PDit2 and the corresponding flag Fc0 or Fc1 are output to the entropy decoding means 4704.

The entropy decoding means 4704 performs either the first data processing to perform arithmetic decoding on the entropy code Die by using the predictive image data PDit1 selected by the predictive image selection means 4701 so as to restore the target image data Did, or the second data processing so as to output the predictive image data PDit2 selected by the predictive image selection means 4701 as decoded data.

Hereinafter, the process which is performed by the predictive image selection means 4701 will be described in detail.

Figure 49:
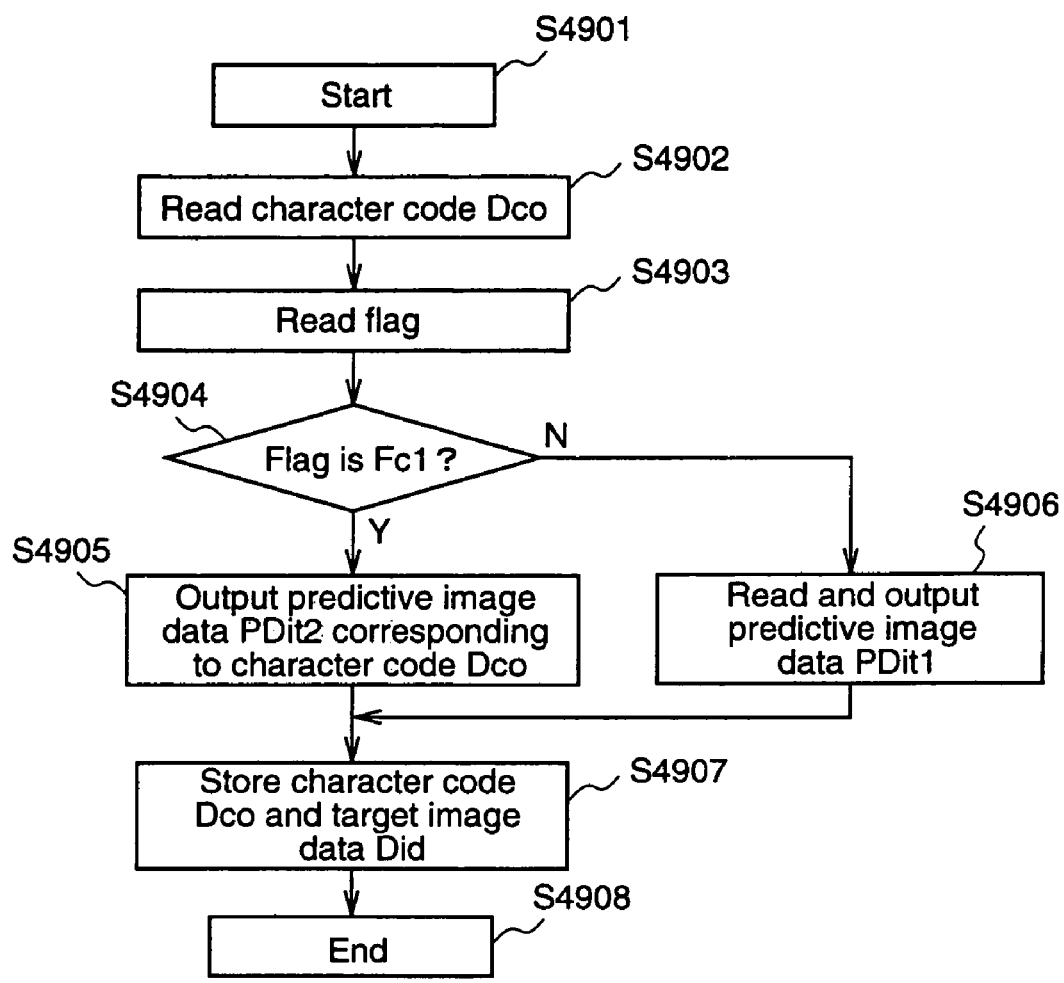
FIG. 49 is a diagram illustrating the flow of operation of a predictive image selection means as a component of the image decoding apparatus according to the twenty-seventh embodiment.

FIG. 49 shows the operation flow of the predictive image selection means 4701.

Initially, when the predictive image selection means 4701 starts the processing (step S4901), the character code Dco corresponding to the target image and the flag Fc0 or Fc1, which are output from the image coding apparatus 4600, are successively read into the predictive image selection means 4701 (steps S4902 and S4903).

Then, it is decided that the inputted flag is either the flag Fc0 indicating that the first predictive image data PDit1 generated by the predictive image generation means 4702 is to be used for decoding the entropy code, or the flag Fc1 indicating that the second predictive image data PDit2 stored in the predictive image storage means 4703 is to be used (step S4904).

When the inputted flag is the flag Fc1, the character image data (second predictive image data) PDit2 corresponding to the character code Dco is read from the predictive image storage means 4703 (step S4905).

When the inputted flag is the flag Fc0, the first predictive image data PDit1 generated in the predictive image generation means 4702 according to the character code Dco is read (step S4906).

Then, the decoded data (target image data) Did, which is obtained by decoding using the predictive image data PDit1 or PDit2 selected by the predictive image selection means 4701, and the corresponding character code Dco are stored in the predictive image storage means 4703 as a set of data corresponding to a new entry.

When the data of the new entry corresponding to the character code Dco of the target image is stored in the predictive image storage means 4703, if an entry corresponding to the same character code Dco has already been stored in the storage means 4703, the target image data corresponding to the already-existing entry is replaced with that corresponding to the new entry, or the target image data corresponding to the character code Dco of the target image is averaged between the new entry and the existing entry, and then, the target image data corresponding to the existing entry is replaced with the averaged target image data.

As described above, the image decoding apparatus 4700 of this twenty-seventh embodiment is provided with the predictive image generation means 4702 which generates the first predictive image data PDit1 (i.e., the data of the font image corresponding to the character code of the target image) based on the character code Dco of the target image, and the predictive image storage means 4703 which stores the target image data Did and the corresponding character code Dco in association with each other. Between the font image which is obtained from the character code of the target image (first predictive image) and the character image which has already been decoded (second predictive image), one of higher similarity to the target image is selected, whereby either the first data processing (i.e., performing arithmetic decoding on the entropy code of the target image while switching the incidence probability model according to the first predictive image data so as to generate decoded data) or the second data processing (i.e., outputting the second predictive image data as it is) is performed. Therefore, it is possible to realize an arithmetic decoding process which is adaptable to an arithmetic coding process which provides high coding efficiency of the arithmetic encoder, and to omit the process of generating predictive image data for the target image and the process of arithmetically coding the target image data when the character image to be coded is identical to the already-coded character image, thereby reducing the arithmetic load.

Further, in the image decoding apparatus 4700, since the character code Dco corresponding to the target image is received together with the entropy code Die corresponding to the target image, the coded data Die of the, target image can be retrieved by using the character code.

While the entropy coding means performs arithmetic coding in the twenty-sixth embodiment, the entropy coding means may perform Huffman coding.

Further, while the entropy decoding means performs arithmetic decoding in the twenty-seventh embodiment, the entropy decoding means may perform Huffman decoding.

A facsimile which is provided with the image coding apparatus 4600 of the twenty-sixth embodiment and the image decoding apparatus 4700 of the twenty-seventh embodiment is realized by replacing the image coding unit 200a and the image decoding unit 300a in the facsimile shown in FIG. 41(a) with the image coding apparatus 4600 and the image decoding apparatus 4700, respectively.

Furthermore, a document filing apparatus which is provided with the image coding apparatus 4600 of the twenty-sixth embodiment and the image decoding apparatus 4700 of the twenty-seventh embodiment is realized by replacing the image coding unit 200a and the image decoding unit 300a in the document filing apparatus shown in FIG. 41(b) with the image coding apparatus 4600 and the image decoding apparatus 4700, respectively.

When a program for making a computer perform the image coding process, image decoding process, or character collation process according to any of the aforementioned embodiments is recorded on a data storage medium such as a floppy disk, the process described for any of the embodiments can be easily performed with an independent computer system.

Figure 40A:
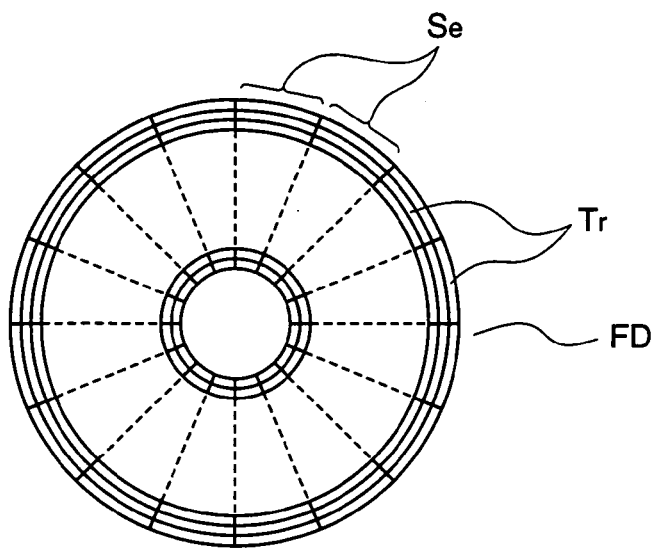
FIGS. 40(a), 40(b), and 40(c) are diagrams for explaining a data storage medium which stores a program for performing, by using software, a coding process, a decoding process, or a collation process according to any of the embodiments of the present invention.
Figure 40B:
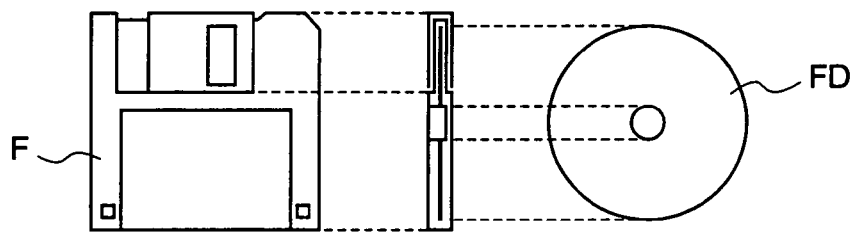
Figure 40C:
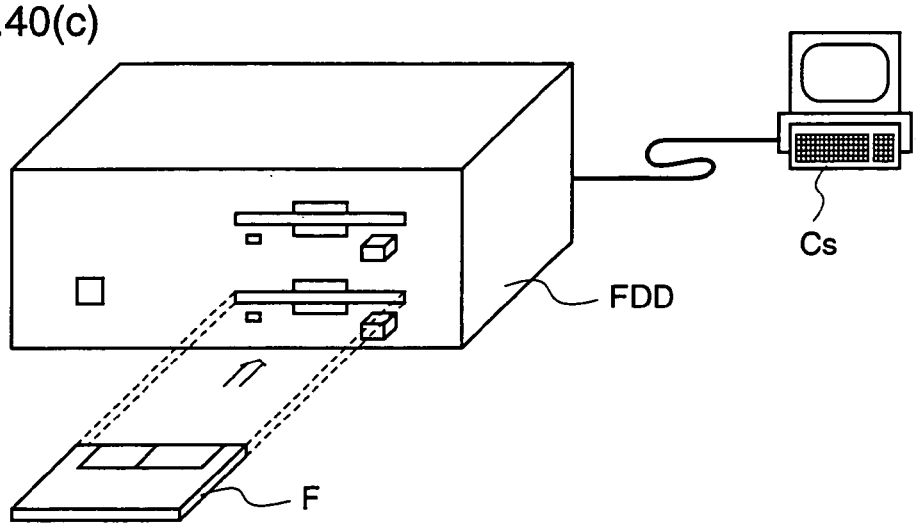

FIGS. 40(a), 40(b), and 40(c) are diagrams for explaining the case where the processing described for any of the embodiments of the invention is performed with a computer system, using a floppy disk containing the above-described program.

FIG. 40(b) shows a floppy disk, to be specific, its outward appearance, cross-section, and the disk itself. FIG. 40(a) shows an example of a physical format of the floppy disk as a recording medium body. The floppy disk FD is contained in a case F. On the surface of the floppy disk FD, a plurality of tracks Tr are formed concentrically along the radius of the disk, and each track is divided into sixteen sectors Se at equal angles. Accordingly, on the floppy disk FD containing the above-mentioned program, data as the program is recorded in an assigned area of the floppy disk FD.

FIG. 40(c) shows a construction for recording and playback of the program in/from the floppy disk FD. When the program is recorded in the floppy disk, data as the program is written in the disk from a computer system Cs through a floppy disk drive FDD. When, the above-described image coding apparatus, image decoding apparatus, or character collation apparatus is constructed in the computer system using the program recorded in the floppy disk, the program is read from the floppy disk and transmitted to the computer system by the floppy disk drive FUD.

While a floppy disk is employed as a data recording medium in the above description, an optical disk may be employed. Further, any recording medium, such as an IC card or a ROM cassette, may be employed as long as it can store the program.

APPLICABILITY IN INDUSTORY

As described above, the image coding apparatuses, image decoding apparatuses, character collation apparatuses, and data storage media according to the present invention are able to improve the image coding efficiency. Especially, these apparatuses are very useful in a facsimile for transmitting images, especially document images, and in a filing apparatus for storing document images to be retrieved.

What is claimed is:

1. An image coding apparatus for coding image data corresponding to a target image to be coded based on image data corresponding to a predictive image which is similar to the target image, said apparatus comprising:
   predictive image generation means for generating image data corresponding to partial predictive images which are similar to plural partial images constituting the target image based on image feature data indicating features of the plural partial images;
   image composition means for compositing the plural partial predictive images based on the image data of the plural partial predictive images and auxiliary data indicating positions and sizes of the respective partial images in the target image so as to generate image data of the predictive image; and
   entropy coding means for subjecting the image data of the target image to entropy coding utilizing a correlation in pixel values between the target image and the predictive image, and outputting entropy codes as coded image data of the target image;
   wherein said image coding apparatus is operable to output the image feature data and the auxiliary data in addition to the entropy codes.

2. An image coding apparatus as defined in claim 1, further comprising image feature extraction means for generating the image feature data indicating the features of the respective partial images constituting the target image, and the auxiliary data indicating the positions and sizes of the respective partial images in the target image based on the image data of the target image.

3. An image coding apparatus as defined in claim 2 wherein said entropy coding means comprises:
   first image blocking means for dividing the image data of the predictive image into image data corresponding to plural predictive blocks constituting the predictive image and each having a predetermined size, and outputting the image data of each predictive block;
   second image blocking means for dividing the image data of the target image into image data corresponding to plural target blocks constituting the target image and each having a predetermined size, and outputting the image data of each target block; and
   block predictive coding means for subjecting the image data of each target block to entropy coding based on a correlation in pixel values between each predictive block and each target block;
   wherein said block predictive coding means performs entropy coding on the image data of the target block and outputs corresponding coded image data and a coding flag when a difference between the target block and the predictive block is equal to or larger than a predetermined reference value; and
   wherein said block predictive coding means does not perform entropy coding on the target block and outputs a non-coding flag when the difference between the target block and the predictive block is smaller than the predetermined reference value.

* * * * *